United States Patent
Bonini et al.

(10) Patent No.: US 10,689,745 B2
(45) Date of Patent: *Jun. 23, 2020

(54) SYSTEM AND METHOD FOR SURFACE HARDENING OF REFRACTORY METALS

(71) Applicant: IAP RESEARCH, INC., Dayton, OH (US)

(72) Inventors: Julius John Bonini, Schenectady, NY (US); Bhanumathi Chelluri, Dublin, OH (US); Edward Arlen Knoth, Beavercreek, OH (US)

(73) Assignee: IAP Research, Inc., Dayton, OH (US)

( * ) Notice: Subject to any disclaimer, the term of this patent is extended or adjusted under 35 U.S.C. 154(b) by 355 days.

This patent is subject to a terminal disclaimer.

(21) Appl. No.: 15/427,479

(22) Filed: Feb. 8, 2017

(65) Prior Publication Data
US 2017/0298495 A1  Oct. 19, 2017

Related U.S. Application Data

(63) Continuation of application No. 11/961,276, filed on Dec. 20, 2007, now Pat. No. 9,580,790.

(60) Provisional application No. 60/871,478, filed on Dec. 22, 2006.

(51) Int. Cl.
| | | |
|---|---|---|
| *C22C 16/00* | (2006.01) |
| *C23C 8/44* | (2006.01) |
| *C22C 14/00* | (2006.01) |
| *C22C 27/00* | (2006.01) |
| *C22F 1/18* | (2006.01) |
| *C23C 8/54* | (2006.01) |
| *C23C 8/58* | (2006.01) |
| *C23C 10/24* | (2006.01) |
| *C23C 10/26* | (2006.01) |

(52) U.S. Cl.
CPC ............... *C23C 8/44* (2013.01); *C22C 14/00* (2013.01); *C22C 27/00* (2013.01); *C22F 1/18* (2013.01); *C22F 1/183* (2013.01); *C23C 8/54* (2013.01); *C23C 8/58* (2013.01); *C23C 10/24* (2013.01); *C23C 10/26* (2013.01); *F16C 2204/42* (2013.01); *Y10T 428/12771* (2015.01)

(58) Field of Classification Search
CPC ......... C22C 16/00; C22C 14/00; C22C 27/00; C22F 1/186; C22F 1/18; C23C 8/44; C23C 8/54; C23C 10/26; C23C 10/24; C23C 8/58

See application file for complete search history.

(56) References Cited

U.S. PATENT DOCUMENTS

| | | |
|---|---|---|
| 2,453,896 A | 11/1948 | Dean |
| 2,884,687 A | 5/1959 | Thomson |
| 2,892,743 A | 6/1959 | Griest |
| 3,642,546 A | 2/1972 | Van Thyne |
| 4,568,396 A | 2/1986 | Vardiman |
| 4,693,760 A | 9/1987 | Sioshansi |
| 5,135,782 A | 8/1992 | Rostoker et al. |
| 5,152,795 A | 10/1992 | Sioshansi et al. |
| 5,192,323 A | 3/1993 | Shetty et al. |
| 5,290,368 A | 3/1994 | Gavigan et al. |
| 5,458,334 A | 10/1995 | Sheldon et al. |
| 5,649,951 A * | 7/1997 | Davidson .............. A61F 2/0077 606/198 |
| 9,580,790 B2 * | 2/2017 | Bonini .................... C22C 14/00 |

FOREIGN PATENT DOCUMENTS

EP   0464265 A1   1/1992

OTHER PUBLICATIONS

Massalski, Thaddeus, ed., "Binary Alloy Phase Diagrams", vol. 2, American Society for Metals, Metal Park, Ohio, pp. 294, 573, 595, 619, 640, 831, 1487, 1490, 1507, 1510, 1512 and 1676; 1986.
Hansen, Max, Dr.phil, "Constitution of Binary Alloys", McGraw-Hill Book Company, New York, pp. 348, 366, 479 and 483; 1958.
Elliot, Rodney P., "Constitution of Binary Alloys, First Supplement", McGraw-Hill Book Company, New York, pp. 207; 1965.
Textor, Marcus, et al. "Properties and biological significance of natural oxide films on titanium and its alloys." Titanium in medicine. Springer Berlin Heidelberg, 2001. 171-230.
A. Shenhar et al., "Surface modification of titanium alloy orthopedic implants via novel powder immersion reaction assisted coating nitriding method", Materials Science and Engineering A268 (1999) pp. 40-46.
M.L. Rubo de Rezende et al., "Quantitative bone tissue response to commercially pure titanium implants", Journal of Materials Science: Materials in Medicine 4 (1993) pp. 233-239.
V.M. Weerasinghe et al., "Laser surface nitriding of titanium and a titanium alloy", Journal of Materials Processing Technology 58 (1996) pp. 79-86.

* cited by examiner

*Primary Examiner* — Jessee R Roe
(74) *Attorney, Agent, or Firm* — Jacox, Meckstroth & Jenkins

(57) ABSTRACT

A process of converting an outer layer of an object made of a refractory metal, such as titanium, into a carbide of the refractory metal. A molten metal, such as molten lithium, is placed adjacent the outer surface of the object. The lithium does not react with the titanium, nor is it soluble within the titanium to any significant extent at the temperatures involved. The molten lithium contains elemental carbon, that is, free carbon atoms. At high temperature, the carbon diffuses into the titanium, and reacts with titanium atoms to form titanium carbide in an outer layer. Significantly, no other atoms are present, such as hydrogen or oxygen, which can cause problems, because they are blocked by the molten lithium.

5 Claims, 53 Drawing Sheets

FIG. 1: Lithium – Carbon Phase Diagram. (Ref. 2)

FIG. 2: Lithium – Titanium Phase Diagram. (Ref. 2)

FIG. 3: Illustration of Diffusion Profile for Carburization of Titanium in a Lithium Bath.

FIG. 4: Titanium – Carbon Phase Diagram. (Ref. 2)

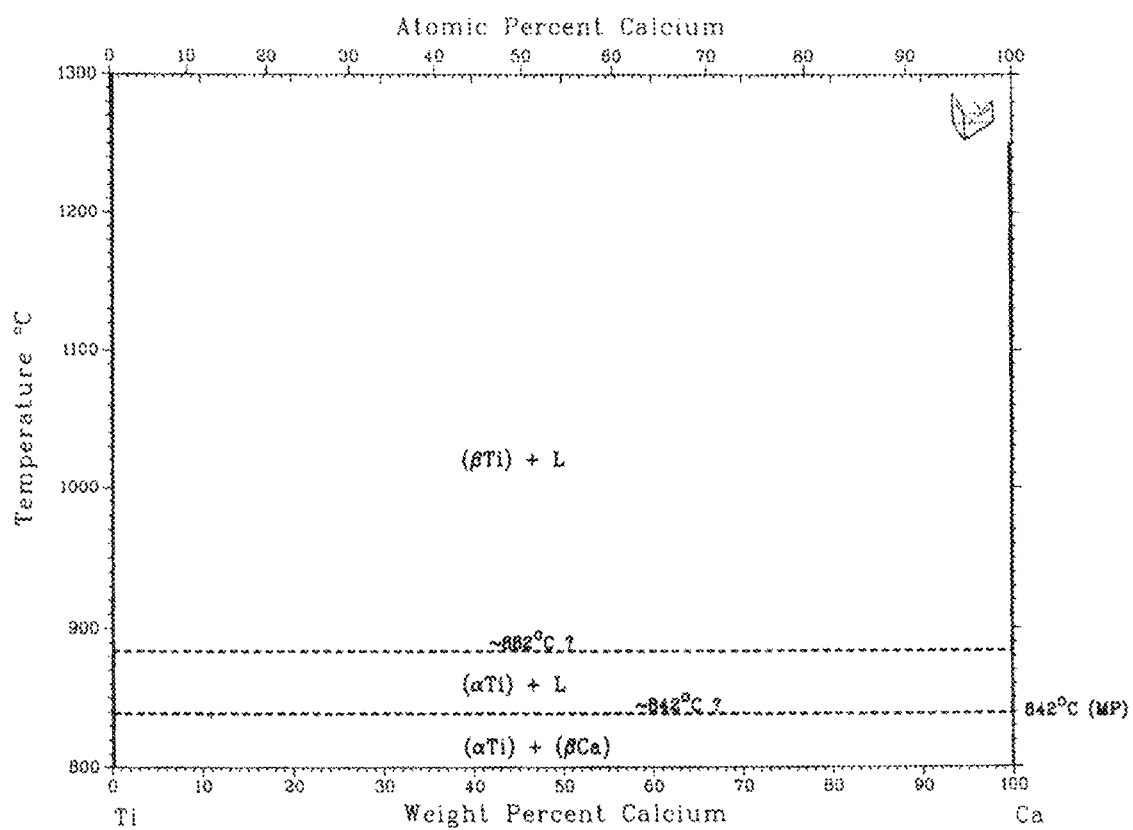
FIG. 17: Calcium – Titanium Phase Diagram. (Ref. 2)

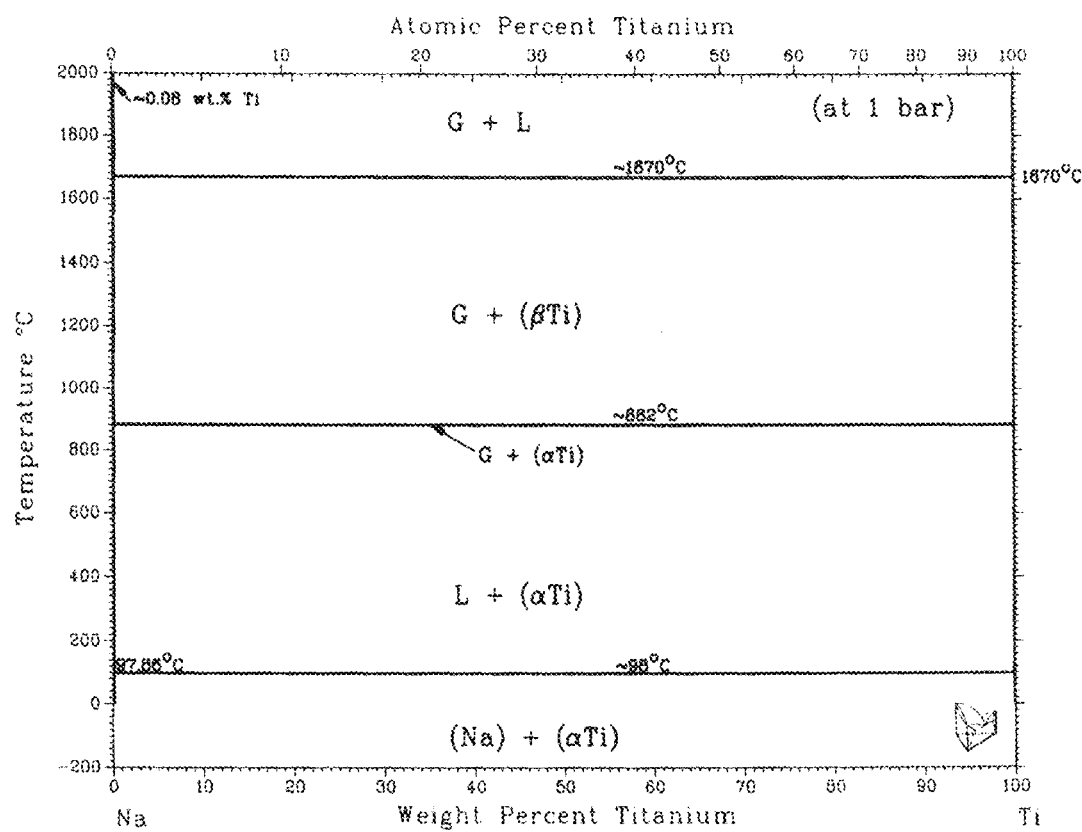
FIG. 18: Sodium – Titanium Phase Diagram. (Ref. 2)

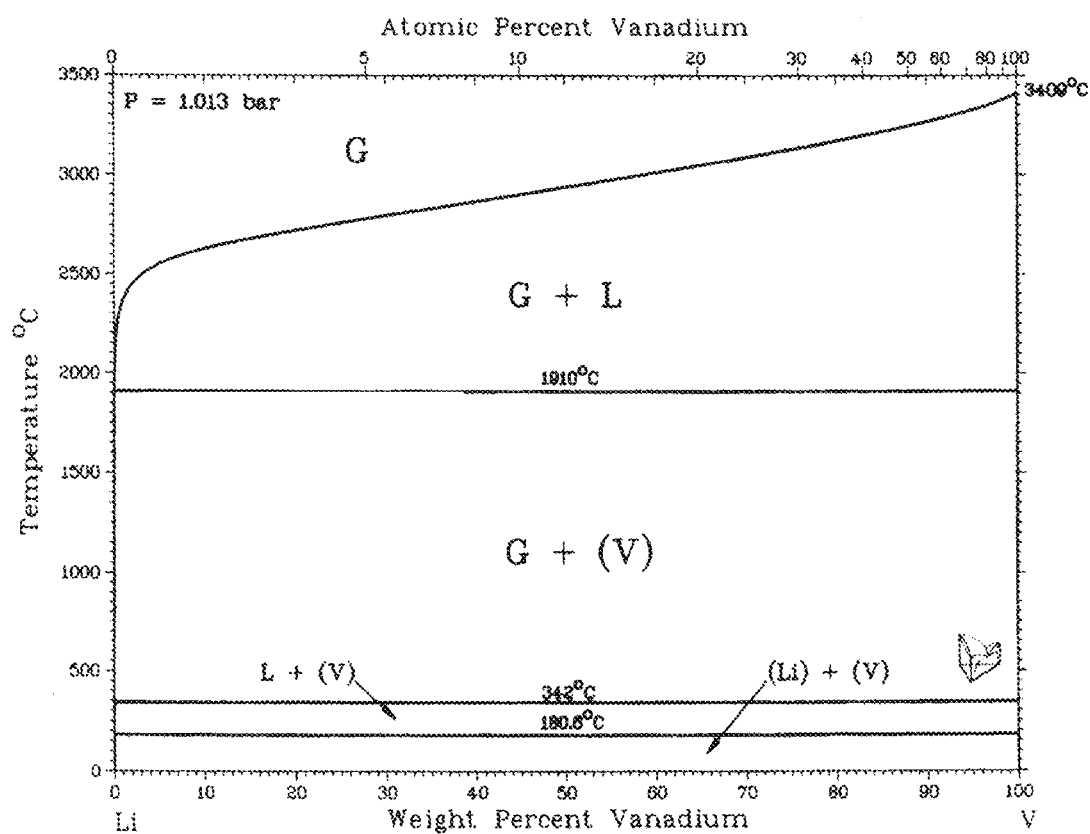
FIG. 19: Lithium – Vanadium Phase Diagram. (Ref. 2)

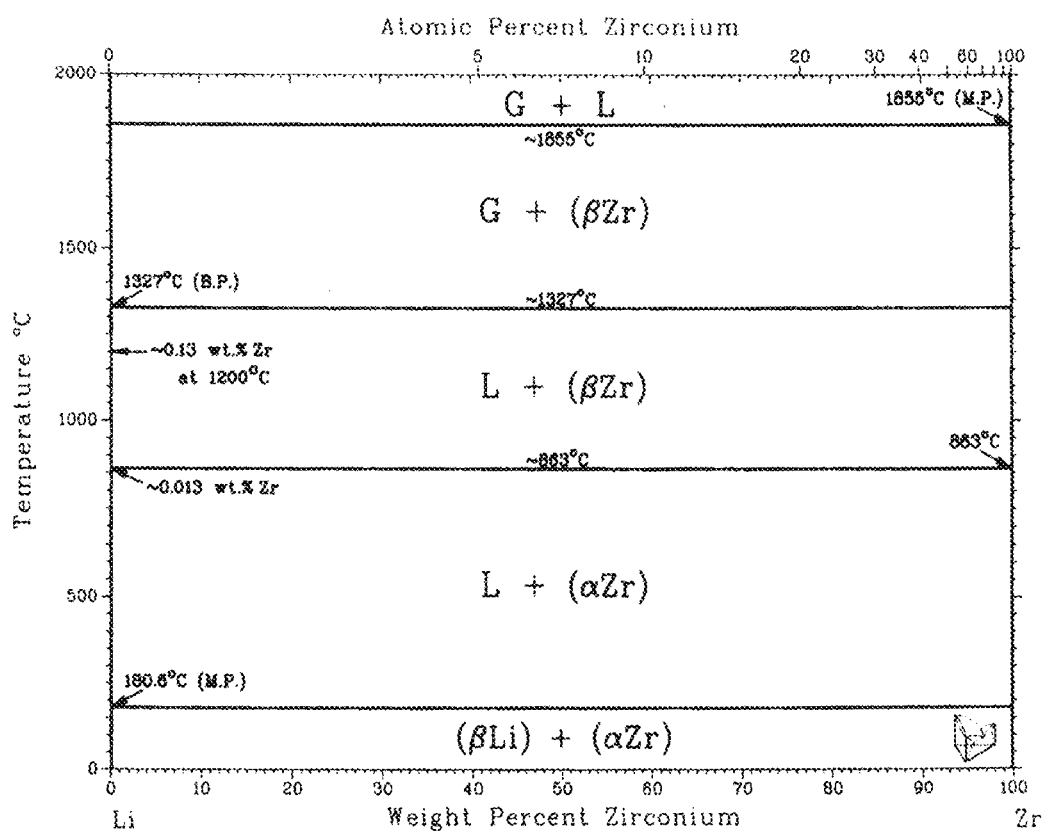
FIG. 20: Lithium – Zirconium Phase Diagram. (Ref. 2)

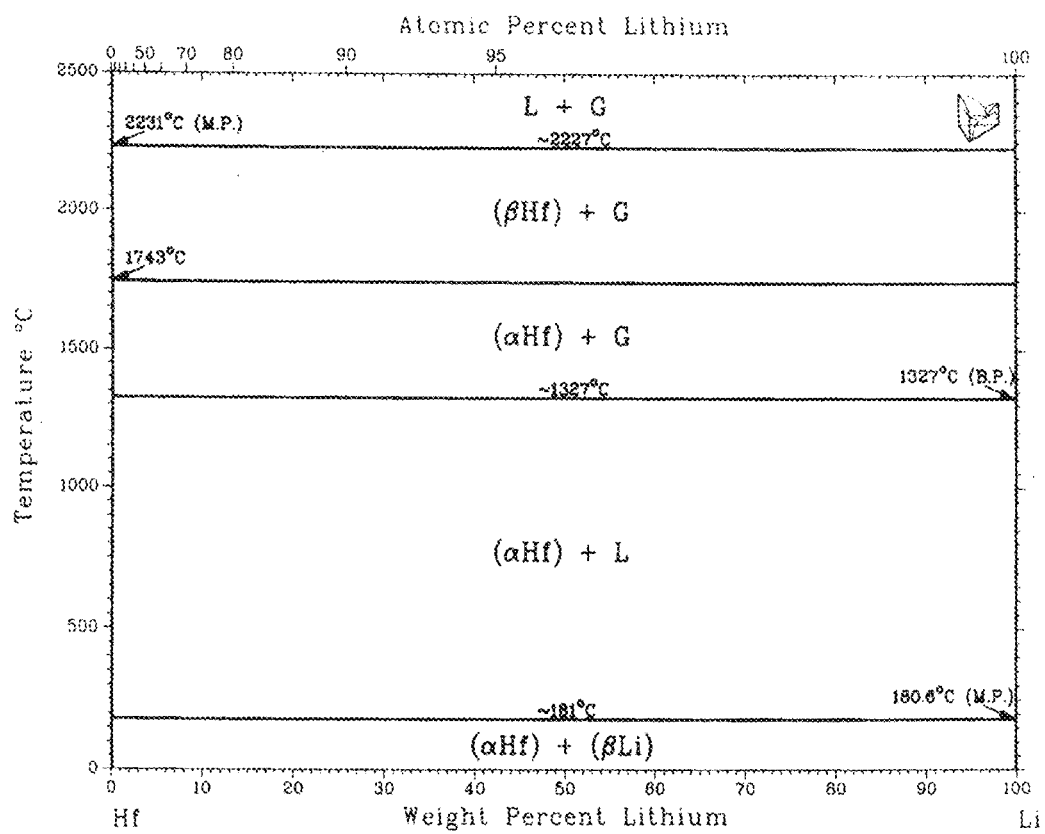
FIG. 21: Lithium — Hafnium Phase Diagram. (Ref. 2)

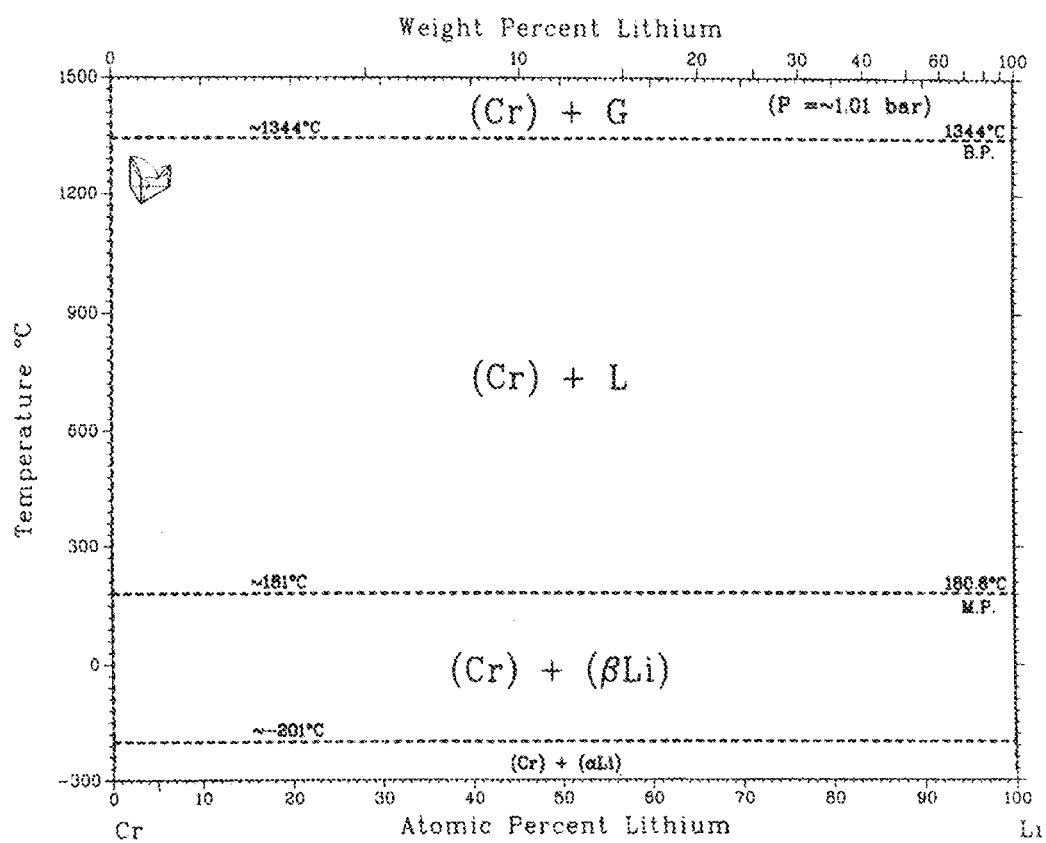
FIG. 22: Lithium – Chromium Phase Diagram. (Ref. 2)

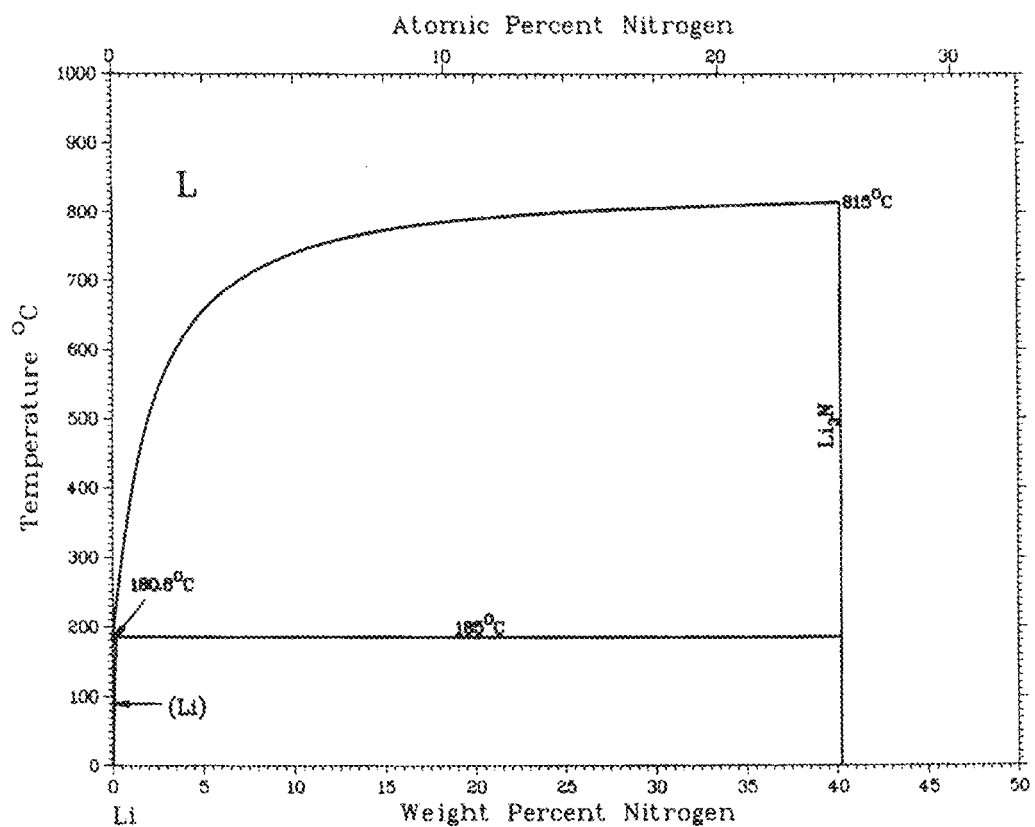
FIG. 23: Lithium – Nitrogen Phase Diagram. (Ref. 2)

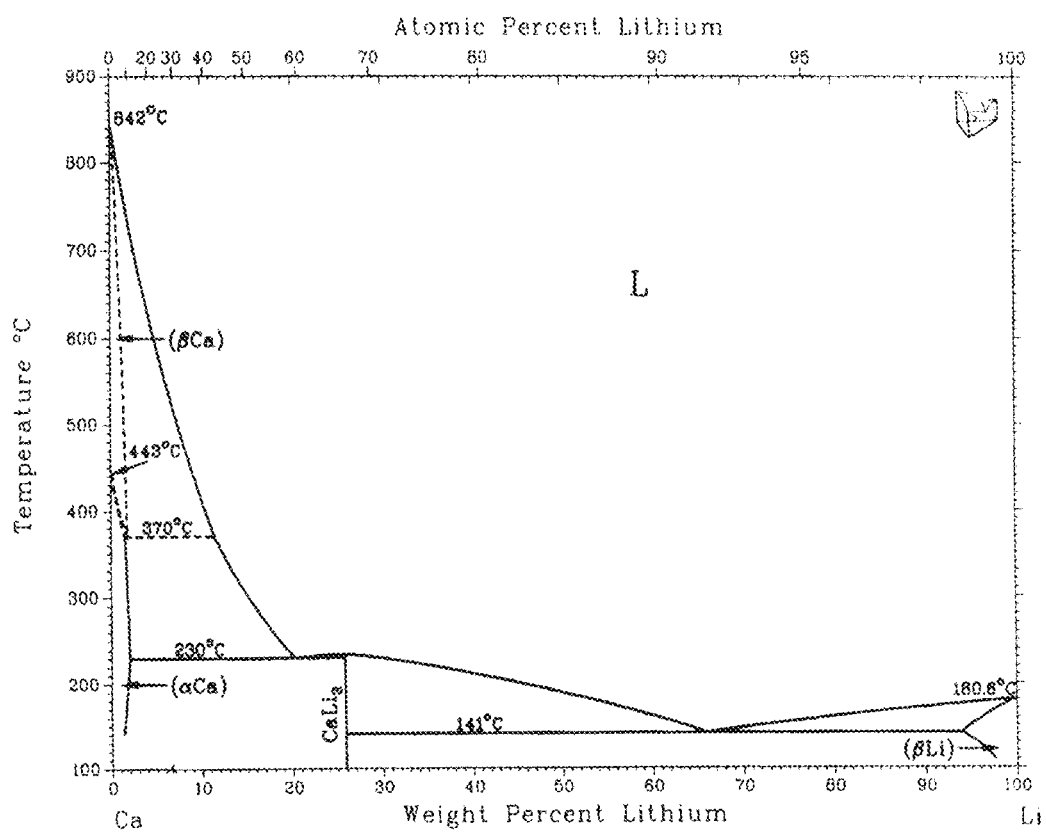
FIG. 24: Calcium - Lithium Phase Diagram. (Ref. 2)

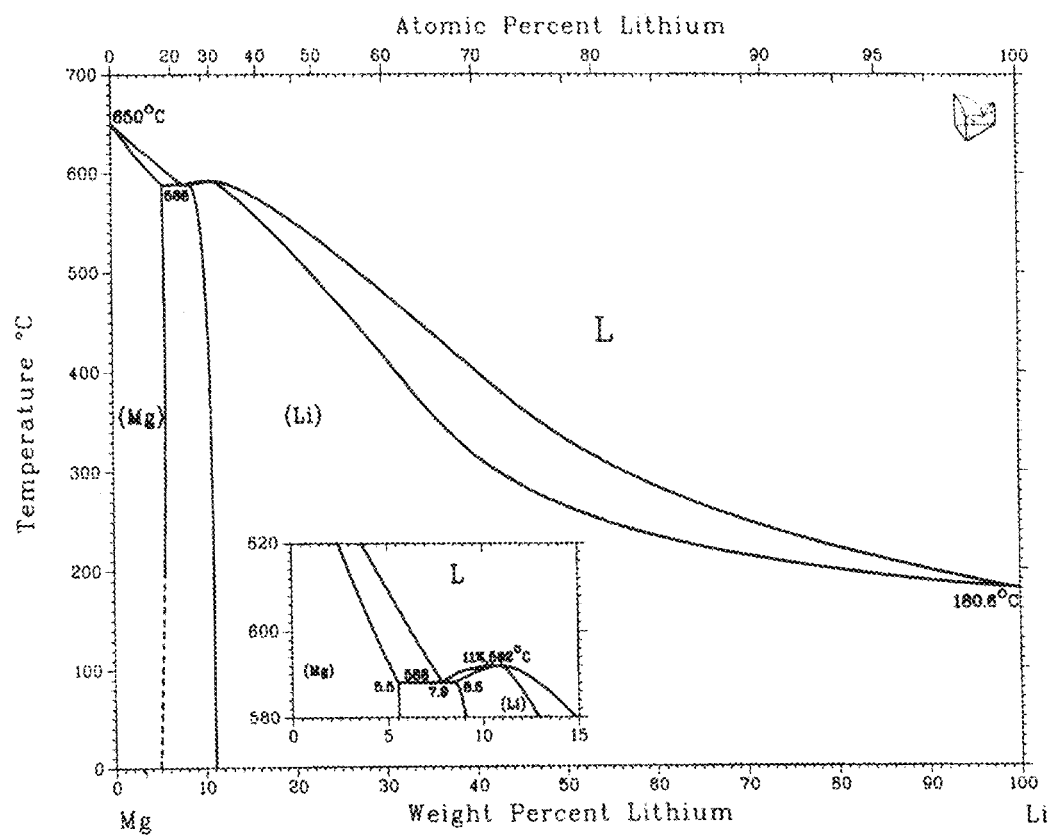
FIG. 25: Magnesium - Lithium Phase Diagram. (Ref. 2)

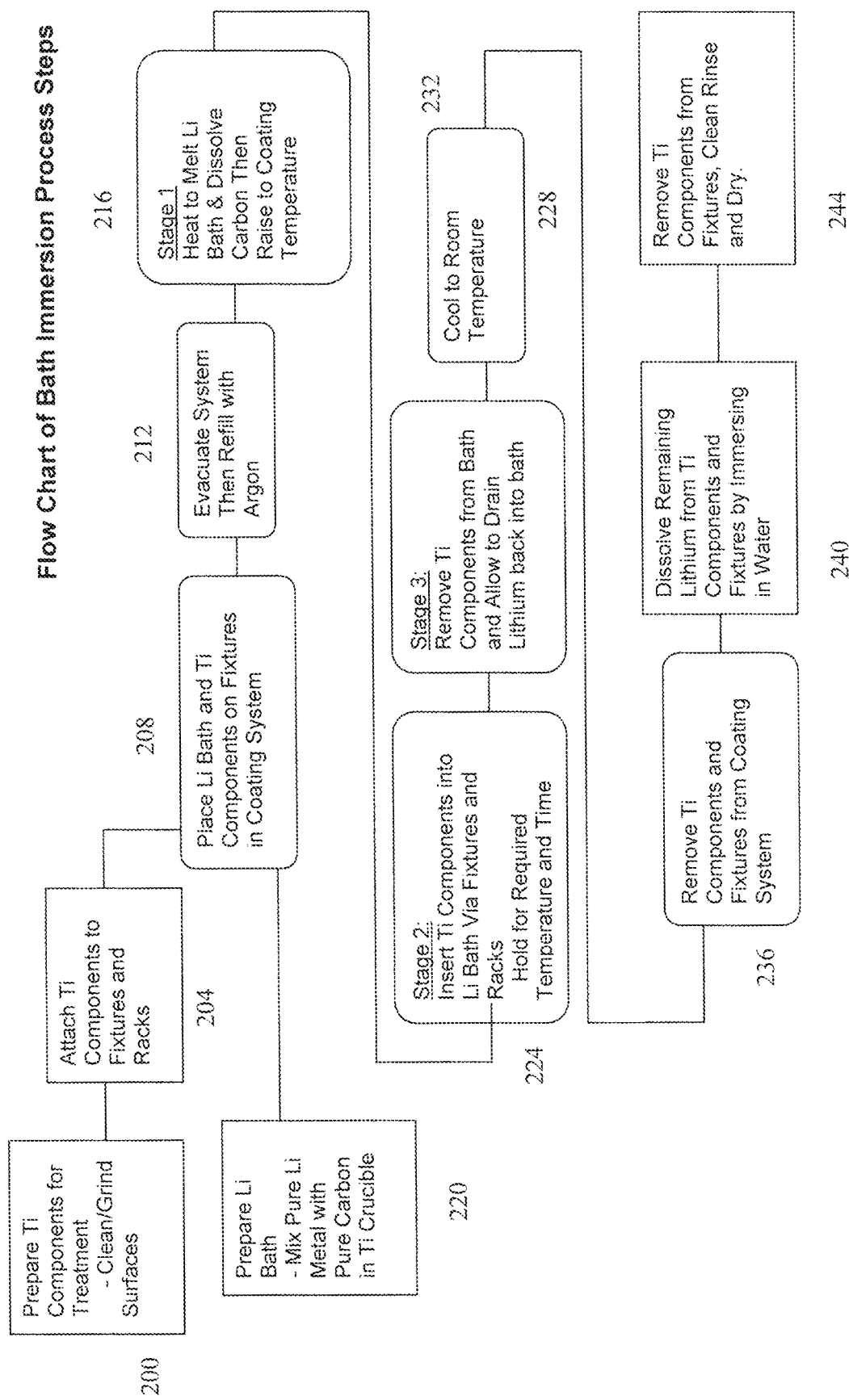
FIG. 26: Flow Chart for Basic Process Steps of Bath Immersion Method

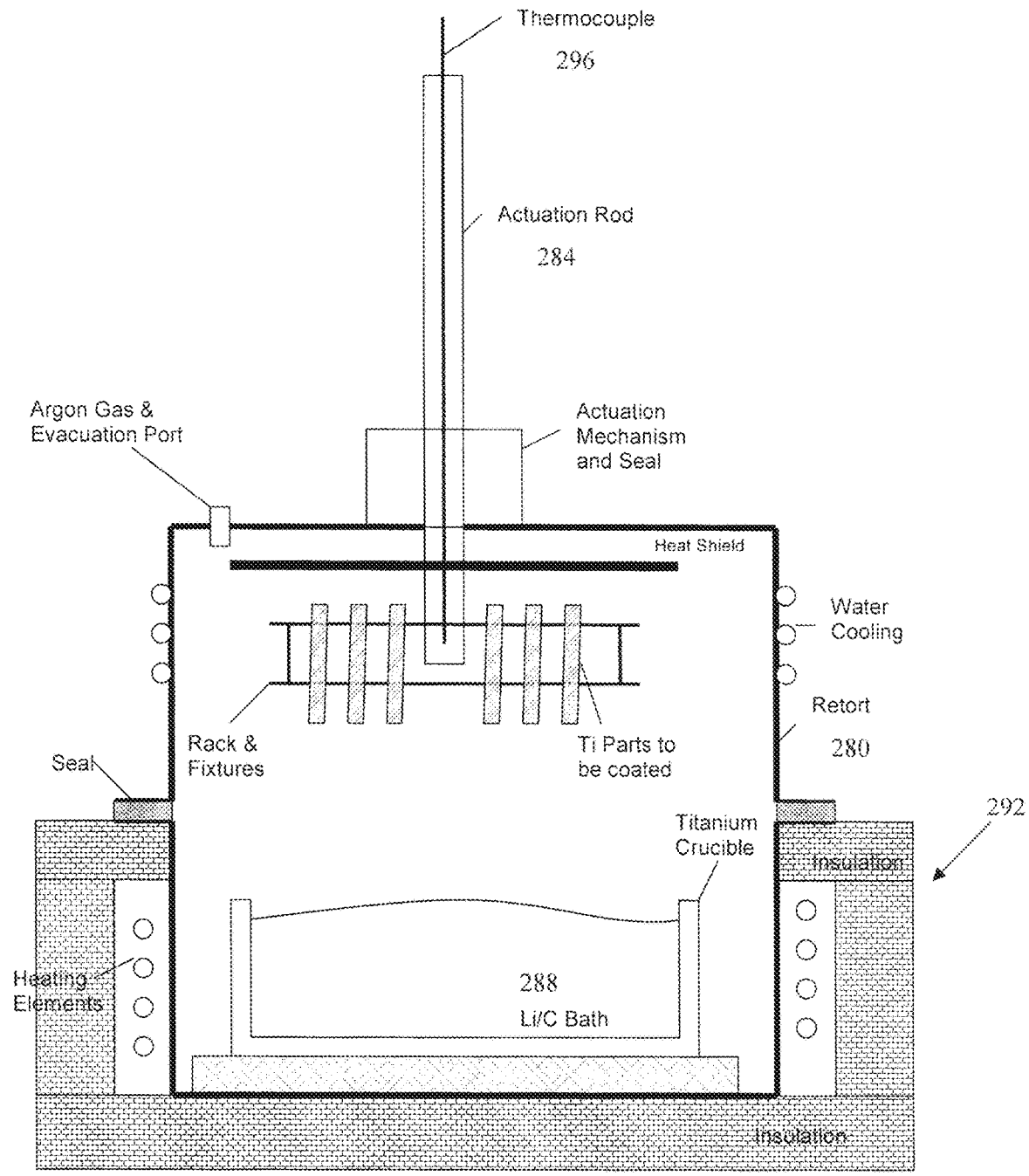
FIG. 27: Bath Immersion Coating System.

Bath Immersion Coating System - Basic Process Steps (Part 1)

Stage 1
Heat Lithium Bath to 900 °C

Bath Immersion Coating System - Basic Process Steps (Part 2)

Bath Immersion Coating System - Basic Process Steps (Part 3)

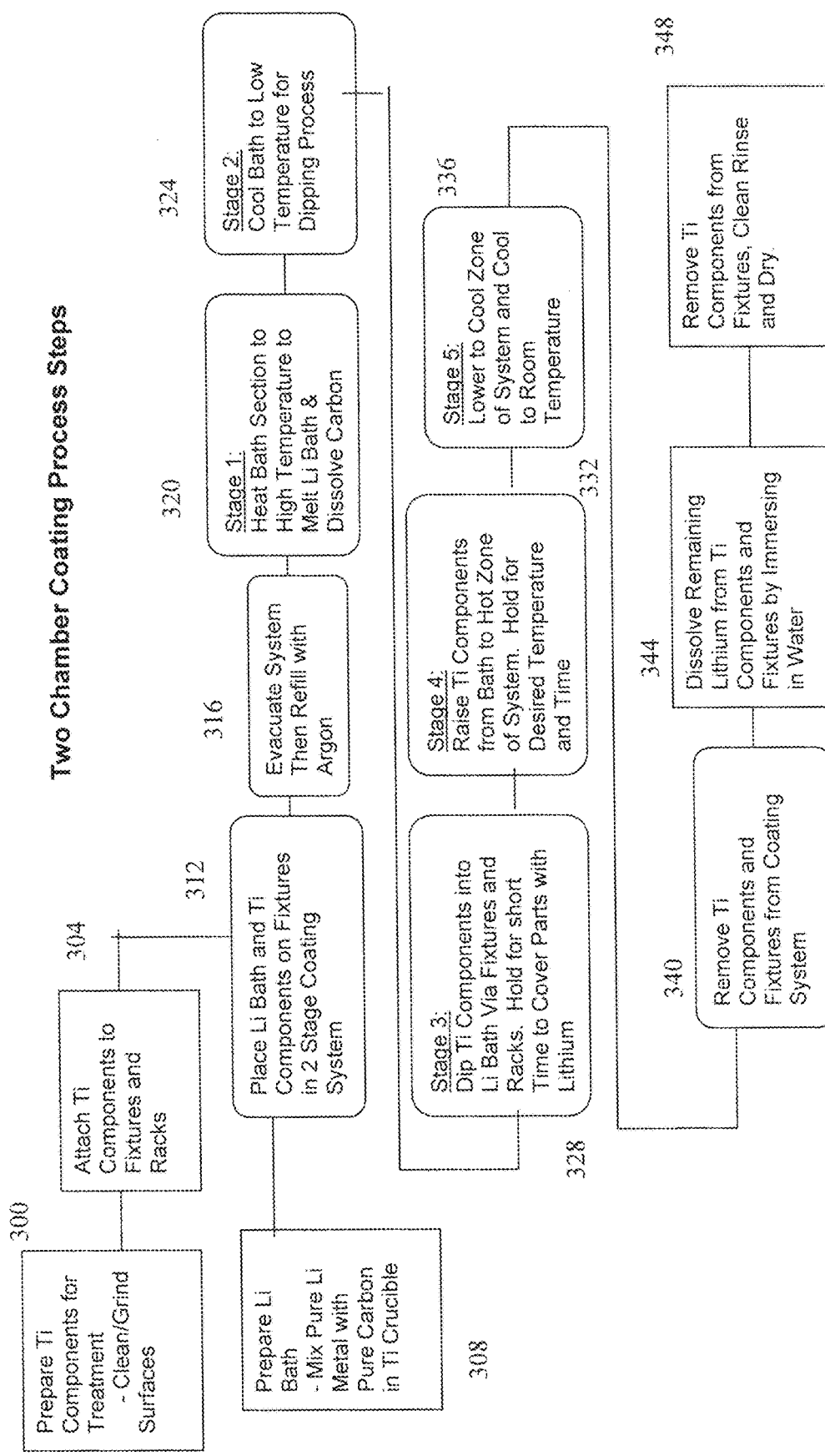
FIG. 29: Flow Chart for Basic Process Steps of Two Chamber Coating Method.

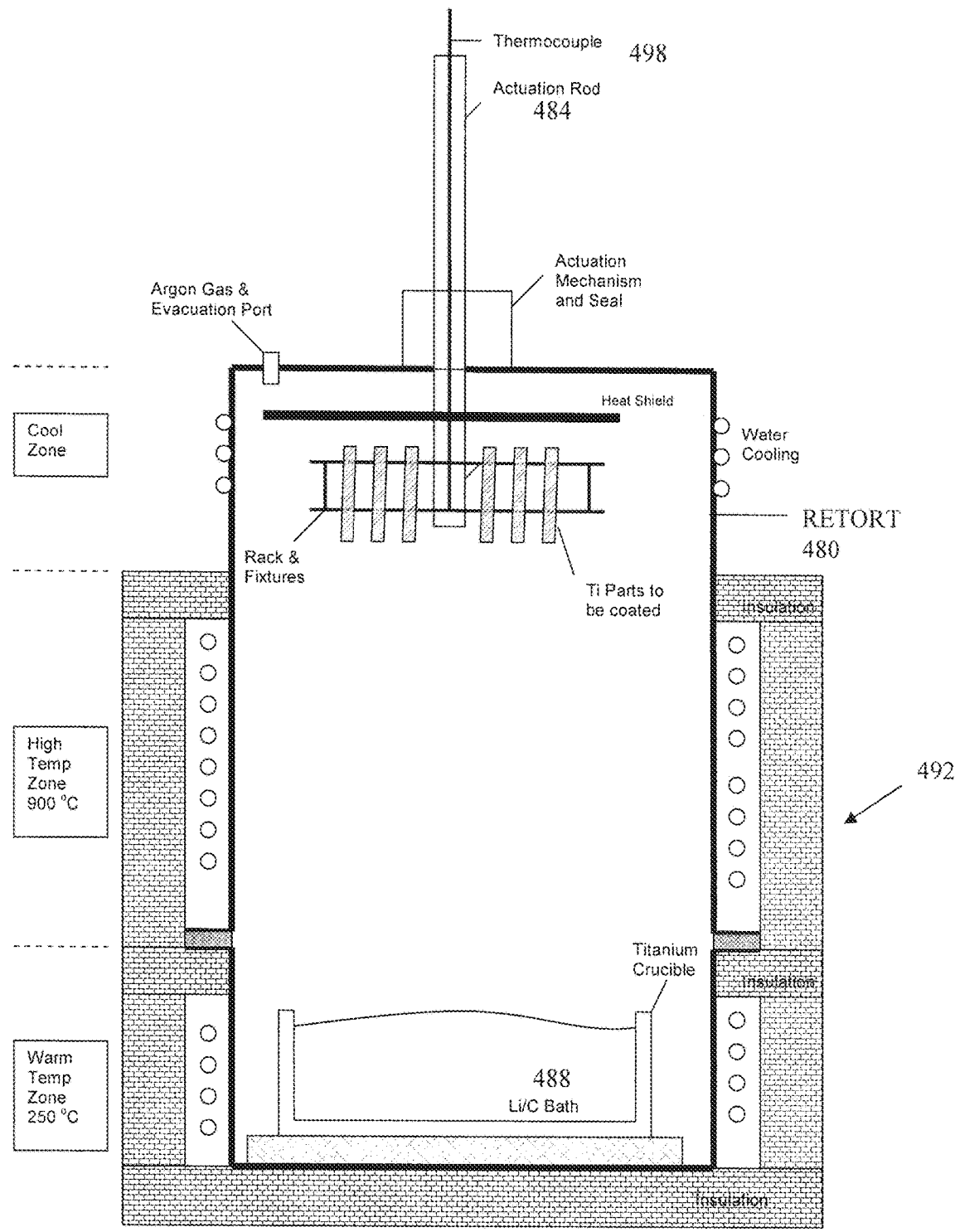
FIG. 30: Two Chamber Coating Process System.

Two Chamber Coating System - Basic Process Steps (Part 1)

Stage 1: Heat Bath to 900 °C to Dissolve Carbon

Two Chamber Coating System - Basic Process Steps (Part 2)

Stage 2: Cool Bath to 200 °C

Two Chamber Coating System - Basic Process Steps (Part 3)

Stage 3: Dip Ti Part in Li Bath
Hold for 5 Min. at 200 °C

Two Chamber Coating System - Basic Process Steps (Part 4)

Stage 4:   Raise Ti Parts to Hot Zone Hold for 2 to 4 Hrs. at 900 °C

Two Chamber Coating System - Basic Process Steps (Part 5)

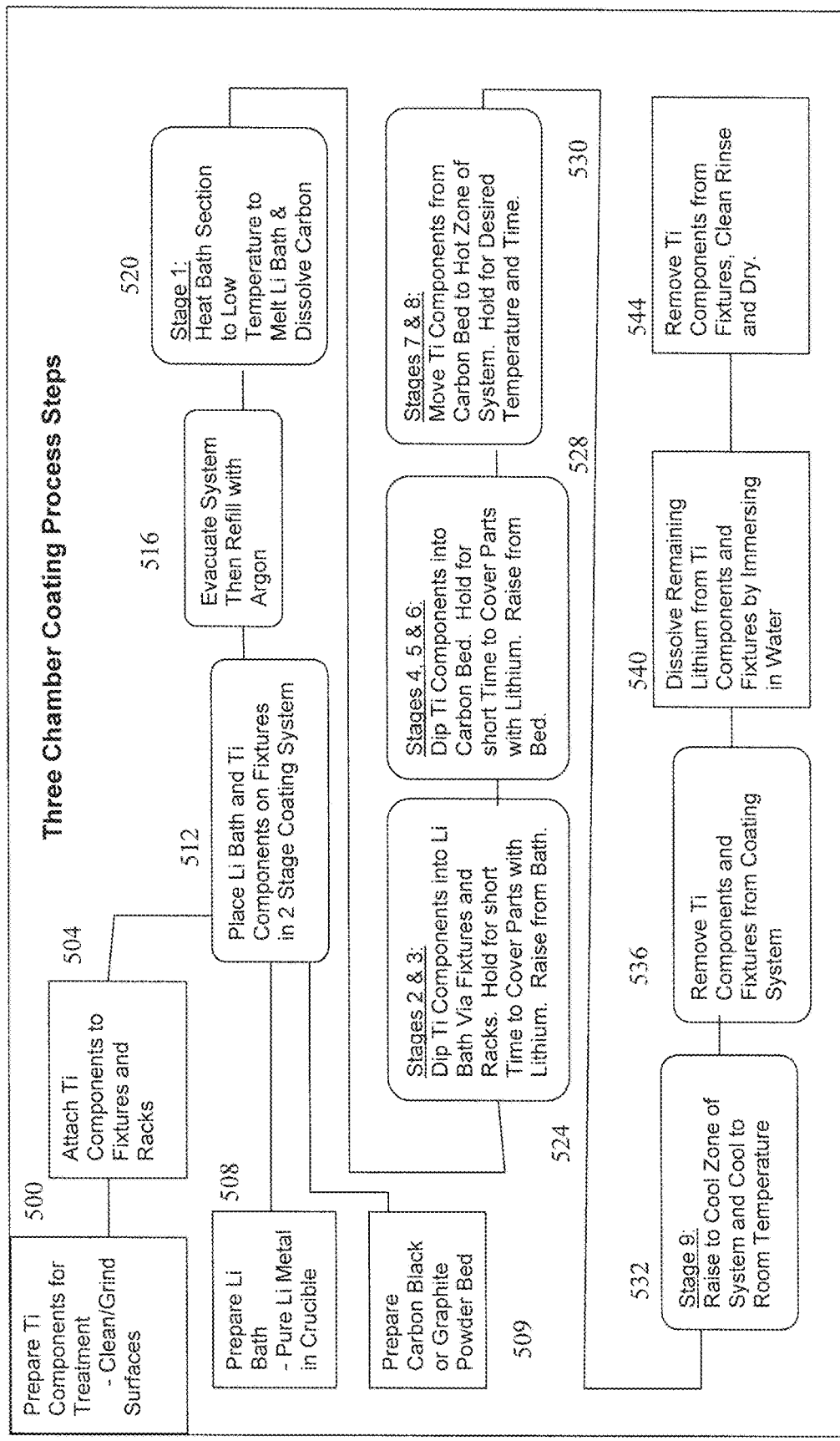
FIG. 32: Flow Chart for Basic Process Steps of Three Chamber Coating Method.

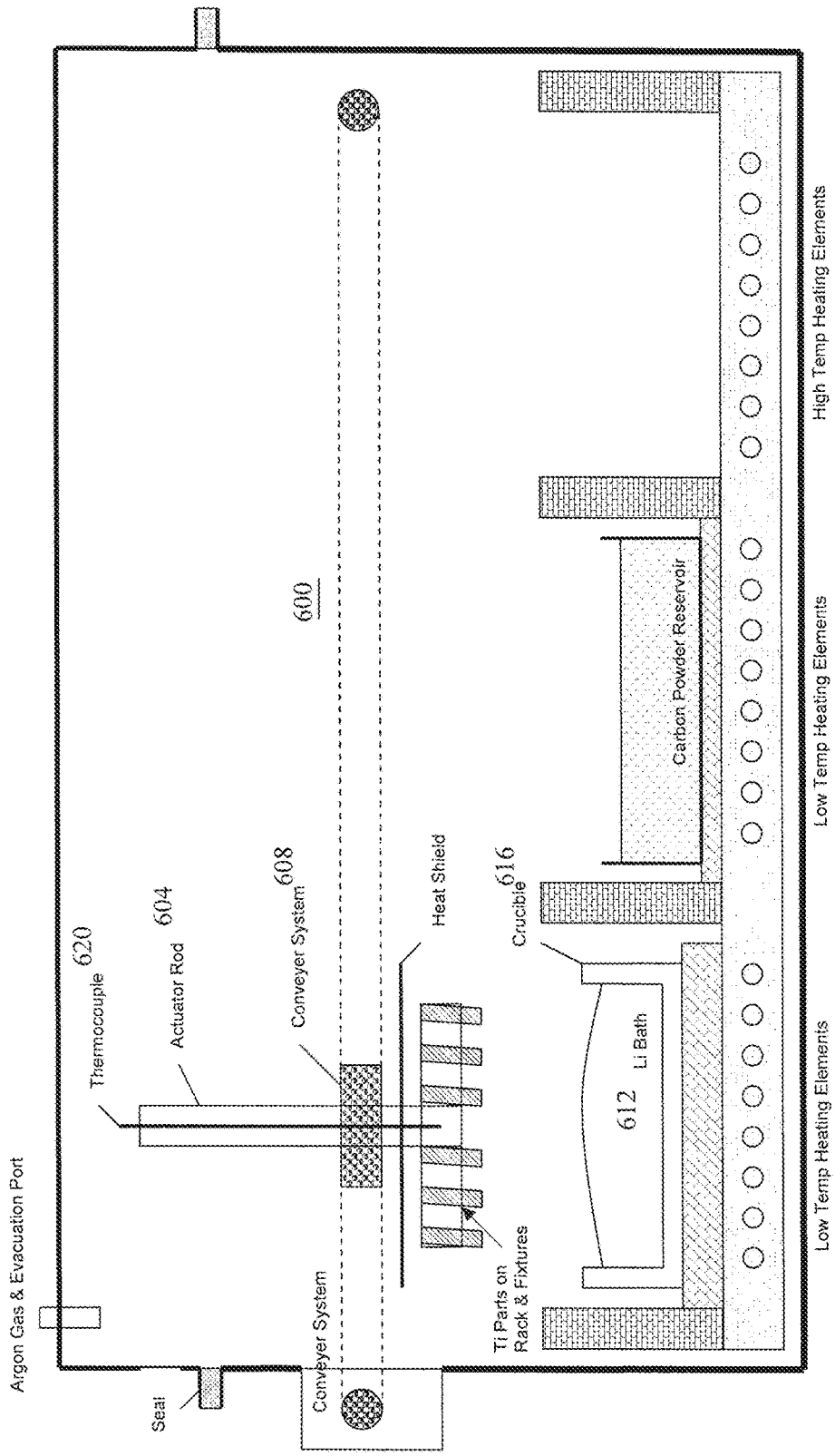
FIG. 33: Three Chamber Coating System.

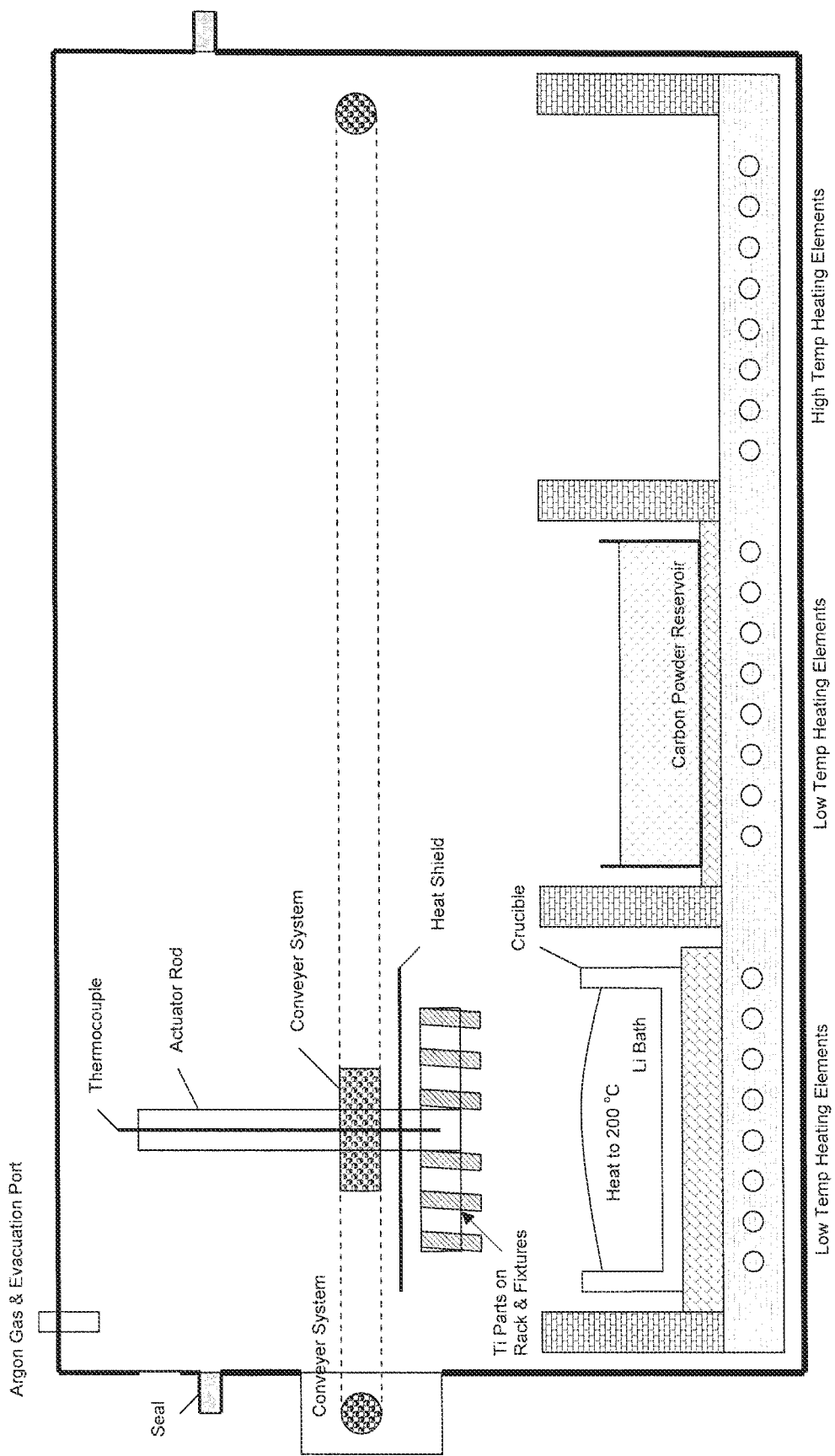
FIG. 34: Three Chamber Bath Coating System Process Stages: Stage 1: Heat Li Bath to 200 °C.

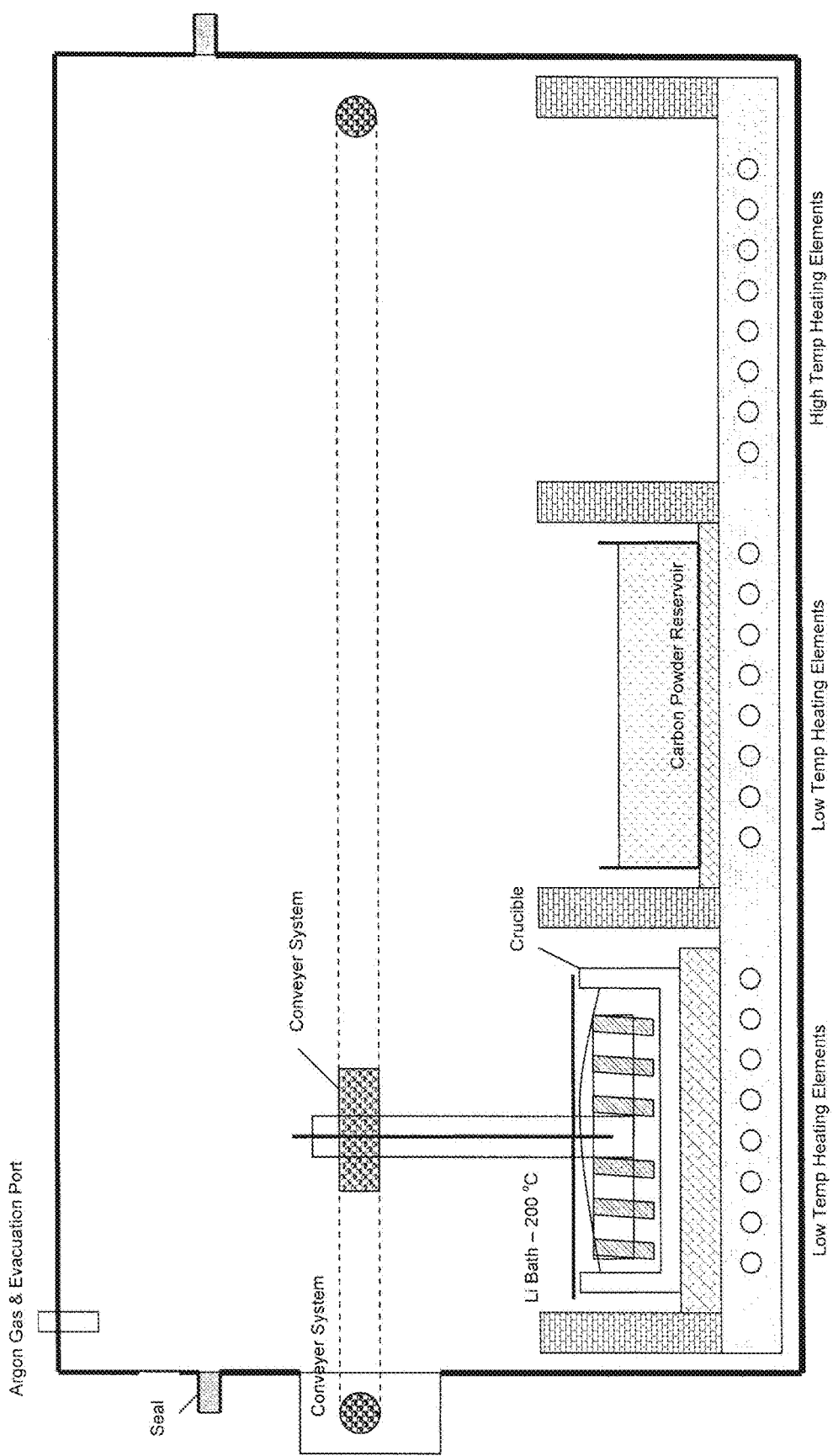
FIG. 35: Three Chamber Coating System Process Stages: Stage 2: Dip Ti Parts in Pure Li Bath.

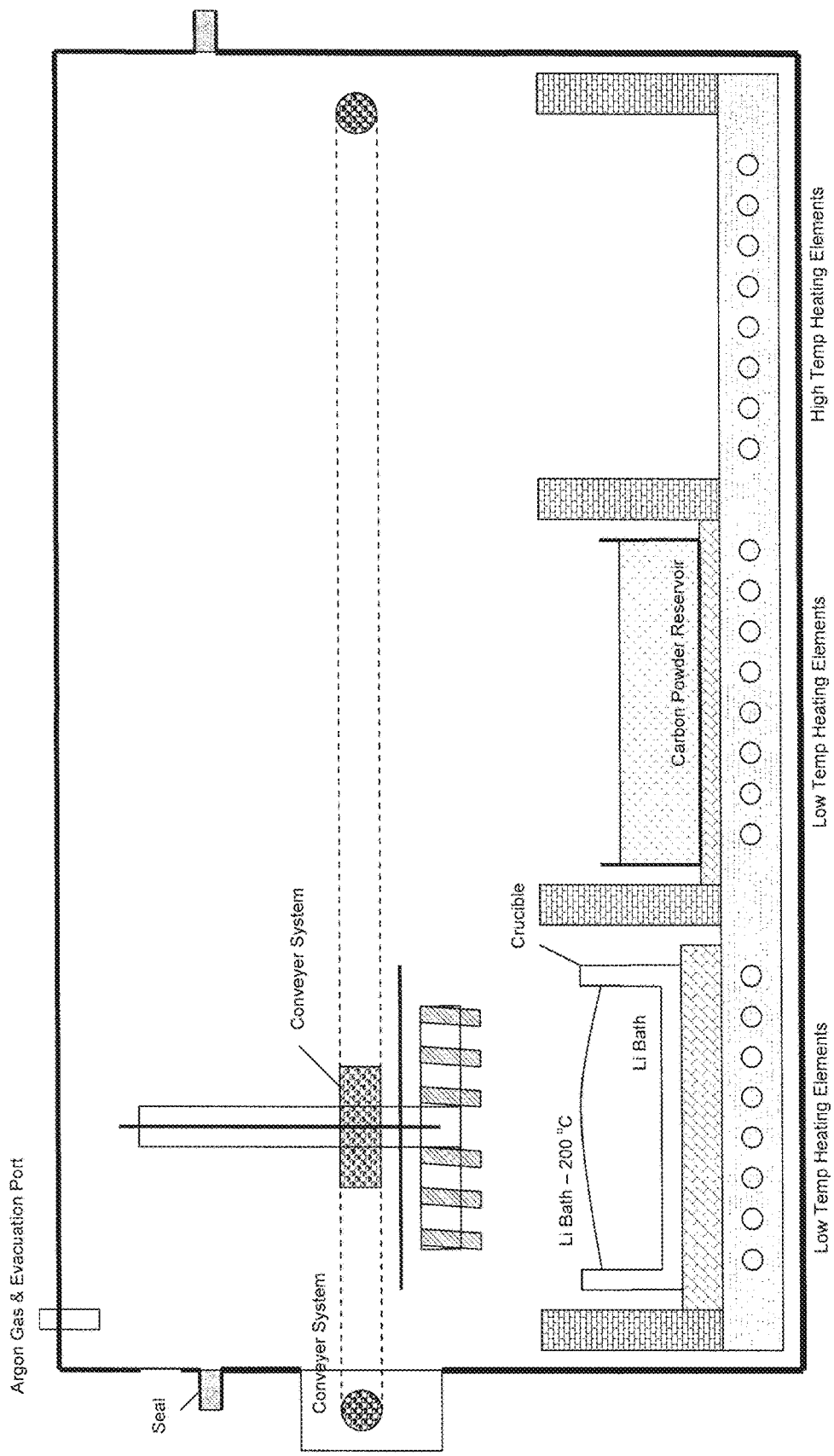
FIG. 36: Three Chamber Coating System Process Stages: Stage 3: Raise Ti Parts from Li Bath.

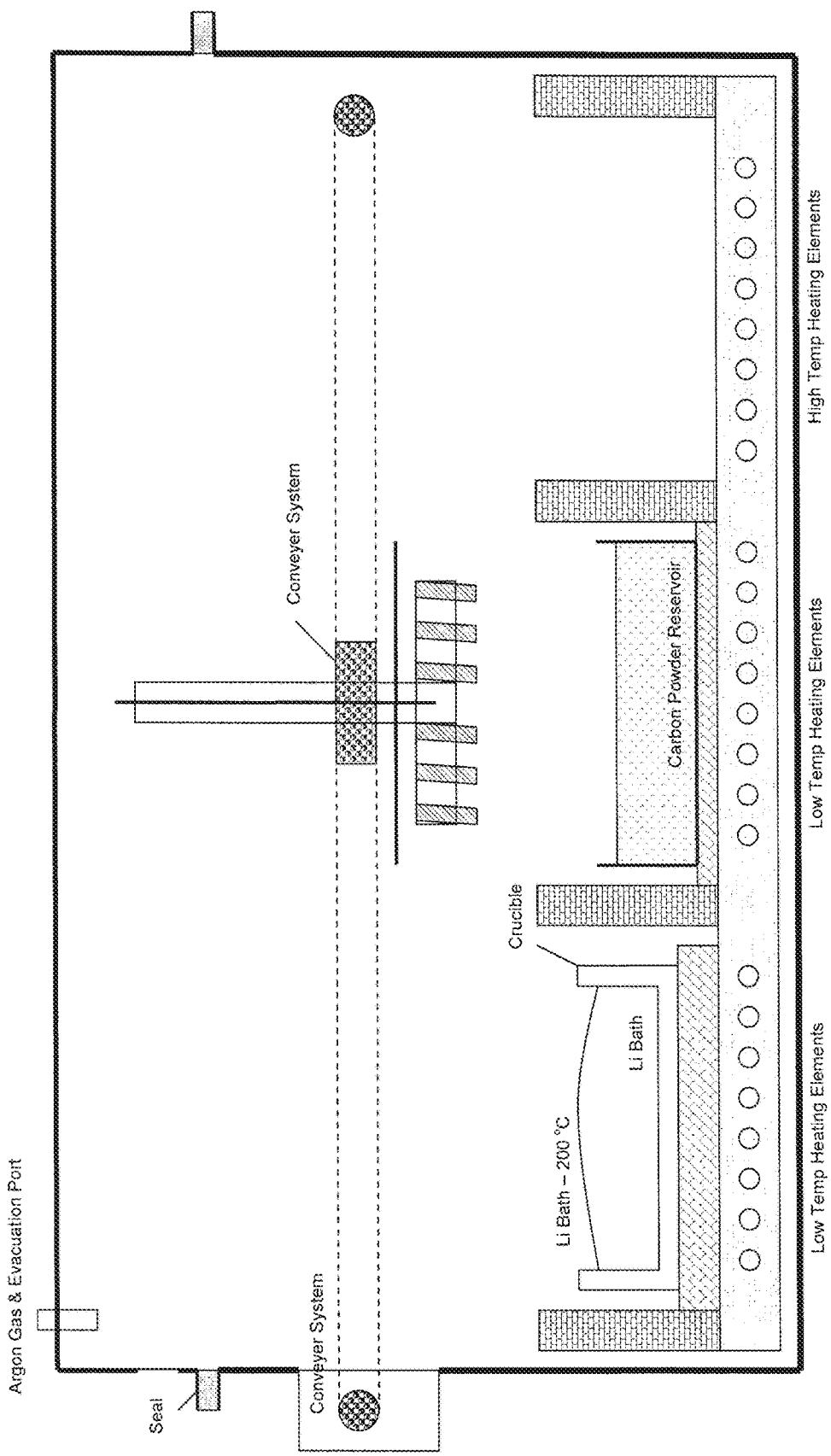
FIG. 37: Three Chamber Coating System Process Stages: Stage 4: Move Ti Parts to Carbon Dip Stage.

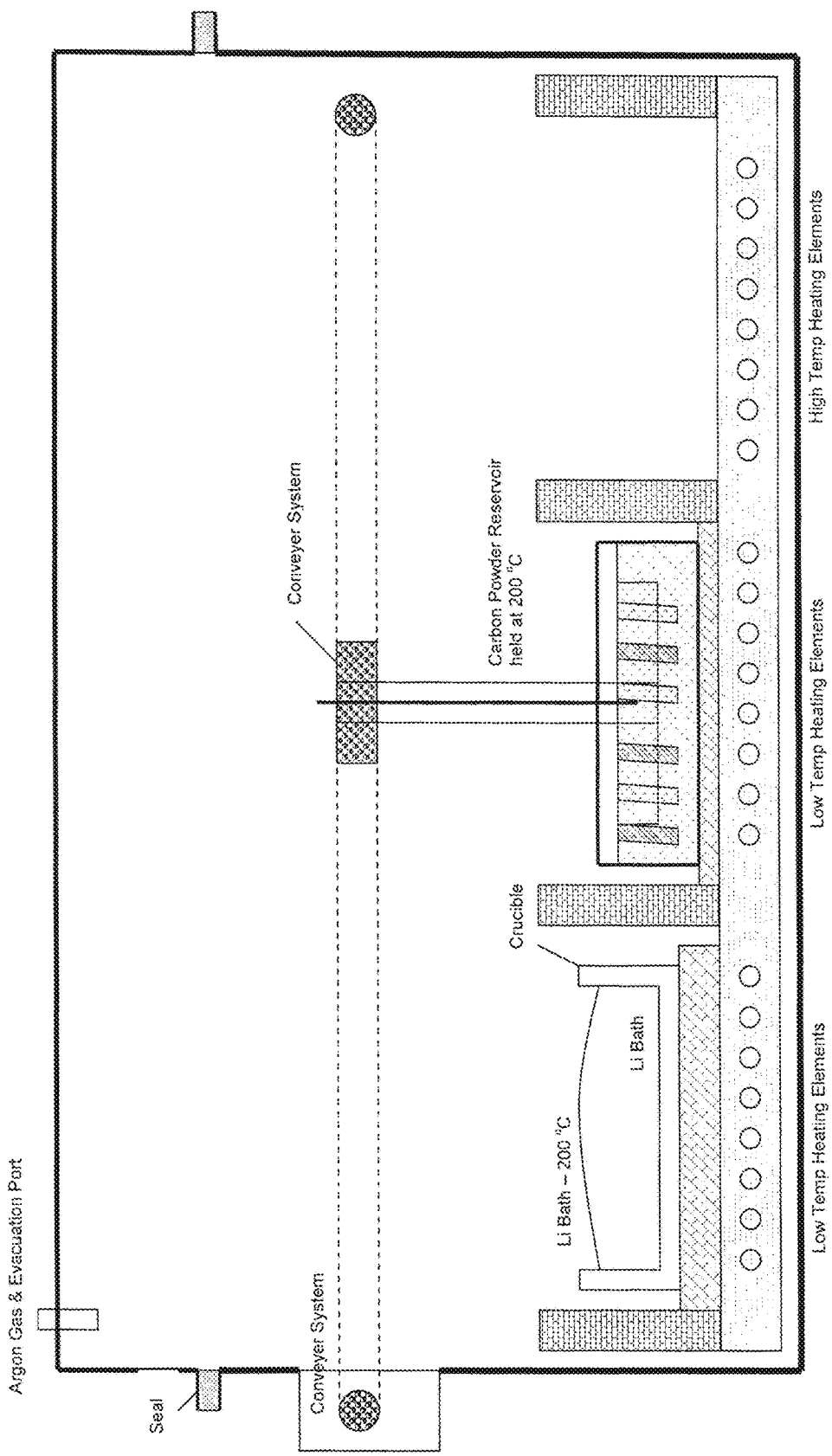
FIG. 38: Three Chamber Coating System Process Stages: Stage 5: Lower Ti Parts to Carbon Powder Bed.

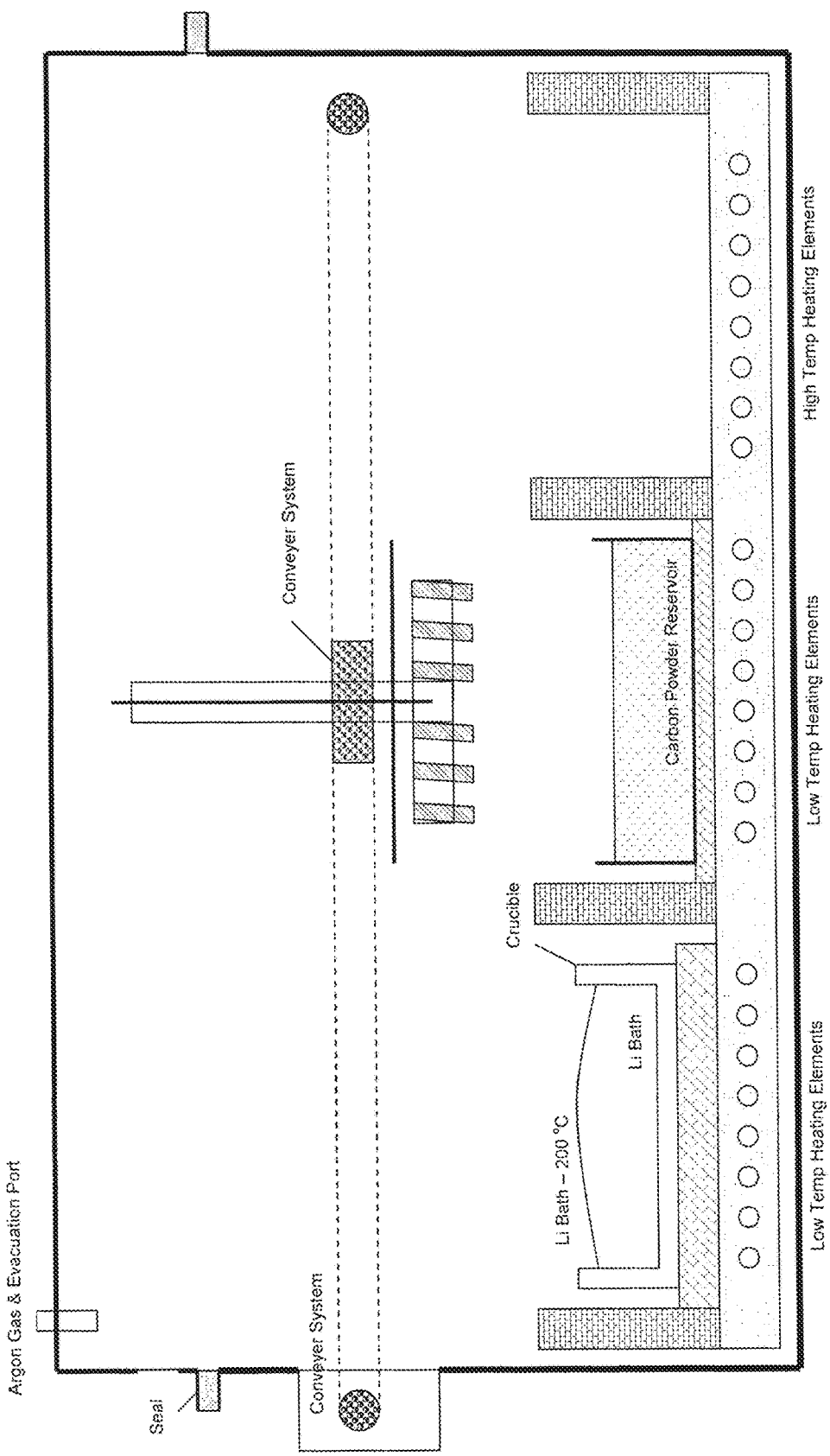
FIG. 39: Three Chamber Coating System Process Stages: Stage 6: Raise Ti Parts from Carbon Powder Bed.

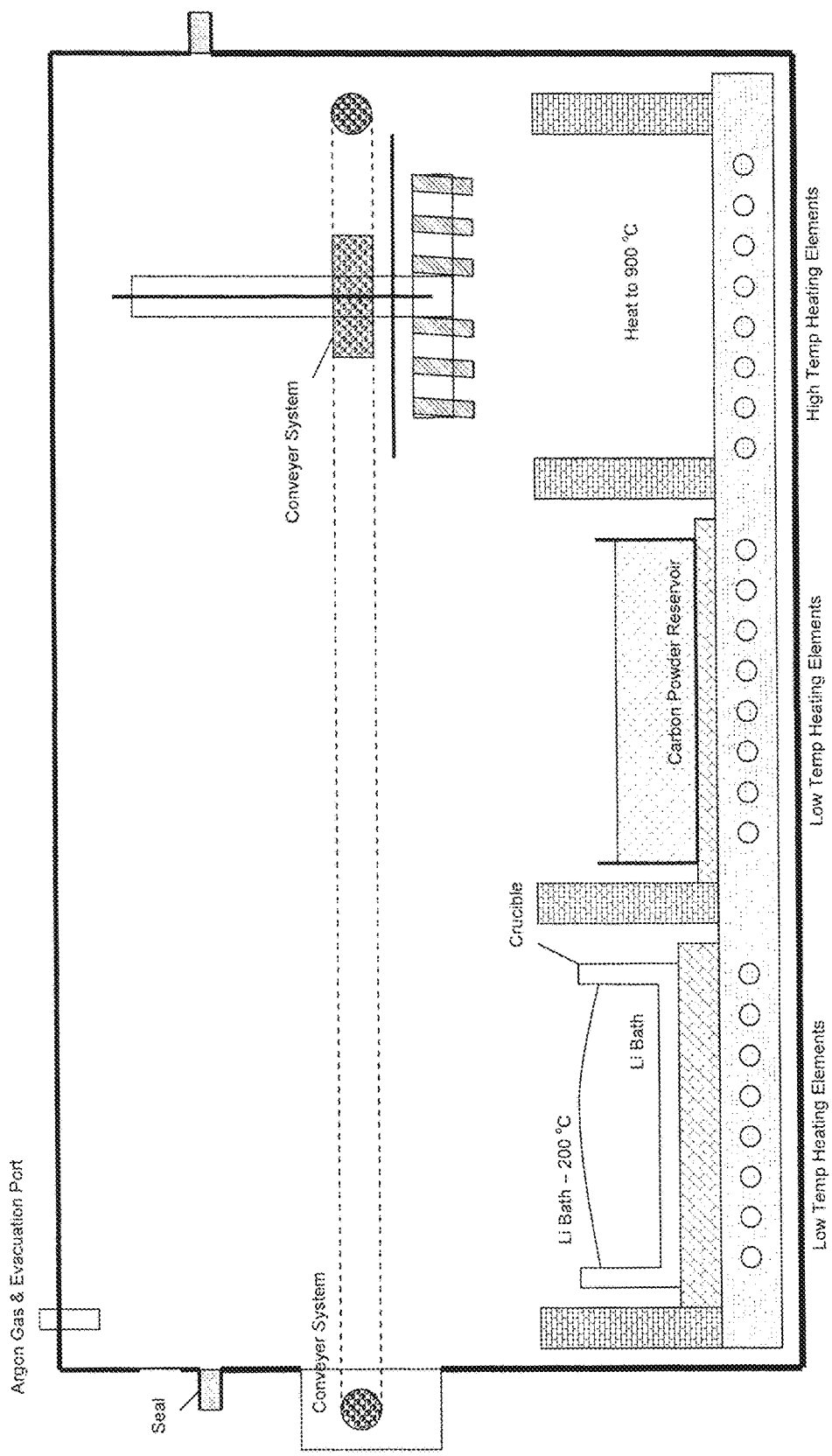
FIG. 40: Three Chamber Coating System Process Stages: Stage 7: Move Ti Parts to Furnace Hot Zone.

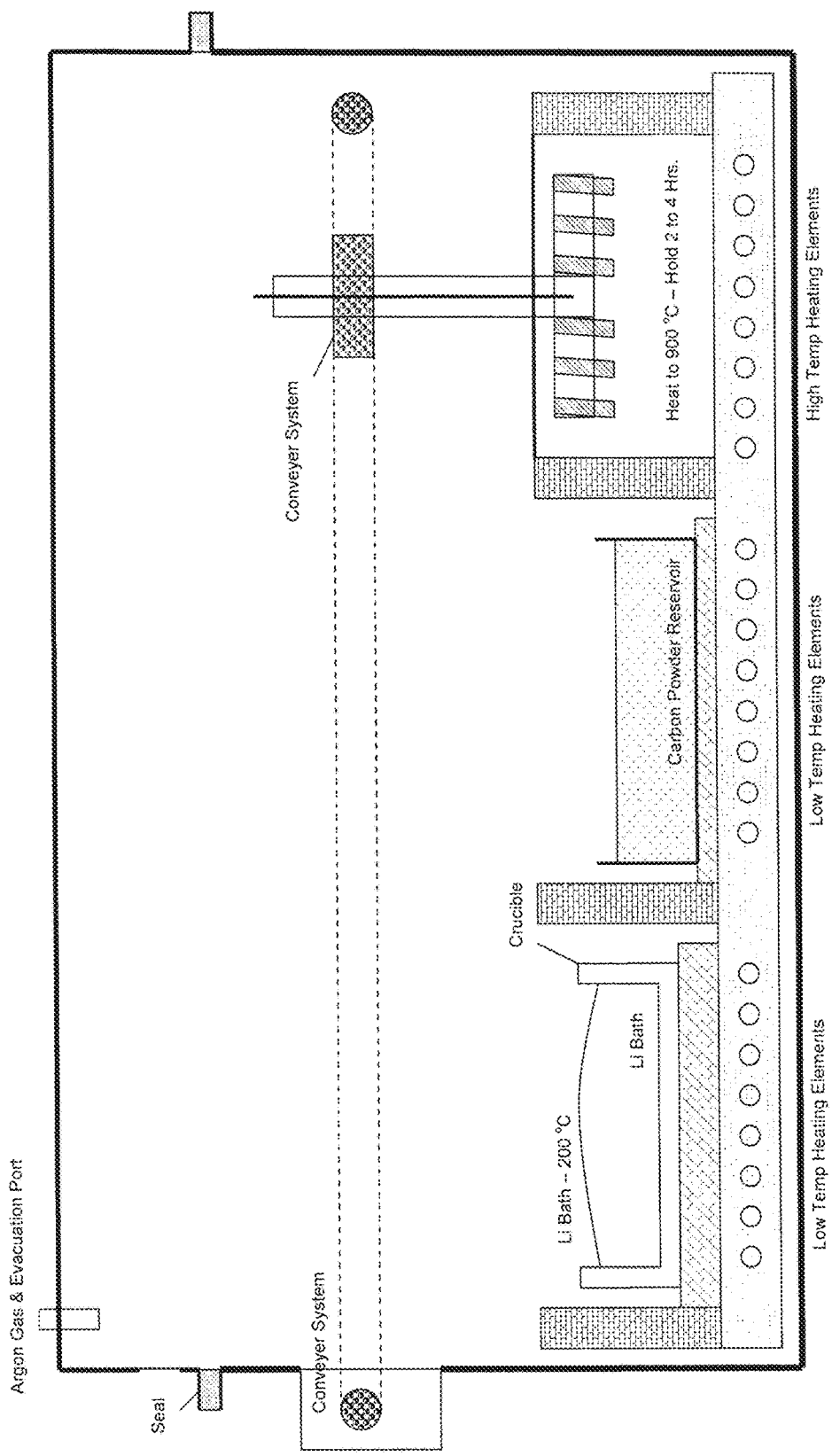
FIG. 41: Three Chamber Coating System Process Stages: Stage 8: Lower Ti Parts to Furnace Hot Zone & Hold for 2 – 4 Hrs.

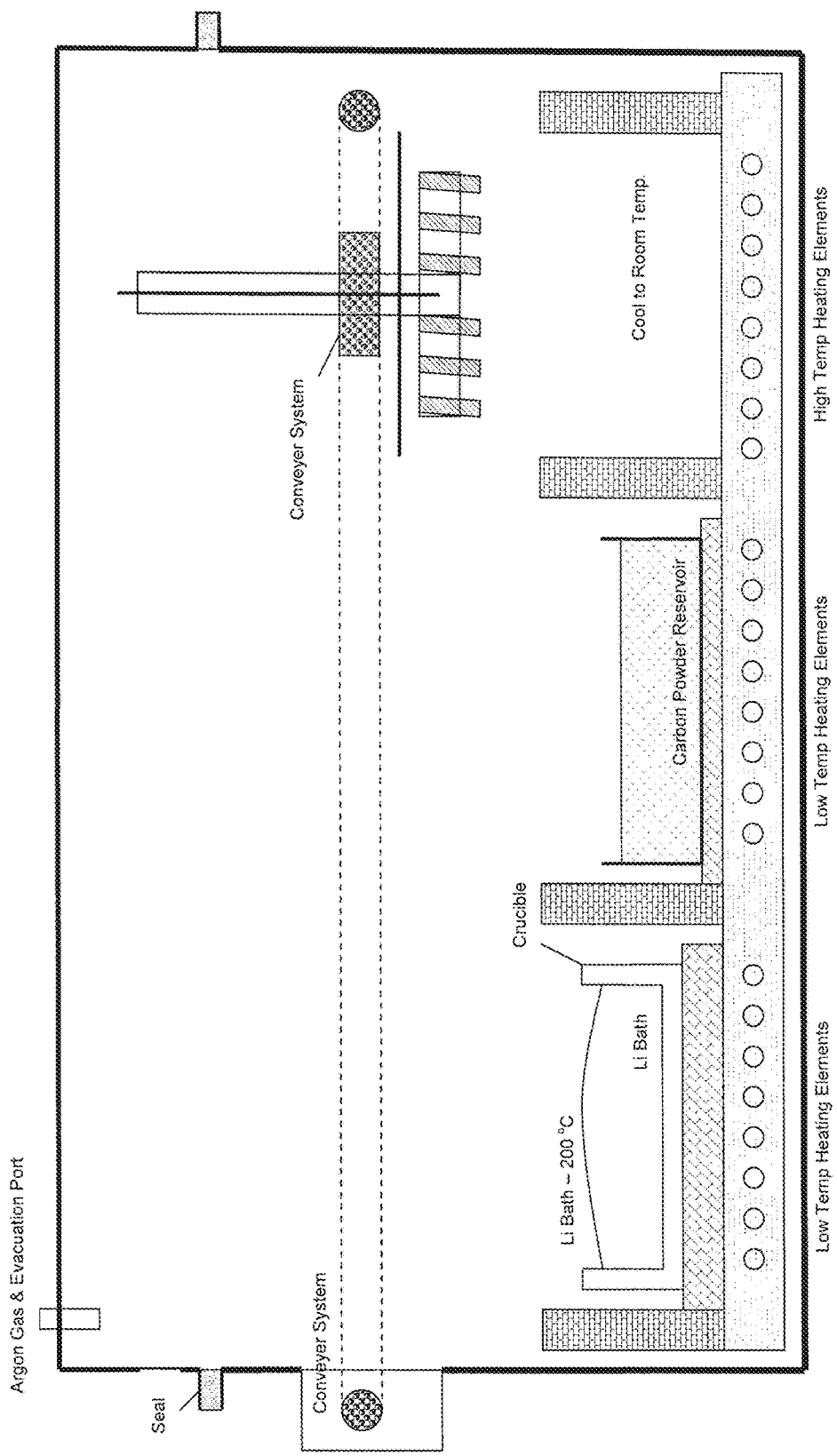
FIG. 42: Three Chamber Coating System Process Stages: Stage 9: Raise Ti Parts to Cool Zone & Cool to RT.

METHOD OF CARBURIZING TITANIUM AND TITANIUM ALLOYS

Outline of Basic Claims:
(See Attached Xcel File for Range of Claims)

METHOD CLAIMS:

I: IMMERSION METHOD

1) <u>Broadest Embodiment</u>: A method of diffusing elements into the surface of refractory metals and their alloys using a liquid alkali metal and/or alkaline-earth metal bath.

- Dissolving diffusing element in bath
- Contacting Refractory metal to bath
- Holding at a sufficient temperature and time to form desired conversion layer.
- Removing bath media from refractory metal.

To

<u>Narrowest Embodiment</u>: A method of diffusing Carbon into the surface of Pure Titanium metal using a liquid Lithium metal bath.

- Dissolving Carbon in Lithium bath
- Contacting Titanium metal to Li bath
- Holding at a sufficient temperature and time to form desired Carburized layer.
- Removing Lithium media from Titanium metal.

II: SURFACE WETTING METHOD

2) <u>Broadest Embodiment</u>: A method of diffusing elements into the surface of refractory metals and their alloys using a liquid alkali metal and/or alkaline-earth metal coating.

- Coating Refractory metal with liquid metal layer
- Introducing element to be diffused to coated Refractory metal
- Holding at a sufficient temperature and time to form desired conversion layer.
- Removing coated metal layer from refractory metal.

Narrowest Embodiment: A method of diffusing Carbon into the surface of Pure Titanium metal using a liquid Lithium metal coating.

- Coating Titanium metal with Lithium layer
- Introducing Carbon to be diffused to coated Titanium metal
- Holding at a sufficient temperature and time to form desired conversion layer.
- Removing coated Lithium layer from Titanium metal.

III.   TRANSPORT SYSTEM:

1) A method of designing a transport system, by selecting an appropriate diffusing media (alkali metal and/or alkaline-earth metal bath or coating) to act as a diffusing agent for selected refractory metal and diffusing element to result in required diffusion.

- Selecting a bath which does not act to dissolve the refractory metal at required temperature, but does dissolve enough of diffusing element.
- Selecting required temperature and time to generate required diffusion.

PRODUCT CLAIMS:

1) Broadest Embodiment:   A refractory metal with a stable Carbide or Nitride conversion layer with no associated deterioration due to Hydrogen embrittlement or surface oxidation.

To

Narrowest Embodiment:   A titanium metal with a Stable Carbide conversion layer with no associated deterioration due to Hydrogen embrittlement or surface oxidation.

Fig. 45

SYSTEM AND METHOD FOR SURFACE HARDENING OF REFRACTORY METALS

CROSS-REFERENCE TO RELATED APPLICATIONS

This patent application is a continuation of U.S. Ser. No. 11/961,276 filed Dec. 20, 2007, which is related to provisional patent application Ser. No. 60/871,478, filed Dec. 22, 2006, to which Applicants claim the benefit of the earlier filing date. These applications are incorporated herein by reference and made a part hereof.

BACKGROUND OF THE INVENTION

1. Field of the Invention

The invention concerns diffusion of Carbon into a refractory metal, such as Titanium. Although diffusion of Carbon into Iron (another metal) is well-known, that type of process is not applicable to Titanium, for various technical reasons which are described herein.

2. Description of the Related Art

Refractory metals, such as Titanium, have the desirable property of being stable at high temperatures. However, they are considered soft, and are impractical to use in applications where hardness is important, such as in gears.

Coating systems have been developed, wherein a thin, hard, protective layer of material is applied to the surface of a refractory metal. However, the thin coatings are not durable, and are soon worn away. Further, difficulties are encountered in bonding the thin layer to the refractory metal, resulting in occasional disbonding of the thin coating from the refractory material.

In the prior art (U.S. Pat. No. 5,135,782 issued Aug. 4, 1992 to Rostoker et al.), Silicon was applied to a Titanium surface in a process which formed a Titanium Silicide layer.

In that prior art, the alkali metal was used as a flux to liquefy Silicon at a low enough temperature to react with a Titanium surface without deleteriously affecting the base Titanium alloy.

Gas Carburization of a Titanium surface today could only be done with Carbon compound such as Methane ($CH_4$) or Carbon Monoxide (CO) gas. Carbon cannot exist as a pure gas at a temperature less than 4800° C. It must be in compound form in order to be in a gas phase. The problem therein lies that the other elements in the compound react with deleteriously with the Titanium metal substrate.

The problems associated with carburizing with a methane gas compound are illustrated in FIGS. 5 thru 8. It should be noted that the illustrations in these Figs. attempt to show accurate relative size of the atoms involved. However, the density of gas molecules is shown for illustrative purposes in FIGS. 5 and 6. In reality there may be only one Methane molecule for every 100 surface Titanium atoms. FIG. 5 illustrates the surface of pure Titanium being exposed to methane gas at a reasonably elevated temperature such as 900° C. By definition, a gas phase consists of sparse molecules of the compound moving randomly in space. At elevated temperatures, the gas phase is even sparser and molecules are moving more erratically and even higher speeds than can be illustrated in this image. In this scenario, diffusion will only occur on a limited basis as a Methane molecule impacts the Titanium surface and reacts with the Ti atom. For the reaction to occur, the Hydrogen atoms would disassociate from the Carbon atom of the Methane molecule and the Carbon would bond with a Titanium atom to form a Titanium Carbide molecule. The problem is, as shown in FIG. 6, that the disassociated Hydrogen atoms will now diffuse through the Titanium structure and form Titanium Hydride ($TiH_2$) molecules. In fact, Titanium has a high affinity for Hydrogen. Titanium is known to have a high solubility of elemental Hydrogen and $TiH_2$ is thermodynamically stable. In short, the Titanium will form a stable Titanium Hydride phase before it forms a Carbide phase. The resulting structure on an atomic scale is shown in FIG. 7, where Hydrogen has diffused deep into the Titanium surface forming extensive Titanium Hydride with little Titanium Carbide phase. The TiC molecules are so disperse that the surface will appear as a Titanium Hydride phase with dissolved TiC molecules. FIG. 8 shows an illustration of how a cross-section of the resulting surface would appear, with a thick stable Titanium Hydride phase on the surface and a substrate with extensive dissolve Hydrogen.

The overall problem with this scenario is that Hydrogen is embrittling to Titanium. The resulting material with the structure shown in FIG. 8 would be brittle and fracture easily in any application. This therefore precludes this method from being used to harden a Titanium surface.

To avoid the Hydrogen embrittlement problem a different Gas could be used to Carburize Titanium such as Carbon Monoxide. The problems associated with carburizing with a Carbon Monoxide gas compound are illustrated in FIGS. 9 thru 12. FIG. 9 illustrates the surface of pure Titanium being exposed to Carbon Monoxide gas at a reasonably elevated temperature such as 900° C. In this scenario, diffusion will only occur on a limited basis as a Carbon Monoxide molecule impacts the Titanium surface and reacts with a Ti atom. For the reaction to occur, the Oxygen atom would disassociate from the Carbon atom of the Carbon Monoxide molecule and the Carbon would bond with a Titanium atom to form a Titanium Carbide molecule. The problem is, as shown in FIG. 10, that the disassociated Oxygen atoms will now diffuse through the Titanium structure and form Titanium Oxide ($TiO_2$) molecules. In fact, Titanium has a high affinity for Oxygen. Titanium is known to have a high solubility of elemental Oxygen and $TiO_2$ is thermodynamically stable. In fact, Titanium is known to disassociate Carbon Monoxide absorb only the Oxygen and discard, not even react with the remaining Carbon atoms. The resulting structure on an atomic scale is shown in FIG. 11, where Oxygen has diffused deep into the Titanium surface forming extensive Titanium Oxide with little Titanium Carbide phase. The TiC molecules are so disperse that the surface will appear as a Titanium Oxide phase with dissolved TiC molecules. FIG. 12 shows an illustration of how a cross-section of the resulting surface would appear, with a thick stable Titanium Oxide phase on the surface and a substrate with extensive dissolved Oxygen.

As with Hydrogen, the overall problem with this scenario is that Oxygen is embrittling to Titanium. The resulting material with the structure shown in FIG. 12 would be brittle and fracture easily in any application. This therefore precludes this method from hardening a Titanium surface.

What is needed, therefore, is a system and method for overcoming one or more of the problems of the prior art.

SUMMARY OF THE INVENTION

The present invention provides advances in the hardening of refractive metals.

An object of the invention is to provide an improved process for hardening refractory metals.

A further object of the invention is to provide mechanical components, such as bearings and gears, constructed of refractory metals, yet which have hardness exceeding that of the native metal.

In one form of the invention, carbon is dissolved, or suspended, in fused, molten lithium. The carbon-lithium solution is brought into contact with a titanium substrate. At high temperature, the carbon diffuses into the titanium. However, the lithium is essentially insoluble in the titanium, and does not react with the titanium. After a period of diffusion, the solution is removed from the titanium, leaving a diffused region of titanium carbide within the titanium.

In other forms of the invention, the components can be altered. Other elements and compounds can replace the carbon, lithium, and titanium.

In one aspect, one embodiment of the invention comprises an object, comprising an inner region consisting of titanium, or a titanium alloy, of 95 to 100 weight percent purity and an outer region, adjacent to and outside the inner region, which contains only titanium and carbon, titanium and nitrogen, or titanium, carbon, and nitrogen, plus trace elements not exceeding 5 to 0 weight percent total In another aspect, another embodiment of the invention comprises an object, comprising an inner region which contains only chemical elements selected from the following Group 1, which contains titanium, vanadium, zirconium, hafnium, tungsten, molybdenum, or chromium, or alloys of these, no other elements, except trace elements not exceeding 5 weight percent; and an outer region, adjacent to and outside the inner region, which contains only chemical elements of Group 1 and carbon, nitrogen, or both carbon and nitrogen and no other elements, except trace elements not exceeding 5 weight percent total.

In still another aspect, another embodiment of the invention comprises a method of processing a solid metal X, comprising maintaining a molten carrier which does not react significantly with metal X at a temperature T, is not significantly soluble in metal X at the temperature T, and contains no atoms or molecules which are significantly soluble in metal X at the temperature T; applying the molten carrier to the metal X, together with atomic carbon, nitrogen, or both, which are held within the molten carrier; and maintaining the metal X at temperature T for a time period, to cause the carbon and nitrogen to diffuse into the metal X.

In still another aspect, another embodiment of the invention comprises a method, comprising creating a solution, or mixture, consisting essentially of molten lithium and carbon, placing some of the solution against an object made of a refractory metal and raising temperature to cause carbon to diffuse into the refractory metal.

In still another aspect, another embodiment of the invention comprises an object which is manufactured from a precursor, comprising an inner body, and an outer layer, at least partially surrounding the inner body, which contains one or more compounds of the formula XA, in which formula X represents titanium, vanadium, zirconium, hafnium, tungsten, molybdenum, or chromium, A represents nitrogen, or carbon, and in which outer layer all metal atoms present were also present in the precursor, and no other atoms beside X and A are present, except in trace amounts not exceeding 5 percent total.

In still another aspect, another embodiment of the invention comprises a method of processing a metal X, comprising maintaining a molten bath of a metal Y having a solubility in metal X at temperature T of less than 0.05 weight percent, maintaining atomic carbon, nitrogen, or both in the bath, and dipping metal X into the bath, and keeping the metal X in the bath at the temperature T for a time period.

In still another aspect, another embodiment of the invention comprises a method of processing a metal X, comprising maintaining a molten bath of a metal Y having a solubility in metal X at temperature T of less than 0.05 weight percent, maintaining atomic carbon, nitrogen, or both in the bath, dipping metal X into the bath, and removing metal X while maintaining a coating of the bath material on metal X and maintaining metal X and the coating above a temperature T for a time period In still another aspect, another embodiment of the invention comprises a method of processing a metal X, comprising maintaining a molten bath of a metal Y having a solubility in metal X at temperature T of less than 0.05 weight percent, dipping metal X into the bath, and removing metal X while maintaining a coating of the bath material on metal X, injecting atomic carbon, nitrogen, or both into the coating; and then maintaining metal X and the coating above a temperature T for a time period.

In still another aspect, another embodiment of the invention comprises an object, comprising an inner body consisting of titanium, vanadium, zirconium, hafnium, tungsten, molybdenum, or chromium, or alloys of these, an outer layer consisting of carbides of metals in the inner body, or nitrides of metals in the inner body, or both said carbides and nitrides; and no hydrogen embrittlement.

In yet another aspect, another embodiment of the invention comprises an object, comprising an inner body consisting of titanium, vanadium, zirconium, hafnium, tungsten, molybdenum, or chromium, or alloys of these, an outer layer consisting of carbides of metals in the inner body, or nitrides of metals in the inner body, or both said carbides and nitrides; and no oxidation.

These and other objects and advantages of the invention will be apparent from the following description, the accompanying drawings and the appended claims.

BRIEF DESCRIPTION OF THE DRAWINGS

FIG. 17 is a Calcium-Titanium phase diagram;

FIG. 18 is a Sodium-Titanium phase diagram;

FIG. 19 is a Lithium-Vanadium phase diagram;

FIG. 20 is a Lithium-Zirconium phase diagram;

FIG. 21 is a Lithium-Hafnium phase diagram;

FIG. 22 is a Lithium-Chromium phase diagram;

FIG. 23 is a Lithium-Nitrogen phase diagram;

FIG. 24 is a Calcium-Lithium phase diagram;

FIG. 25 is a Magnesium-Lithium phase diagram;

FIG. 26 is a flow chart illustrating steps used in a bath-immersion process;

FIG. 27 illustrates apparatus used in a bath-immersion process;

FIG. 29 is a flow chart illustrating steps used in a two-chamber process;

FIG. 30 illustrates apparatus used in a two-chamber process;

FIG. 32 is a flow chart illustrating steps used in a three-chamber process;

FIG. 33 illustrates apparatus used in a three-chamber process;

FIGS. 34-42 illustrates a sequence of steps used by apparatus in a three-chamber process;

FIGS. 44 and 45 are outlines of processes undertaken by several forms of the invention;

DETAILED DESCRIPTION OF THE INVENTION

Figure 1:
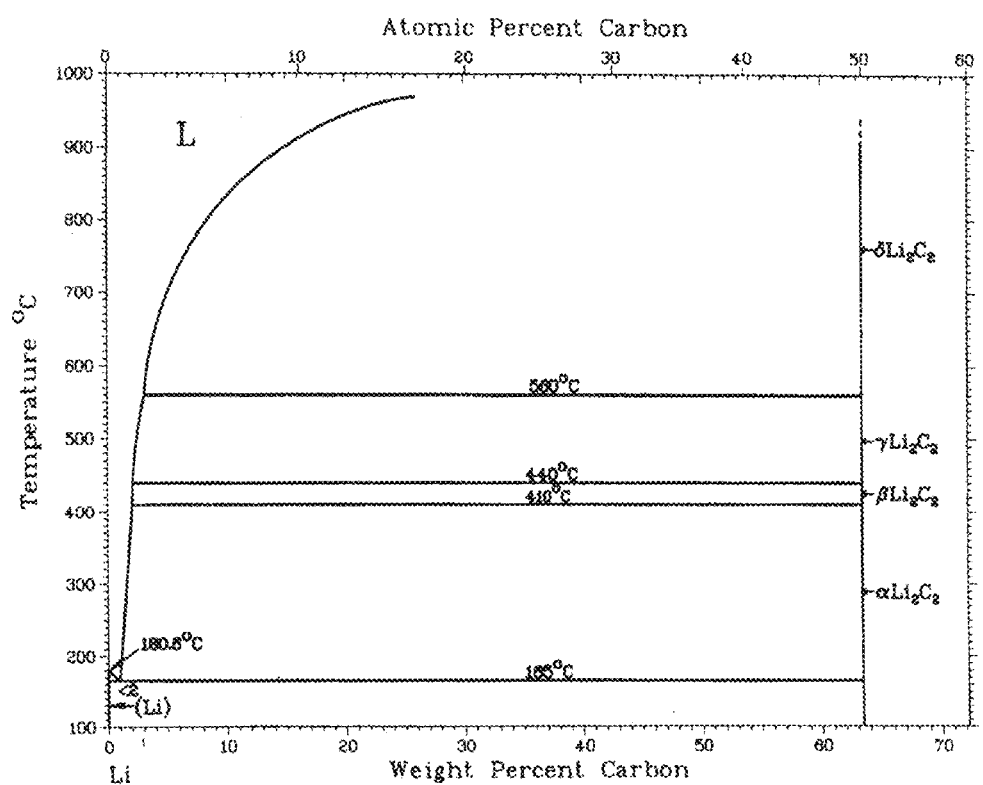
FIG. 1 is a Lithium-Carbon phase diagram.

The following discussion will explain several aspects of the invention, including methods of manufacture and articles produced by the methods.

I: Method of Diffusing Various Elements into Refractory Metals and Their Alloys Via an Alkali or Alkaline Earth Metal Carrier The family of Refractory metals particularly Titanium and Titanium alloys are generally considered soft metals which cannot be hardened like ferrous alloys. Heat treatment can increase the tensile strength of some of these refractory metals, but Titanium alloys for example cannot increase their intrinsic hardness beyond 40 to 45 Rockwell C. This precludes the use of these alloys in applications which require any resistance to wear, such as bearings, bushings, gears and cutting edges. Designers could use the intrinsic corrosion resistance, light weight and high strength of this family of metals in designs if the surface of the particular alloy could be hardened and provide resistance to wear. There are no known processes commercially available which effectively harden the surface of refractory metals such as Titanium. Applied coating systems are the only viable technique to provide resistance to wear. However, applied coatings are generally thin layers placed on the surface of these alloys and intrinsically not well bonded and eventually can be worn off.

This invention provides a method by which the surface of a Refractory metal can be converted to a very hard phase. The invention in one basic embodiment provides pure Carbon atoms to the surface of a refractory metal such as Titanium at an elevated temperature so as to diffuse Carbon into the surface and form a stable Titanium Carbide (TiC) phase. This is not an applied coating process, it is a conversion process. The surface of the Titanium metal is converted to a stable well adhered hard TiC compound. The hard surface will provide wear and impact resistance for a variety of applications such as bearings, bushings, gears, cutting tools and instruments and lightweight armor.

To describe this invention in detail, we will begin with one basic embodiment which involves the exposure of Titanium metal to a liquid bath of an Alkali metal such as Lithium heated to an elevated temperature. The liquid Lithium bath contains Carbon which has been dissolved in the liquid solution. The elemental Carbon in the Lithium solution exposed to the surface of Titanium metal diffuses into said surface and eventually forms a stable Titanium Carbide (TiC) layer. By increasing the exposure temperature, extending the time of exposure, or providing a higher Carbon concentration in the Lithium bath, deeper Carbon diffusion into the Titanium metal surface will occur and a thicker TiC layer will be formed. The unique features of the process are that: (1) the Lithium metal itself in the bath does not react, dissolve or deleteriously affect the surface of the Titanium metal: (2) Carbon is provided in a pure elemental form for diffusion into Titanium metal without any other deleterious elements such as Oxygen, Hydrogen or Sulfur: (3) A temperature for the process can be used to affectively diffuse Carbon into Titanium metal which does not deleteriously affect the favorable mechanical properties of the base metal, i.e., the processes can be performed below the Beta transus temperature of the specific Titanium alloys: and (4) The TiC compound layer formed on the surface of the Titanium metal is integrally bonded to the base metal and can be made thick enough to provide substantial wear and impact resistance.

Figure 2:
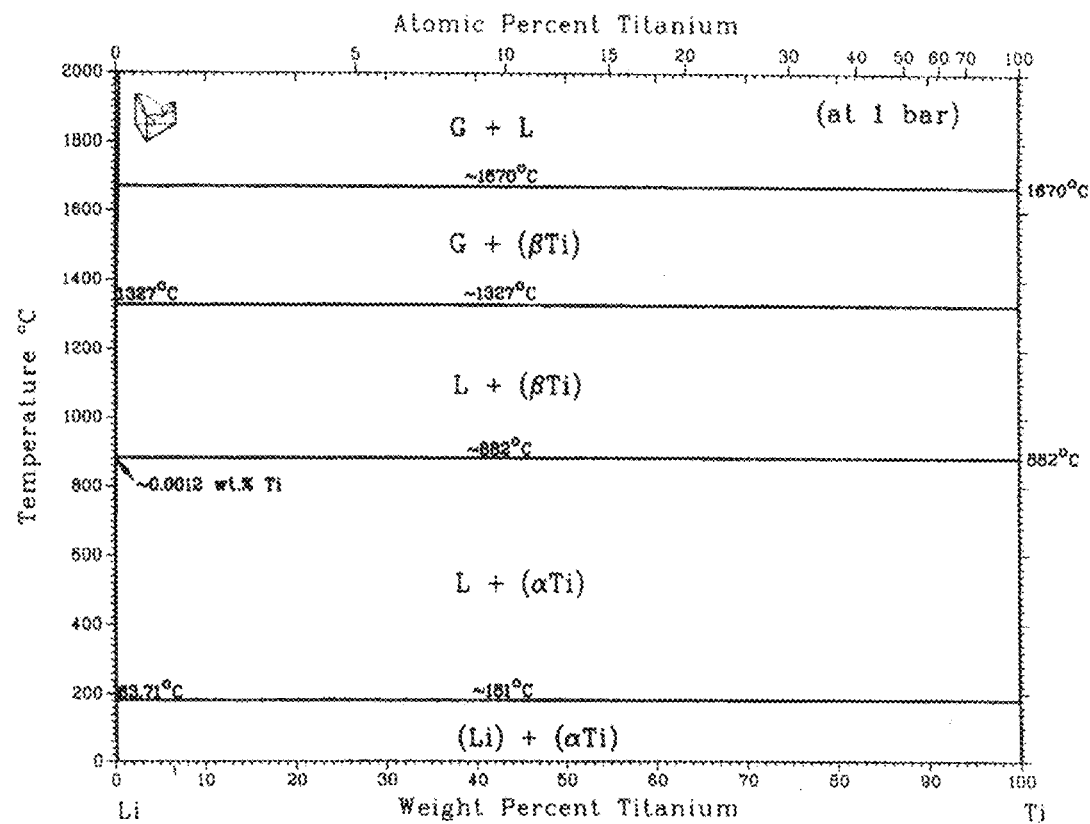
FIG. 2 is a Lithium-Titanium phase diagram.

In this basic embodiment of the method, Carbon would first be dissolved into the Lithium metal bath and heated to an appropriate temperature under a protective inert gas atmosphere such as Argon. A Lithium-Carbon phase diagram is shown in FIG. 1 (Ref. 2) indicating the substantial solubility of Carbon in the Liquid phase of Lithium. At 900° C., as much as 15% by weight of Carbon can be dissolved in Lithium to a saturated liquid solution. FIG. 2 shows a Lithium-Titanium phase Diagram (Ref. 2) which indicates no significant solubility of Titanium in liquid Lithium at this same temperature. The Titanium metal component would then be immersed in the Lithium bath with dissolved Carbon and held at temperature for a period of time. After Carbon diffusion and the formation of the TiC layer on the surfaces of the Titanium metal, the components would be removed from the bath and cooled. Any residual Lithium on the surface of the Titanium components would be removed through water dissolution. The resulting component would have a thick TiC layer on all its surfaces and the Titanium base metal would have preserved its inherently desirable mechanical properties.

Figure 3:
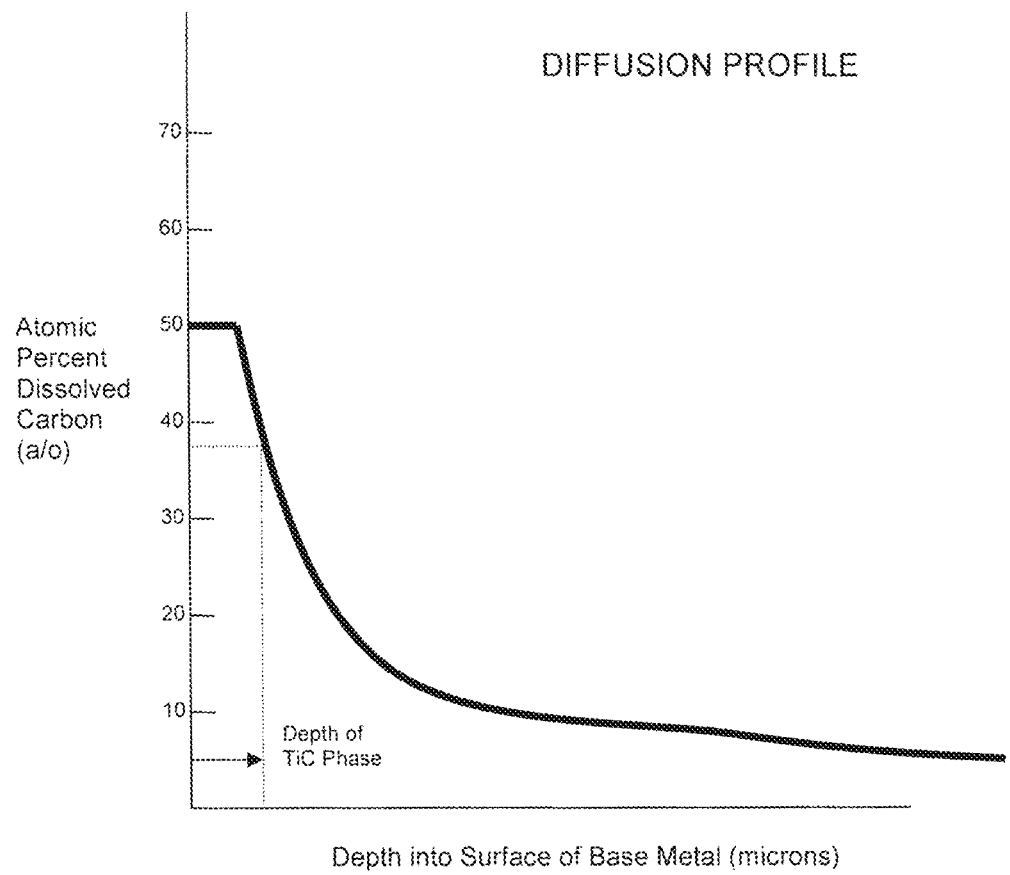
FIG. 3 is a representation of the concentration of carbon (vertical axis) as a function of depth in a base metal, and is often called a diffusion profile.
Figure 4:
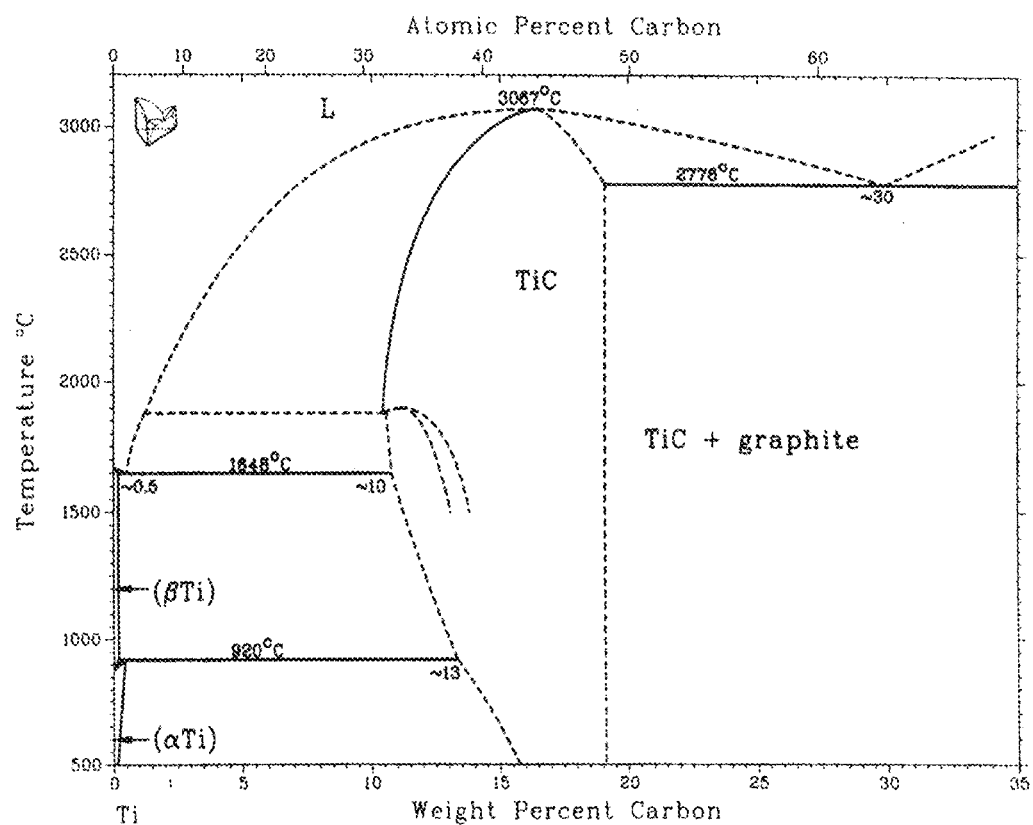
FIG. 4 is a Titanium-Carbon phase diagram.
Figure 5:
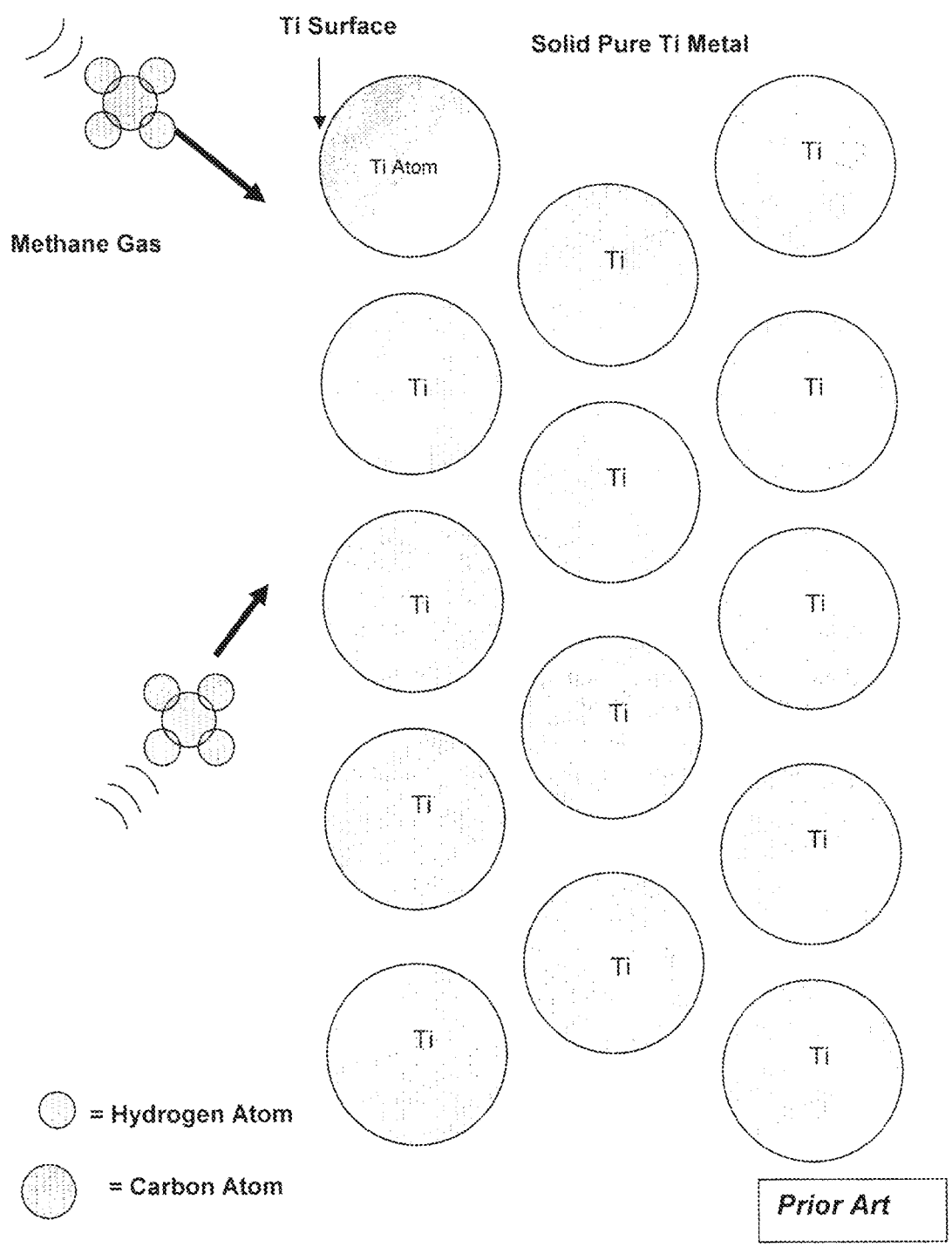
FIG. 5 illustrates Methane gas molecules striking a Titanium substrate.
Figure 6:
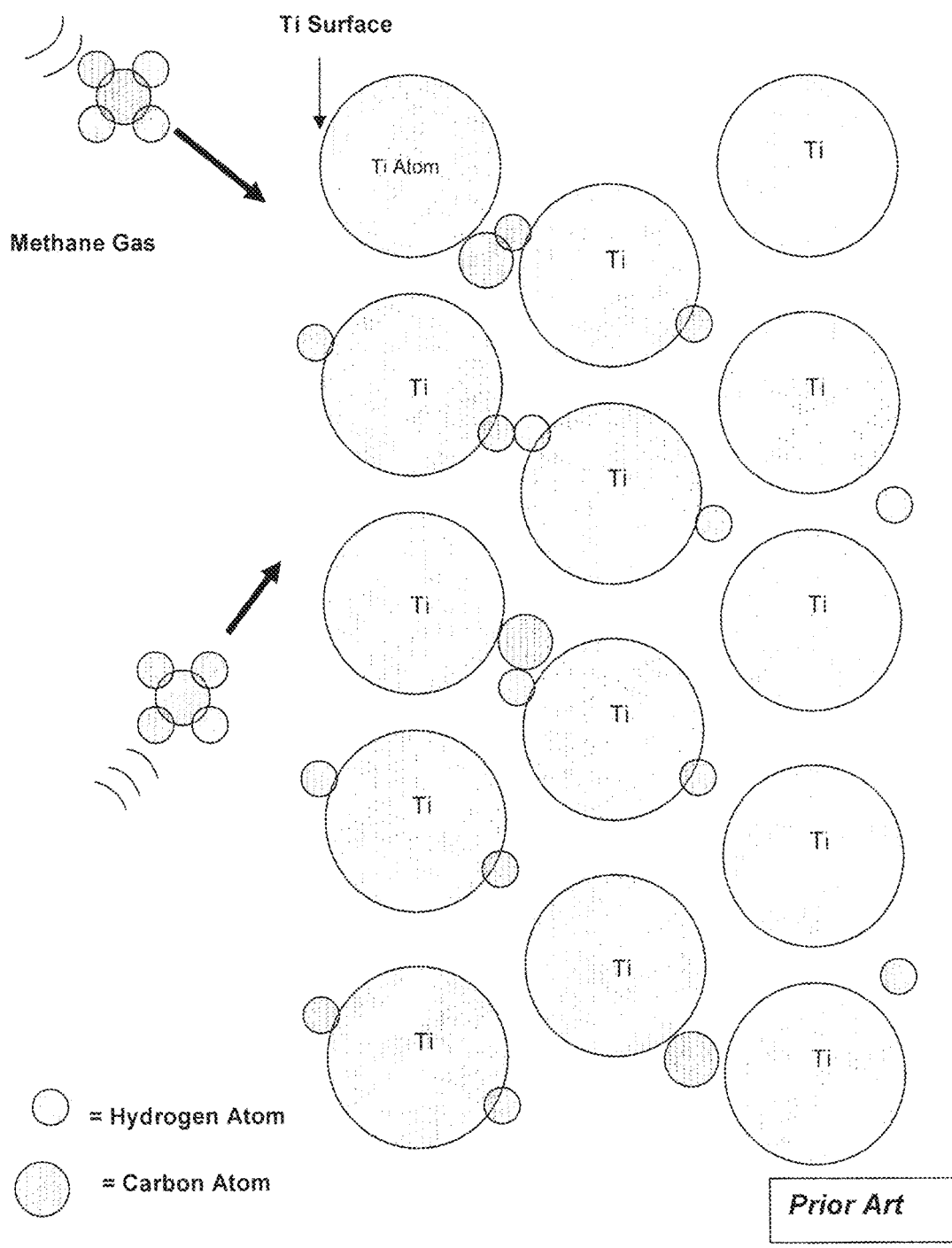
FIG. 6 illustrates Titanium Hydride, and embedded Carbon, formed in the process illustrated in FIG. 5.
Figure 7:
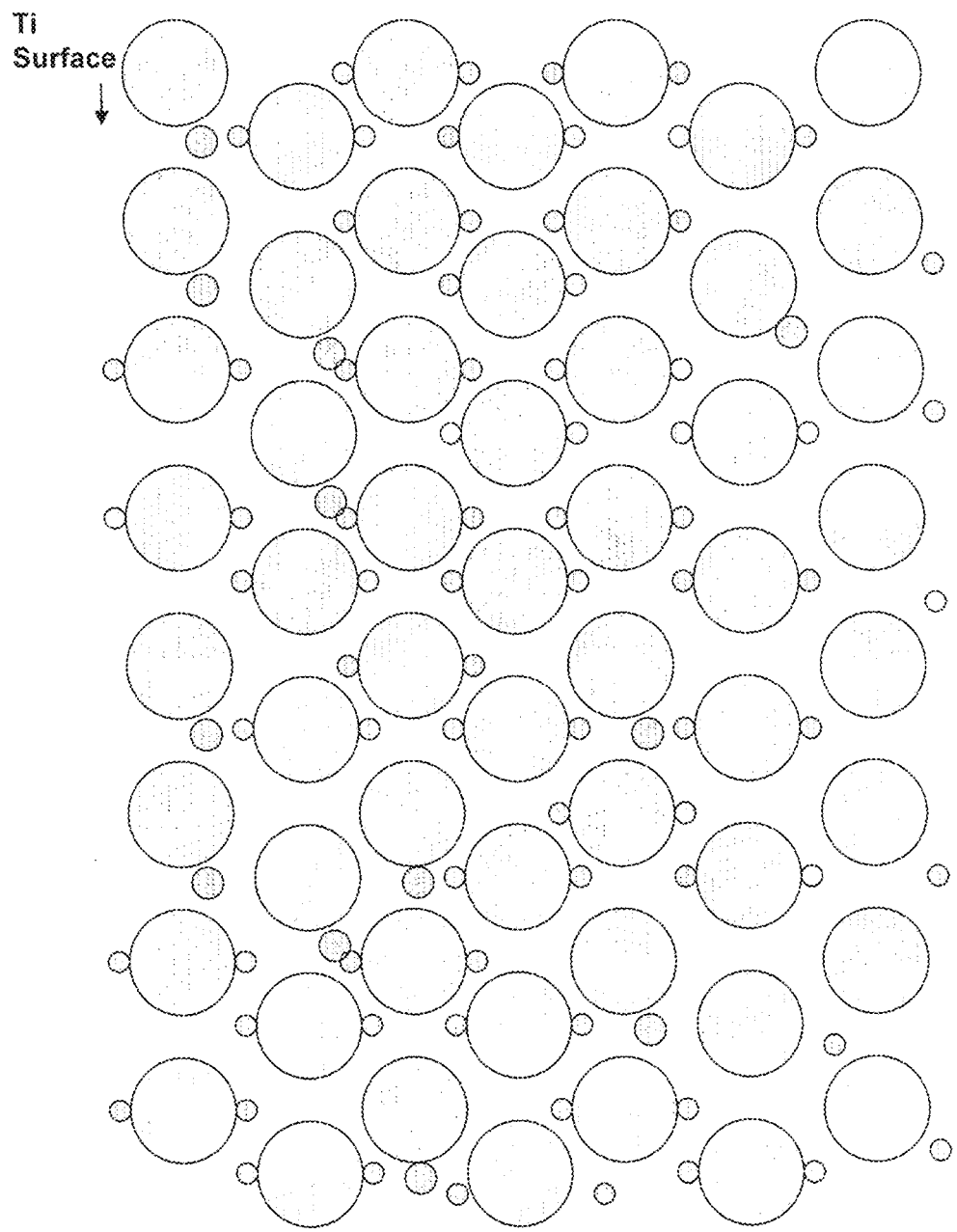
FIG. 7 illustrates the final result of attempting to carburize Titanium, as in FIGS. 5 and 6, at the atomic level.
Figure 8:
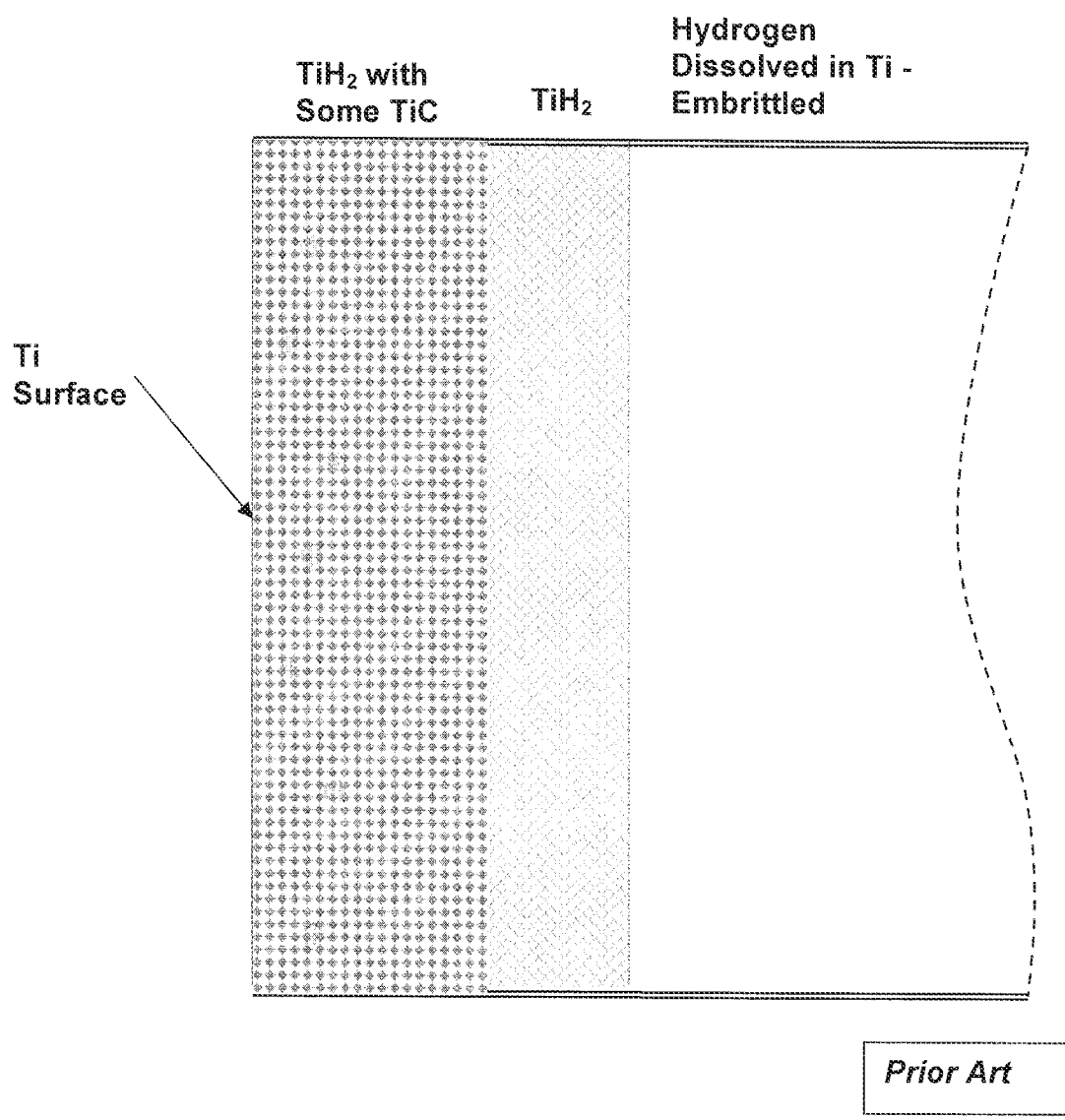
FIG. 8 is another representation of the components in FIG. 7.
Figure 9:
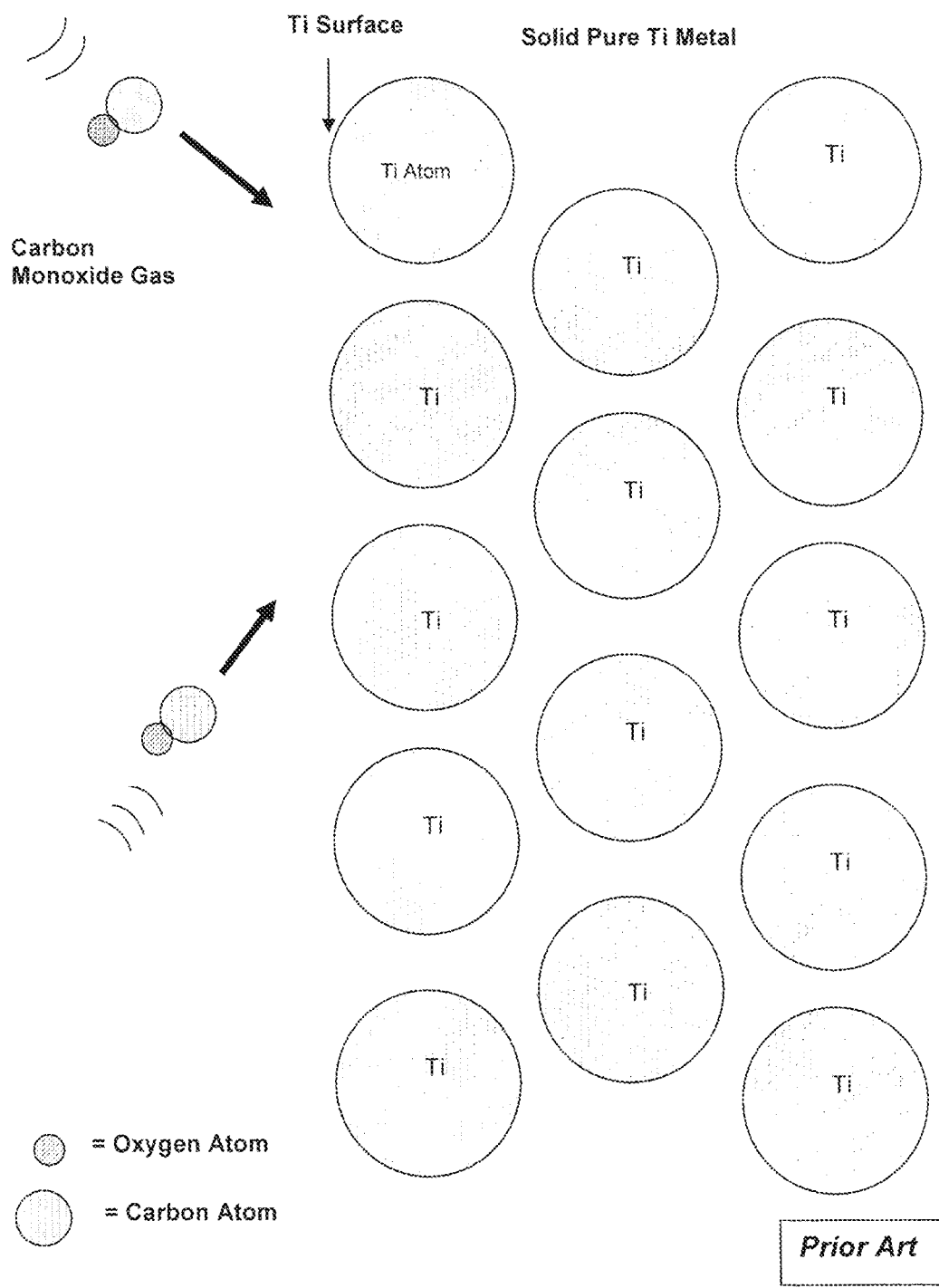
FIG. 9 is similar to FIG. 5, but with Carbon Monoxide gas striking the Titanium substrate.
Figure 10:
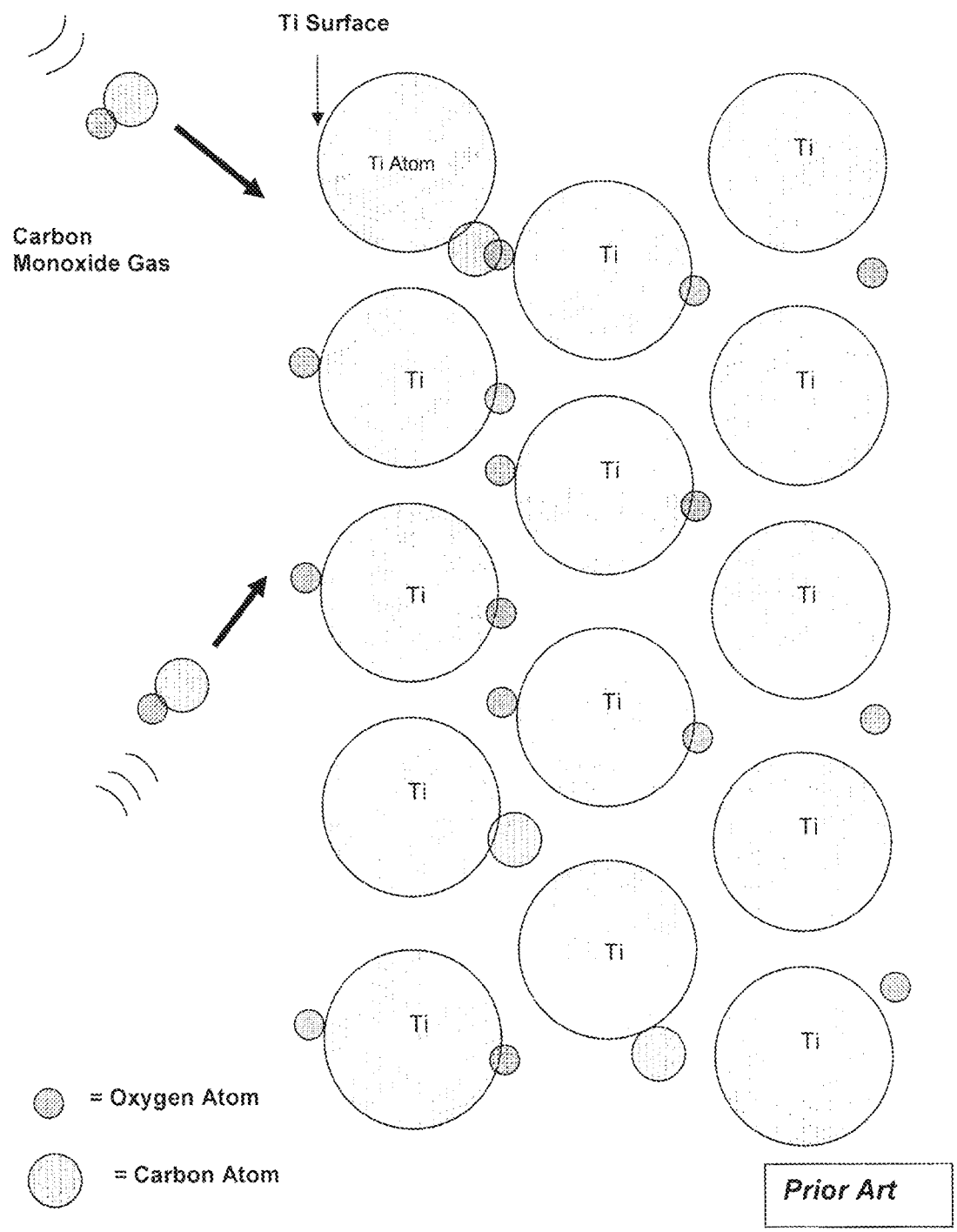
FIG. 10 illustrates Titanium Dioxide, and embedded Carbon, formed in the process illustrated in FIG. 9.
Figure 11:
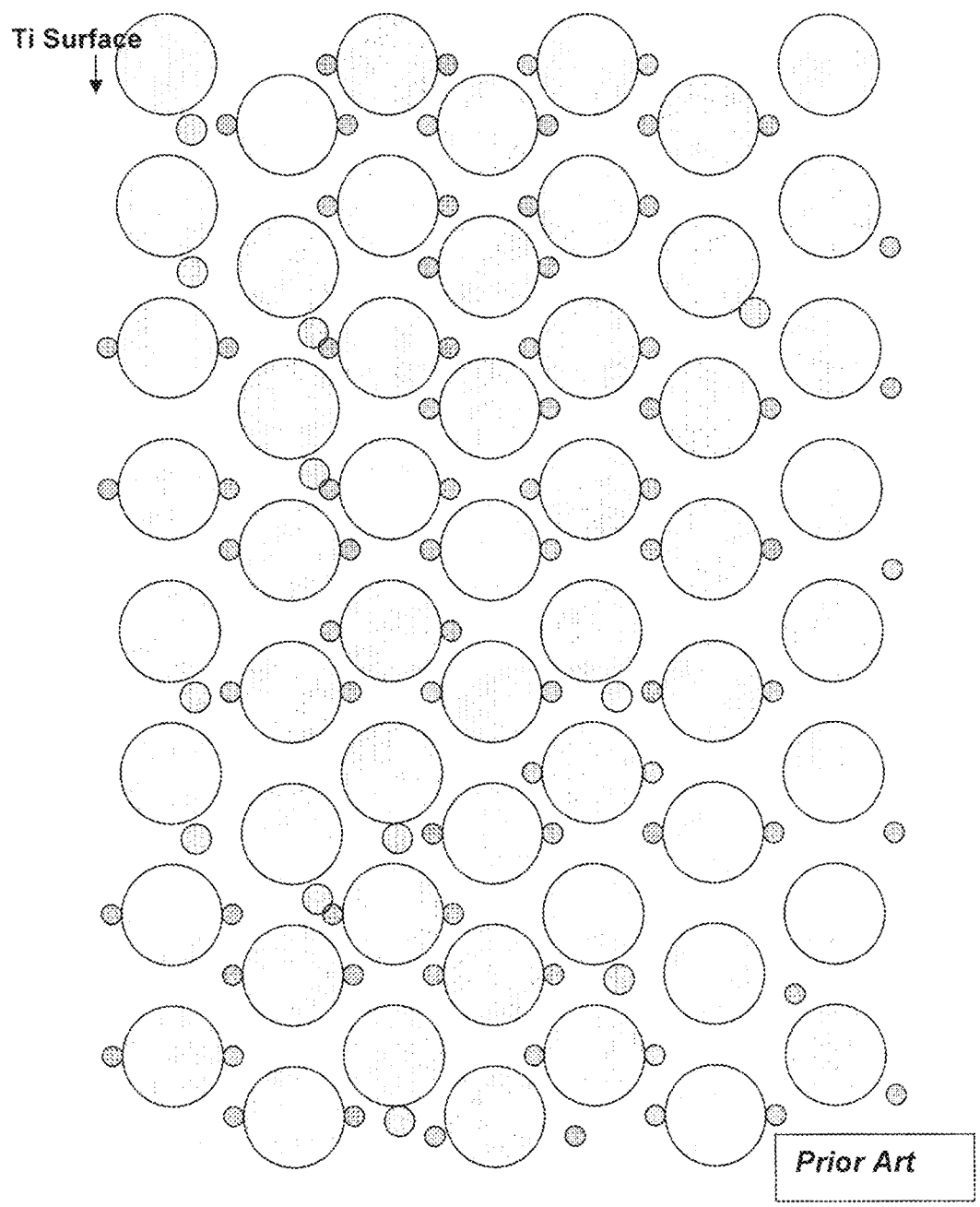
FIG. 11 illustrates the final result of attempting to carburize Titanium, as in FIGS. 9 and 10, at the atomic level.
Figure 12:
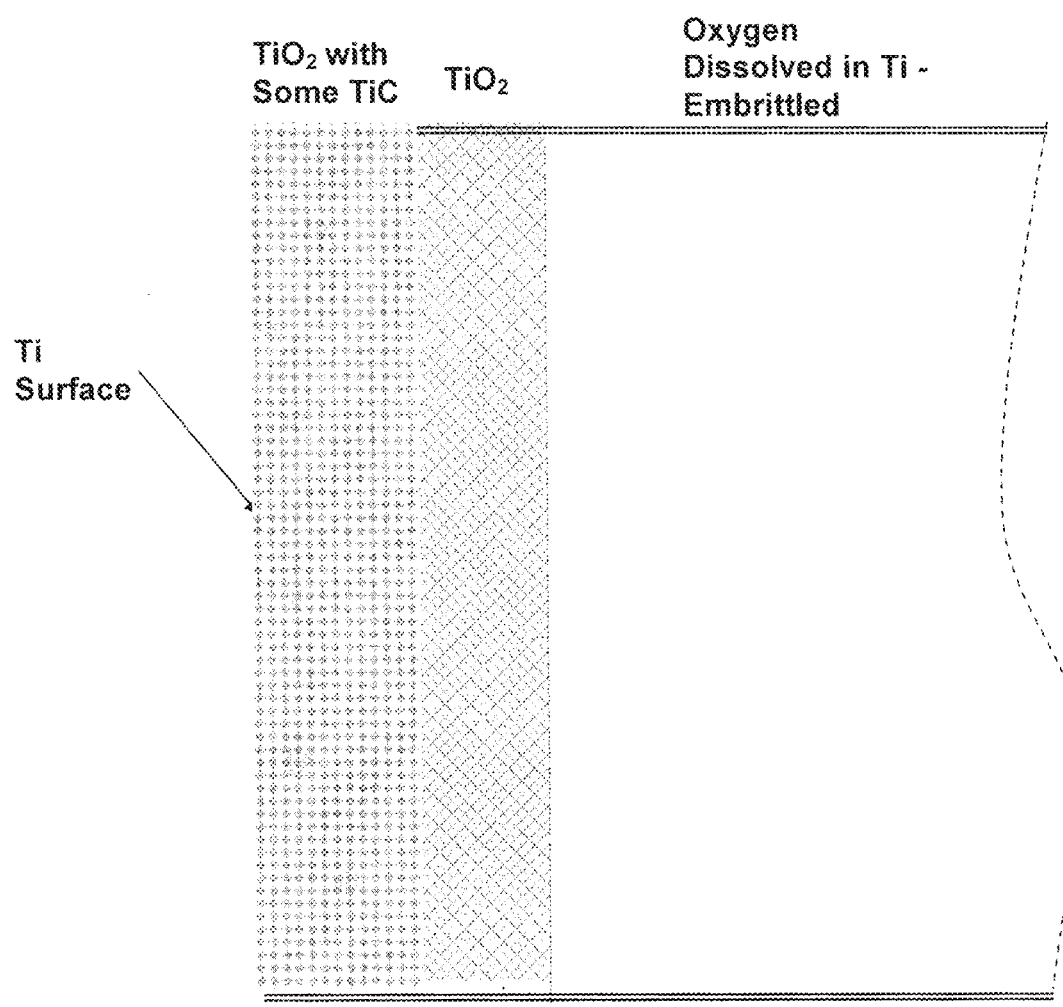
FIG. 12 is another representation of the components of FIG. 11.

It is expected that a stable well bonded TiC layer from 5 to 100 microns in thickness can be achieved through this process. Process temperatures can be held below the Beta Transus temperatures of common alpha and alpha-beta Titanium alloys (882 to 940° C.), thereby preserving inherently favorable mechanical properties. The thickness of the TiC layer formed will be related to the depth of the diffusion gradient into the base metal. FIG. 3 shows an expected diffusion profile into the Titanium base metal. FIG. 4 shows the Titanium-Carbon phase diagram which indicates the formation of a stable TiC phase with as low as 38 atomic percent Carbon (Ref. 2). Therefore, in FIG. 3, a stable TiC phase forms at this concentration resulting in the thickness indicated.

In contrast to the prior art referred to in the Description of the Related Art, in the present invention, Lithium is used as a carrier providing elemental Carbon to the surface of Titanium to form a TiC layer.

This process is unique in that there is no commercially available system to convert and harden the surface of Titanium.

Figure 13:
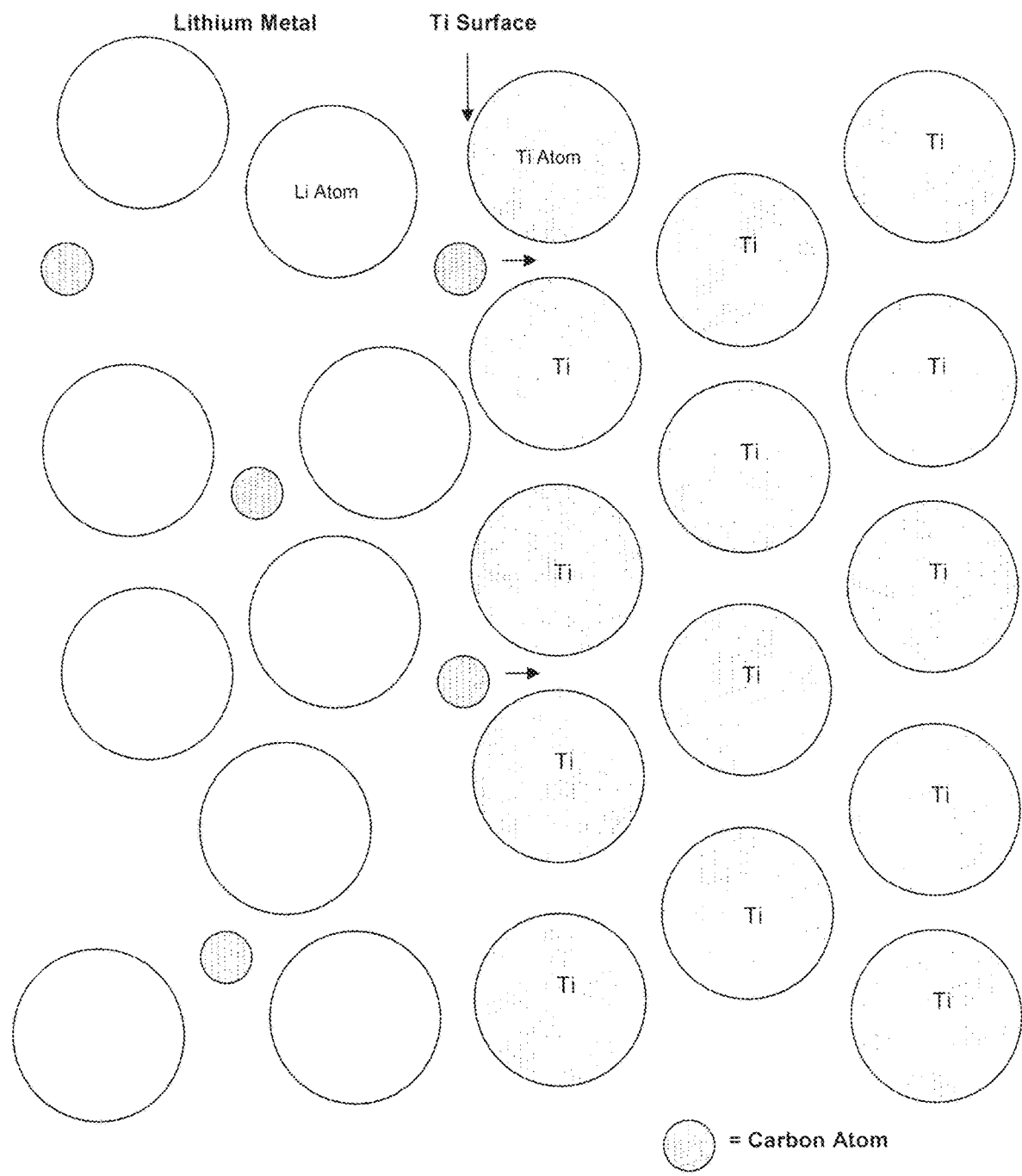
FIG. 13 schematically illustrates one form of the invention, at a relatively early time.
Figure 14:
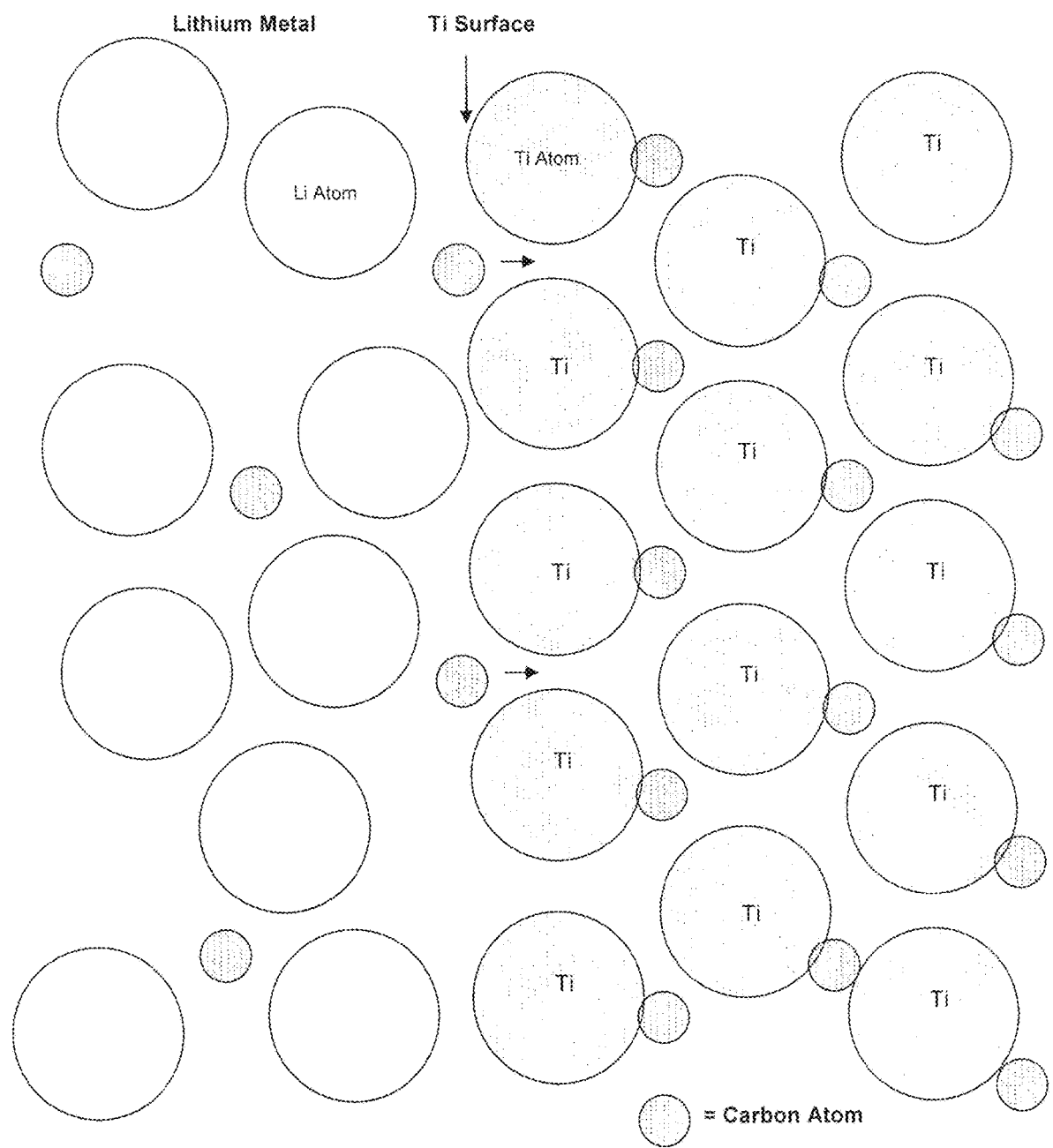
FIG. 14 schematically illustrates one form of the invention, at a relatively late time.
Figure 15:
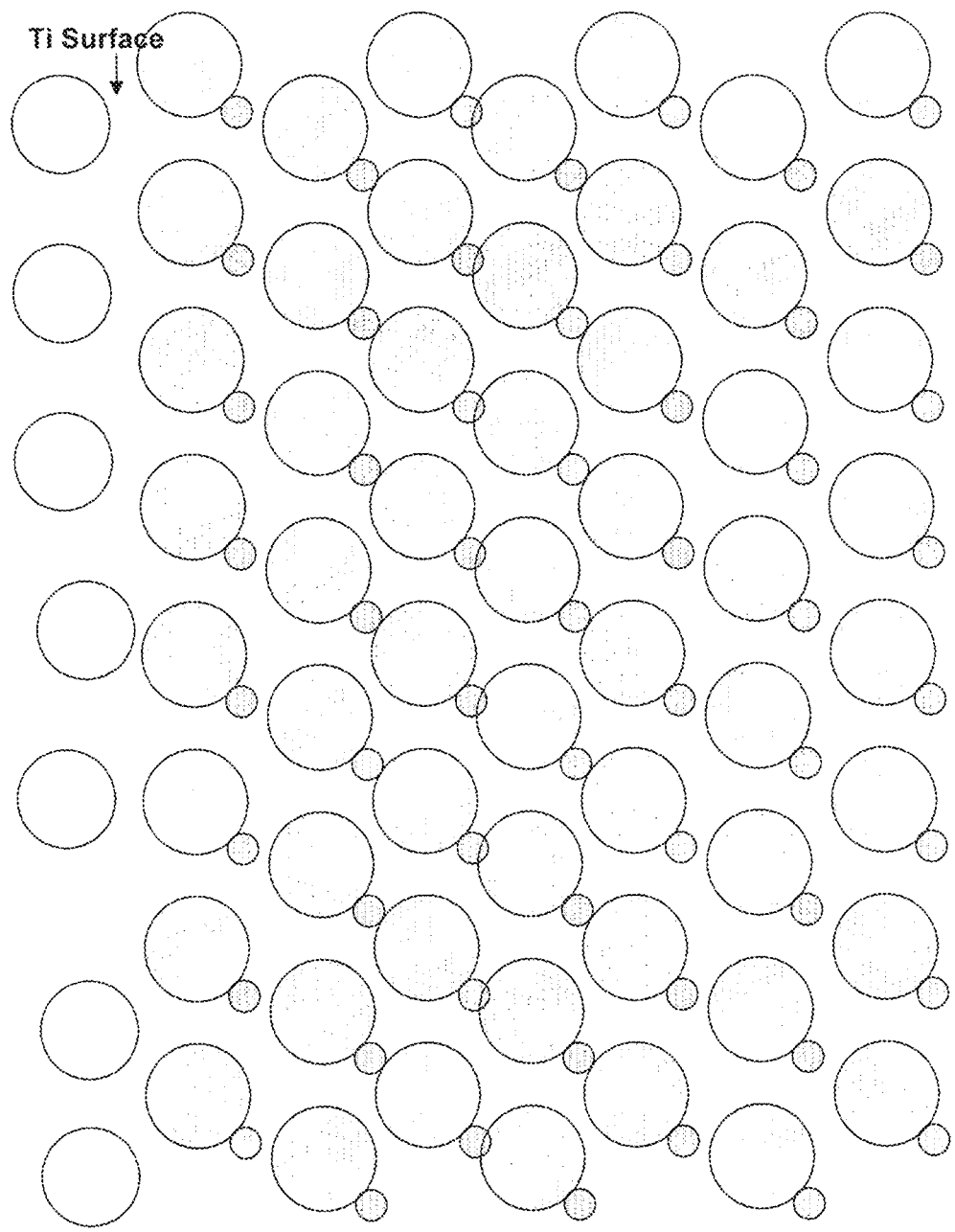
FIG. 15 illustrates the final result of the processes of FIGS. 13 and 14.
Figure 16:
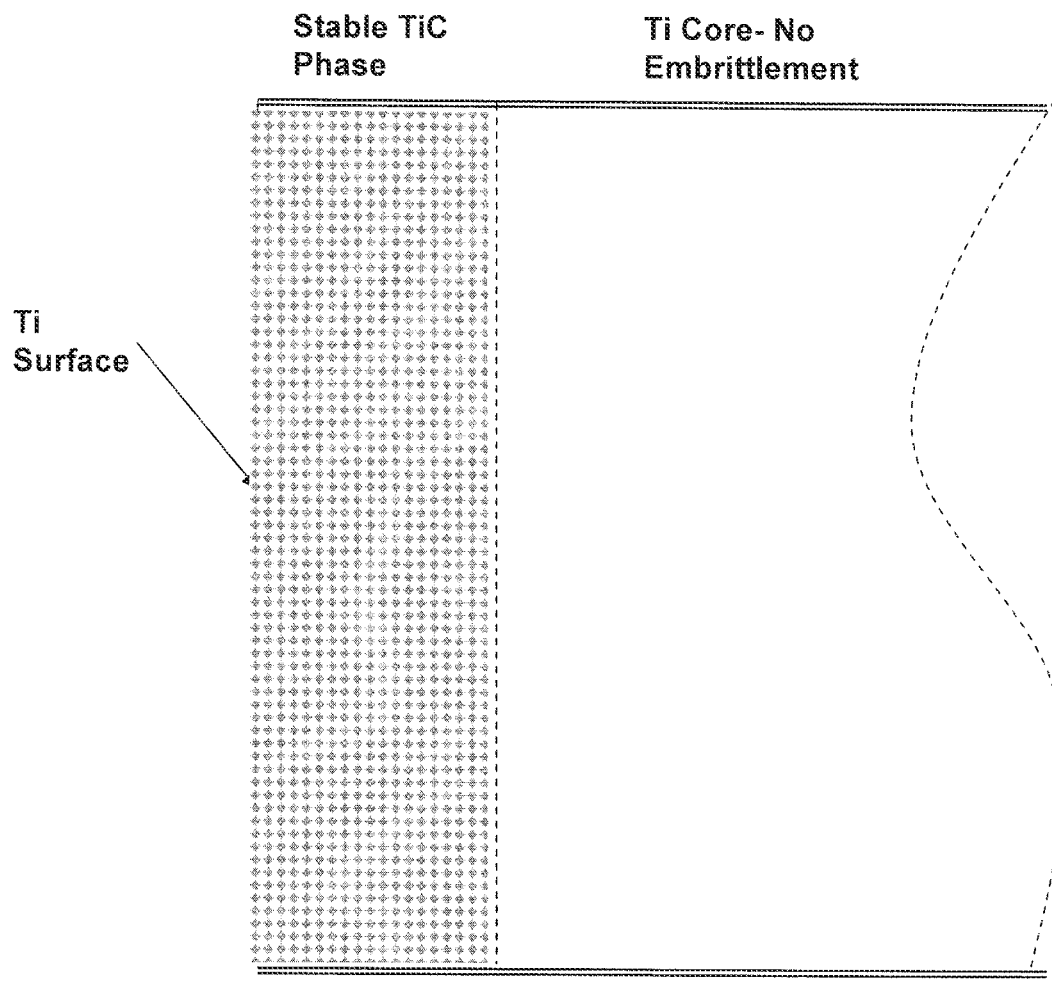
FIG. 16 illustrates a cross-section of the resulting surface.

In contrast to the prior art referred to in the Description of the Related Art, the method disclosed here results in a very different diffusion profile. FIGS. 13 thru 16 illustrate the diffusion process through a Lithium bath. In FIG. 13, the solid Titanium metal is exposed to Liquid Lithium with dissolved Carbon atoms at a reasonable temperature of 900° C. In this scenario, there are no other atoms available to diffuse into Titanium other than Carbon. Lithium itself is insoluble in Titanium and vice versa, as shown in the phase diagram of the system (FIG. 2). Therefore, the Lithium and Titanium atoms are stable and do not migrate. The other advantage to this process is the fact that the medium carry the Carbon atoms is liquid instead of gas. The atoms of Carbon are not traveling a random high speeds and are not reacting randomly with the surface of Titanium, but move slowly through the liquid to the surface of Titanium allowing it time to react rather than bounce off. In addition, an abundant supply of Carbon atoms can easily migrate through the Lithium liquid to the Titanium substrate. FIG. 14 shows the diffusion of only Carbon into the Titanium surface forming a stable Carbide phase. FIG. 15 shows the resulting phase on an atomic level with only TiC molecules formed. FIG. 16 shows an illustration of how a cross-section of the resulting surface would appear, with a thick stable Titanium Carbide phase on the surface with no Oxide or Hydride phases formed. The base metal would remain unaffected and have the desired mechanical and performance properties, now with an additionally very hard surface.

Applied coating processes do exist which can apply a layer of material over and onto the surface of the Titanium metal. Chemical Vapor Deposition (CVD) and Physical Vapor Deposition (PVD) methods can currently apply TiC and Titanium Nitride (TiN) onto the surfaces of any metal, including Titanium. These processes are limited by cost and complexity and still can only apply a 2 to 5 micron thick layer of material. In most cases, the base metal also has to be heated to sub-beta transus temperatures to provide adhesion of the coating. These coatings are still very thin and not very adherent.

The unique aspect of this process is that it provides elemental pure Carbon to the surface of Titanium. As described above, current standard carburizing methods used for ferrous material involve the exposure of the work piece to $CH_4$ or CO gas at elevated temperatures. In Iron based materials system, the thermodynamic relationships are such that the Iron surface dissolves Carbon from the Methane gas preferentially and releases Hydrogen gas. The Iron base metal does not dissolve enough Hydrogen to pose a material problem. As discussed before, in a Titanium system, the thermodynamic relationships are such that the base metal would selectively dissolve Hydrogen from any organic gas at elevated temperatures. Titanium is known to have a high solubility and affinity to dissolving Hydrogen at elevated temperatures. Any Hydrogen dissolved in Titanium above 150 ppm would degrade the favorable mechanical properties of the base metal. Therefore, Titanium cannot be carburized in the same manner as ferrous materials.

There is no other process which can provide Carbon in an atomic form to the surface of Titanium for diffusion purposes. Pure Carbon is only a solid at these temperatures and cannot be affectively diffused into a Titanium metal surface. The unique aspect to this process is that it can provide elemental pure Carbon to the surface of Titanium metal to allow diffusion to occur. No Hydrogen, Oxygen, Chlorine, Sulphur or other deleterious element is present which can further react with the Titanium base metal and inhibit the Carbide layer formation or otherwise affect the mechanical properties of the base metal.

The preferred embodiment of the invention would involve the use of a Lithium metal bath for the diffusing media. Lithium is more stable at the required temperatures than other possible bath media, has a low melting point, and high solubility of Carbon. The preferred embodiment of the invention would also use Carbon as the diffusing element. Other interstitial elements do not produce the advantageous surface characteristics as carbide. The preferred embodiment of the invention would convert the surface of Titanium and Titanium alloys. The Titanium family of metals has the widest commercial use for a hardened surface.

Other mediums can be used for the liquid metal bath other than Lithium. There are no phase diagrams for other specific Alkali metals and Alkaline Earth metals with Carbon. However, it is generally known that Calcium, Sodium and Magnesium form carbides and likely have a limited solubility of Carbon at the temperatures required for the reaction to occur (Ref. 3 and 4). These metals are also not reactive with Titanium at the expected temperature range as shown in the phase diagrams of FIGS. 17 and 18 (Ref. 2).

Other refractory metals can also be treated by this method. Most refractory metals behave in a similar fashion as Titanium, i.e., they can form a carbide on their surfaces when exposed to pure Carbon, and they have limited or no solubility in Lithium at the general temperatures required for the reaction to occur. Possible base metals would include Vanadium, Zirconium, Hafnium, Tungsten, Molybdenum and Chromium and alloys thereof. FIGS. 19 thru 22 show the applicable phase diagram with Lithium for Vanadium, Zirconium, Hafnium and Chromium, respectively (Ref. 2). All of the phase diagrams indicate limited or no solubility with Lithium at elevated temperatures. Data for Molybdenum and Tungsten is also available showing limited solubility in Lithium (Ref. 3 and 4).

Other elements can also be diffused via Lithium by this process. Oxygen, Hydrogen, Sulphur, Chlorine and Nitrogen are all soluble in Lithium. However, Nitrogen would be the only other element which provides an advantageous surface layer on a base metal. FIG. 23 shows the applicable Lithium-Nitrogen phase diagram showing extensive solubility of Nitrogen at the temperatures expected for the reaction to occur (Ref. 2). As Nitrogen is a gas, it is envisioned that it could be introduced to the furnace system environment as the Lithium bath is heated or during the diffusion cycle. The Lithium will then act as the transport media for Nitrogen atoms, much as has been described for Carbon atoms.

Process Variations

Besides using different bath media, base metals and diffusion elements, the process can also be modified to achieve similar goals.

1) Bath Alloying:

The Lithium bath can be alloyed with other alkali and alkaline earth metals such as Potassium, Sodium, Calcium and Magnesium. The addition of Calcium and Magnesium to the Lithium bath could provide a more stable, less reactive bath medium which will be easier to handle and store. FIGS. 24 and 25 show phase diagrams of Calcium and Magnesium with Lithium (Ref. 2). In Calcium's case, the melting point of the bath can actually be reduced by 40° C. with the addition of 35% by weight Calcium. This lower melting point bath composition may be beneficial for the two and three chamber methods described directly below. In these methods, the Lithium bath does not need to be heated to a high temperature for an extended time. The bath will only need to be held at temperatures in the 150 to 200° C. range in order to dip the Titanium components prior to diffusing Carbon.

2) Two Chamber Process:

As a large Lithium bath is very reactive and difficult to work with at elevated temperatures, it is envisioned that the Lithium bath can first be formed with dissolved Carbon. The liquid Lithium with dissolved Carbon can first be applied to the base metal in a low temperature dip process. Lithium will remained adhered to the surface of a component after dipping through surface tension. For example, a part could be dipped in a Lithium/Carbon bath at 200 degrees C., removed and moved to a second chamber and heated to elevated temperatures, 800 to 900 degrees C., where the diffusion process can proceed. In this way, only a small quantity of Lithium is required for the diffusion process to proceed. Many parts can be dipped at the same time. A two chamber furnace/retort system could also be envisioned to perform the dipping and diffusion exposure process in one operation. (See Equipment Description)

3) Three Chamber Process:

Again, as a large Lithium bath is very reactive and difficult to work with at elevated temperatures, it is envisioned that the pure Lithium can first be applied to the base metal in a low temperature dip process. Lithium will remained adhered to the surface of a component after dipping through surface tension. For example, a part could be dipped in a Lithium bath at 200 degrees C., removed and moved to a second chamber where Carbon can be applied to the dipped Lithium surface on the Titanium parts. The dipped components can then be moved to a third chamber and heated to elevated temperatures, 800 to 900 degrees C., where the diffusion process can proceed. In this way, only a small quantity of Lithium is required for the diffusion process to proceed. Many parts can be dipped at the same time. A three chamber furnace/retort system could also be envisioned to perform the dipping, coating and diffusion exposure process in one operation. (See Equipment Description)

4) Co-Diffusion of Elements:

The basic process can also be modified to diffuse two elements simultaneously or in sequence. Carbon and Nitrogen can be dissolved in the Lithium bath at the same time at various concentrations and form a Carbide/Nitride layer which could perform better than either a single Carbide or Nitride layer. Additionally, it is envisioned that Carbon could be diffused first in a Lithium-Carbon bath and then Nitrogen gas can be introduced to the furnace atmosphere in order to dissolve into the Lithium and further diffuse Nitrogen into the already formed Carbide layer. This could produce very hard and wear resistant layers. This method may also be used in conjunction with the two or three chamber dip and diffusion process described above. Nitrogen gas would be introduced in the high temperature diffusion stage of each process so as only the Lithium on the surface of the component absorbs the Nitrogen. The main Lithium bath would remain as pure Lithium or only alloyed with Carbon and can be further used in future processes.

II: System for Diffusing Various Elements into Refractory Metals and Their Alloys Via an Alkali or Alkaline Earth Metal Carrier This invention provides the equipment and processes to perform the method described in detailed above by which the surface of a Refractory metal can be converted to a very hard phase. The invention in one basic embodiment involves the equipment to provide pure Carbon atoms to the surface of a refractory metal such as Titanium at an elevated temperature so as to diffuse Carbon into the surface and form a stable Titanium Carbide (TiC) phase. This is not a coating process, it is a conversion process. The surface of the Titanium metal is converted to a stable well adhered hard TiC compound. The hard surface will provide wear and impact resistance for a variety of applications such as bearings, bushings, gears, cutting tools and instruments and lightweight armor.

System for Bath Immersion Method:

In the above description of the process, three methods were outlined to perform this coating process. The simplest form of the process described in detail above involves the immersion of Titanium components in a Lithium bath with dissolved Carbon and holding for a period of time to form a stable Titanium Carbide coating on the parts.

A basic flow chart for the coating of Titanium parts by this method is shown in FIG. 26. As block 200 indicates, Titanium components are first prepared for coating by cleaning and grinding to provide a fresh metal surface for reaction. As in block 204, the parts are then attached to an appropriate fixture and rack system to be placed in the coating system.

Contemporaneously, as in block 220, a Lithium bath is prepared by placing pure Lithium metal in a Titanium crucible along with the required weight of Carbon in the form of Carbon black or graphite. As in block 208, the Titanium parts and the Lithium bath crucible are then installed in a Bath Immersion Coating System as shown in FIG. 27.

The system consists of a retort 280 which can be opened to remove components and then sealed to ensure a correct environment. The Titanium parts on the fixtures are connected to an actuation rod 284 which can lower the parts in and out of the Lithium bath 288 as shown. The retort 280 is situated in a furnace 292 so as the bottom portion can be heated to the desired temperatures.

Temperatures can be monitored with a co-located thermocouple 296 as indicated.

As in block 212 in FIG. 26, prior to coating the system is sealed and evacuated to remove any air. The retort 280 in FIG. 27 is than back filled with pure Argon. This may be repeated several times to ensure only pure Argon is inside the chamber.

Figure 28A:
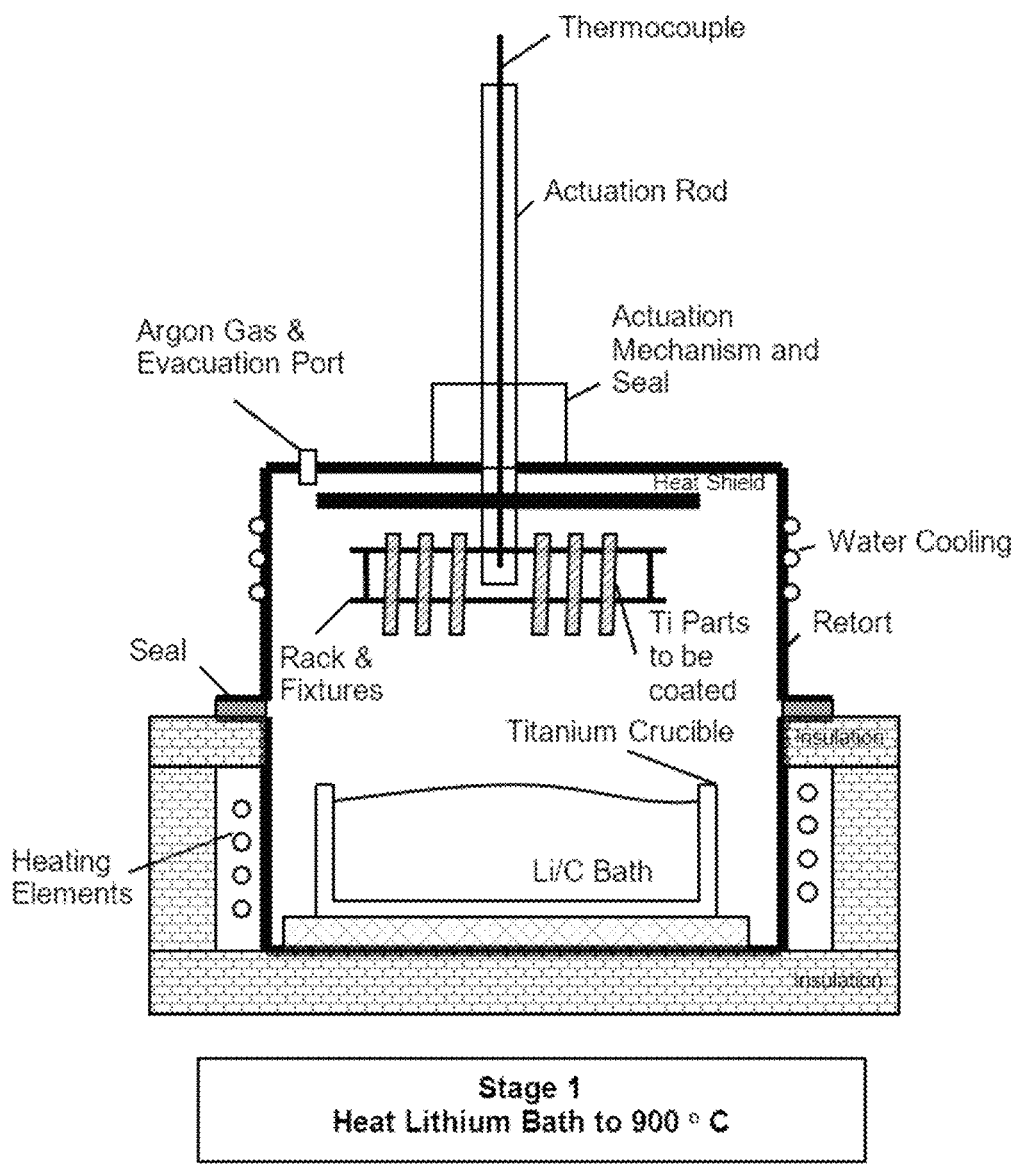
FIGS. 28A-28C illustrate a sequence of steps used by apparatus in a bath-immersion process.
Figure 28B:
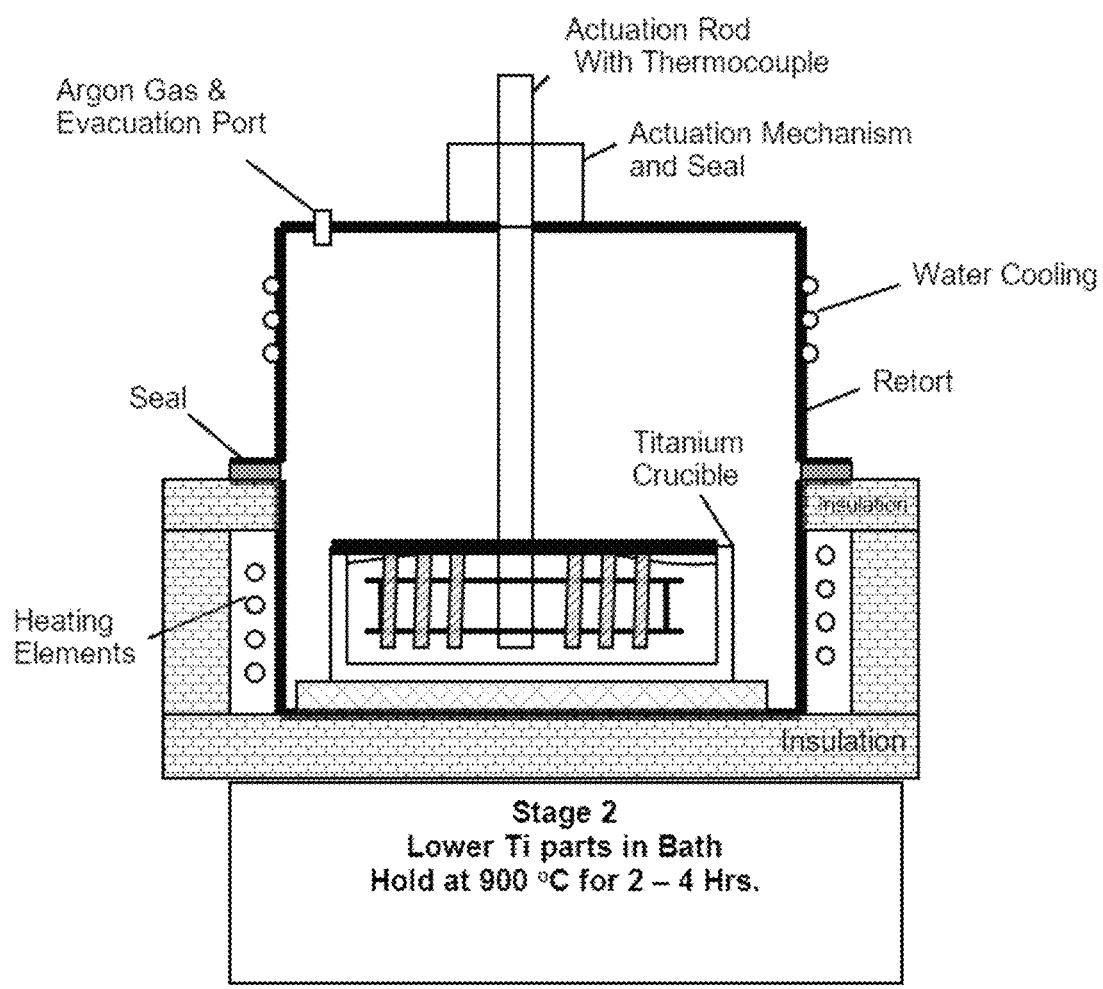

As in block 216 in FIG. 26, the Lithium bath is then heated to the desired temperature as shown in Stage 1 of FIG. 28A. As in block 224 of FIG. 26, the Titanium parts are then lowered into the bath as shown in Stage 2 of FIG. 28B. The samples are allowed to equilibrate and held for the desired temperature and time. It is at this stage that the diffusion process occurs as described above.

Figure 28C:
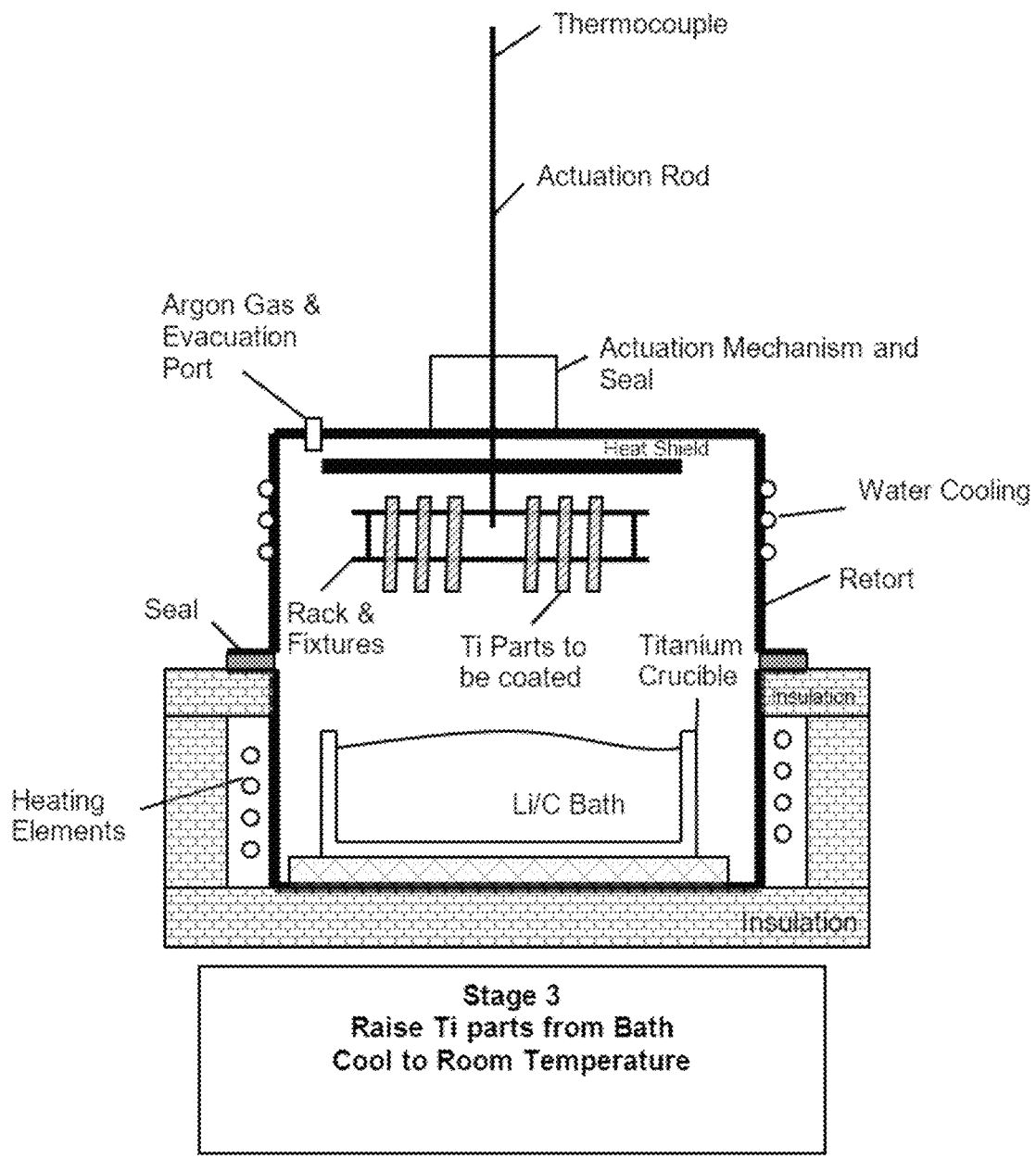

As in block 228 in FIG. 26, after the desired time at temperature, the samples are removed from the bath as shown in Stage 3 of FIG. 28C. As in block 232 of FIG. 26, the retort 280 is then allowed to cool to room temperature.

As in block 236 of FIG. 26, once cooled, the retort 280 is opened and the coated Titanium parts removed from the system. The parts and fixtures will be coated with a film of remaining Lithium. As in block 240 of FIG. 26, this Lithium must be removed by placing the entire fixture and parts in water. Water dissolves the remaining Lithium but does not affect the base metal.

As in block 244, the Titanium components can then be removed from the racks and fixtures rinsed and dried.

System for Two Chamber Method:

The second form of the process described in detail above involves a two-chamber method where the Titanium components are dipped in a Lithium bath with dissolved Carbon at a relatively low temperature, nominally 200 C in the first chamber, and then moved to a high temperature chamber, nominally 900 C and held for a period of time to form a stable Titanium Carbide coating on the parts. In this method the Lithium bath is not held at a high temperature range for a long period of time, and the samples are not immersed in the bath throughout the process cycle.

A basic flow chart for the coating of Titanium parts by this method is shown in FIG. 29. As in block 300, Titanium components are first prepared for coating by cleaning and grinding to provide a fresh metal surface for reaction. As in block 304, the parts are then attached to an appropriate fixture and rack system to be placed in the coating system.

Contemporaneously, as in block 308, a Lithium bath is prepared by placing pure Lithium metal in a Titanium crucible along with the required weight of Carbon in the form of Carbon black or graphite. As in block 312, the Titanium parts and the Lithium bath crucible are then installed in a Two Chamber Coating System as shown in FIG. 30

The system consists of a retort 480 which can be opened to remove components and then sealed to ensure a correct environment. The Titanium parts on the fixtures are connected to an actuation rod 484 which can lower the parts in and out of the Lithium bath 488, and into the various chambers of the furnace, as shown. The retort 480 is situated in a two-zone furnace 492 so as the bottom portion can be heated to the desired low temperature for dipping, and the upper section can be heated to the desired higher coating temperature.

Temperatures can be monitored with a co-located thermocouple as indicated.

As in block 316 in FIG. 29, prior to coating the system is sealed and evacuated to remove any air. The retort 480 is then back filled with pure Argon. This may be repeated several times to ensure only pure Argon is inside the chamber.

Figure 31A:
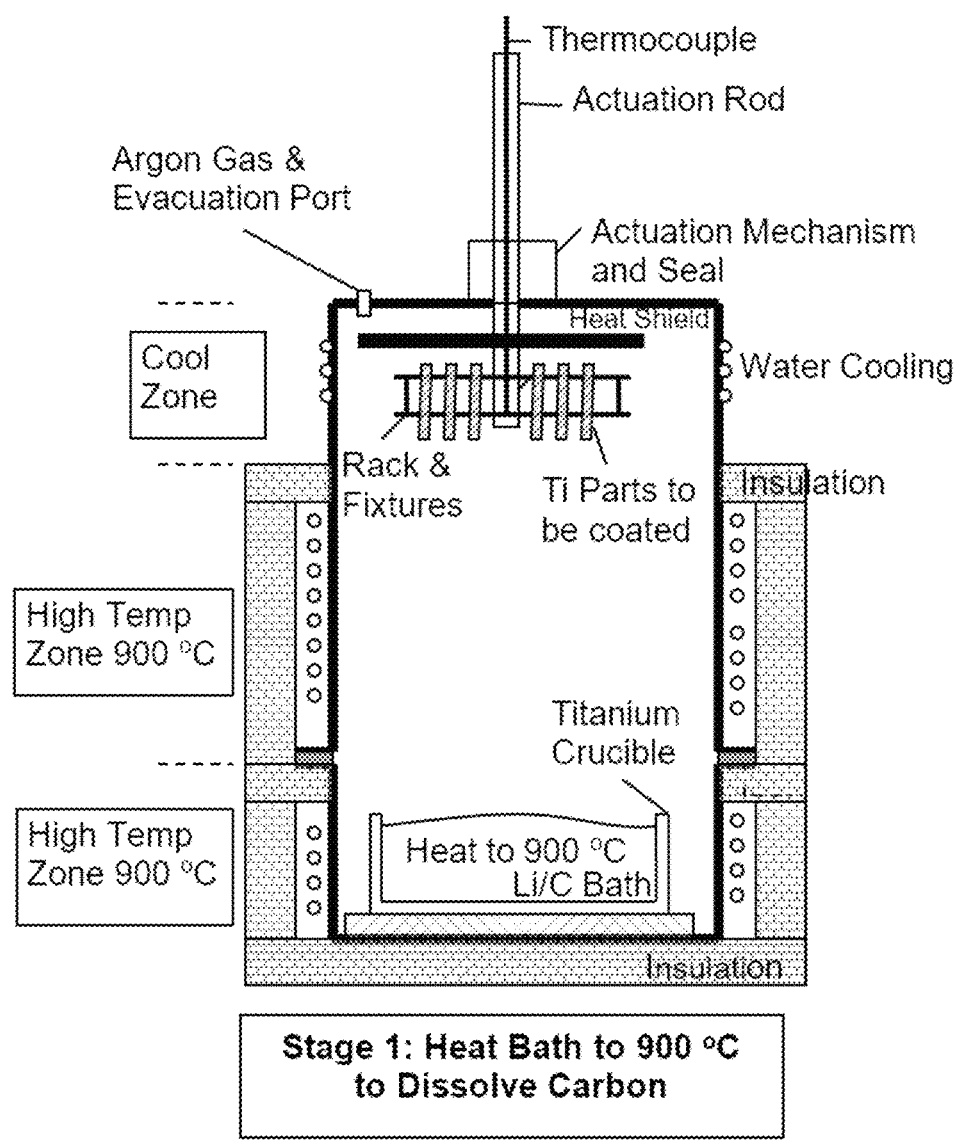
FIGS. 31A-31E illustrate a sequence of steps used by apparatus in a two-chamber process.

The Lithium bath must first be alloyed with the added Carbon in the crucible. As in block 320, the Lithium bath would therefore first be heated to the 800 to 900 C range and held for a sufficient time to dissolve the added Carbon, as shown in Stage 1 of FIG. 31A. Functionally, we envision two ways in which this Lithium bath conditioning can be performed prior to coating.

In one version, the bottom chamber of the furnace with the Lithium bath can be heated to the high temperature range first to dissolve the Carbon. The chamber and bath could then be subsequently cooled to the desired low temperature range of 200 C in Stage 2 of the process. The bath and system would then be ready to proceed to Stage 3 of the coating process.

Figure 31B:
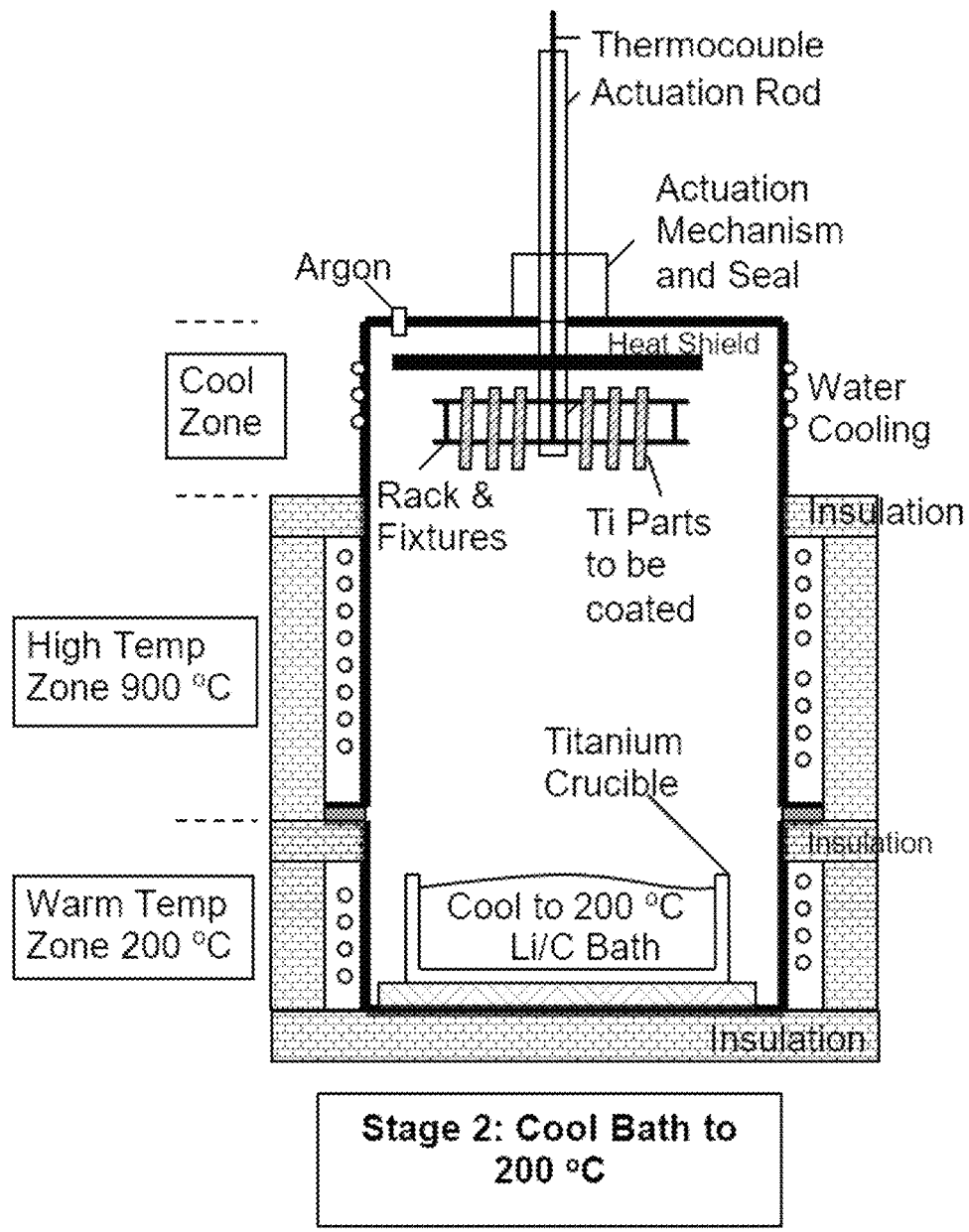

Alternatively, the whole retort 480 could be raised to the higher furnace position, moving the Lithium bath to the higher temperature chamber, and allowing the Lithium bath to completely dissolve the added Carbon. When the dissolution is completed the retort could simply be lowered so that the Lithium bath returns to the lower temperature chamber. The Lithium bath would then be held at the desired temperature as shown in Stage 2 of FIG. 31B.

Figure 31C:
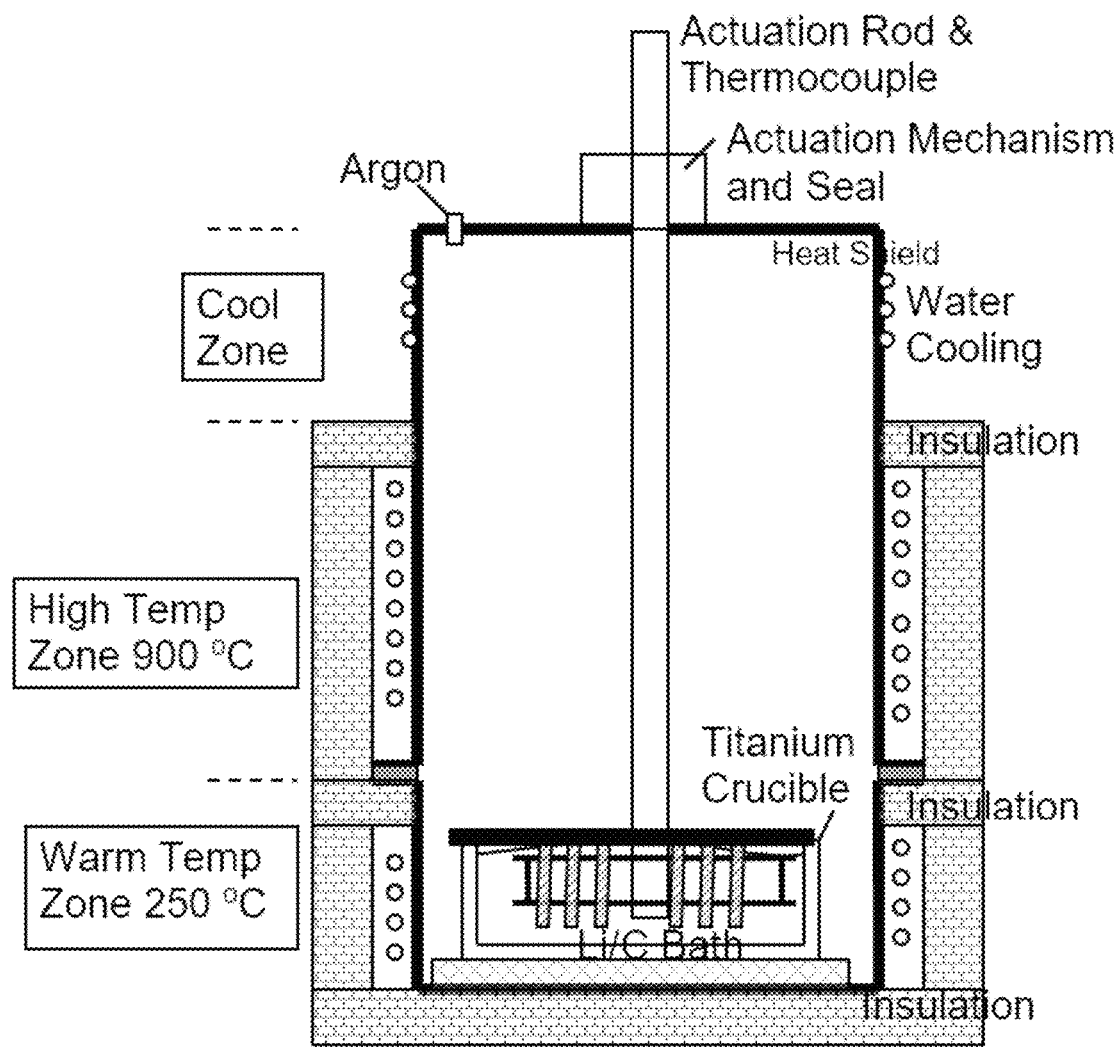
Figure 31D:
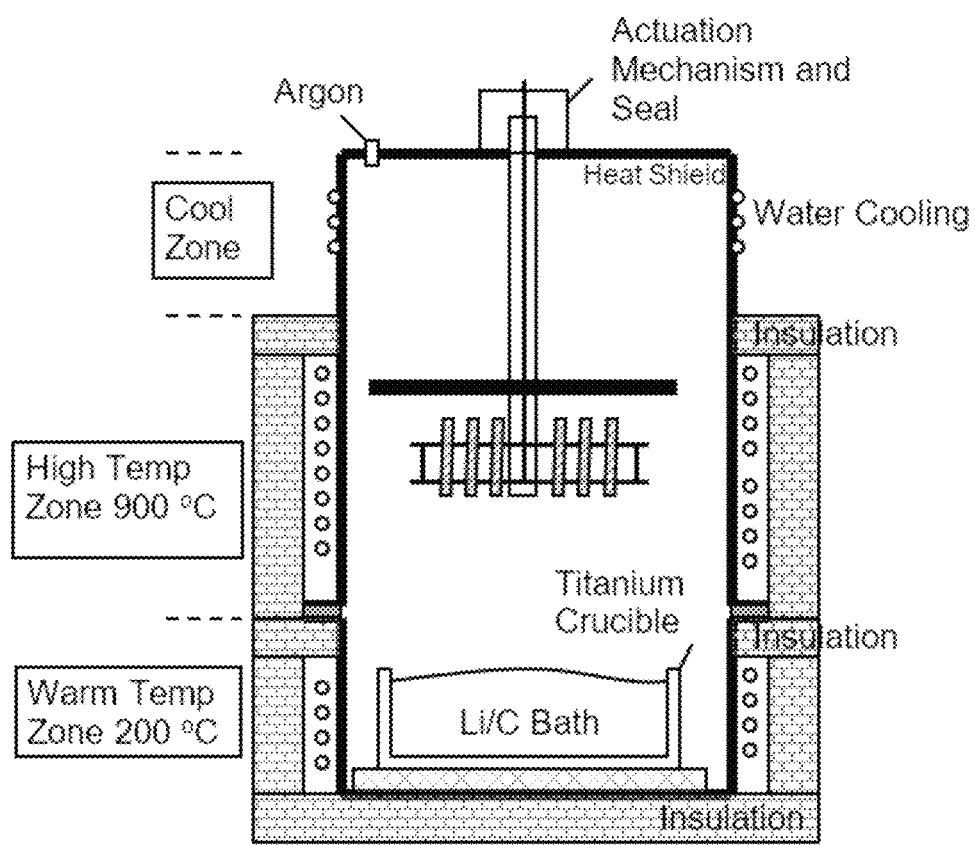

As in block 328 of FIG. 29, the Titanium parts are then lowered into the bath as shown in Stage 3 of FIG. 31C. for a short time. As in block 332 of FIG. 29, the samples are then raised to the hot chamber of the furnace, allowed to equilibrate and held for the desired temperature and time, as shown in Stage 4 of FIG. 31D. It is at this stage that the diffusion process occurs as described above.

Figure 31E:
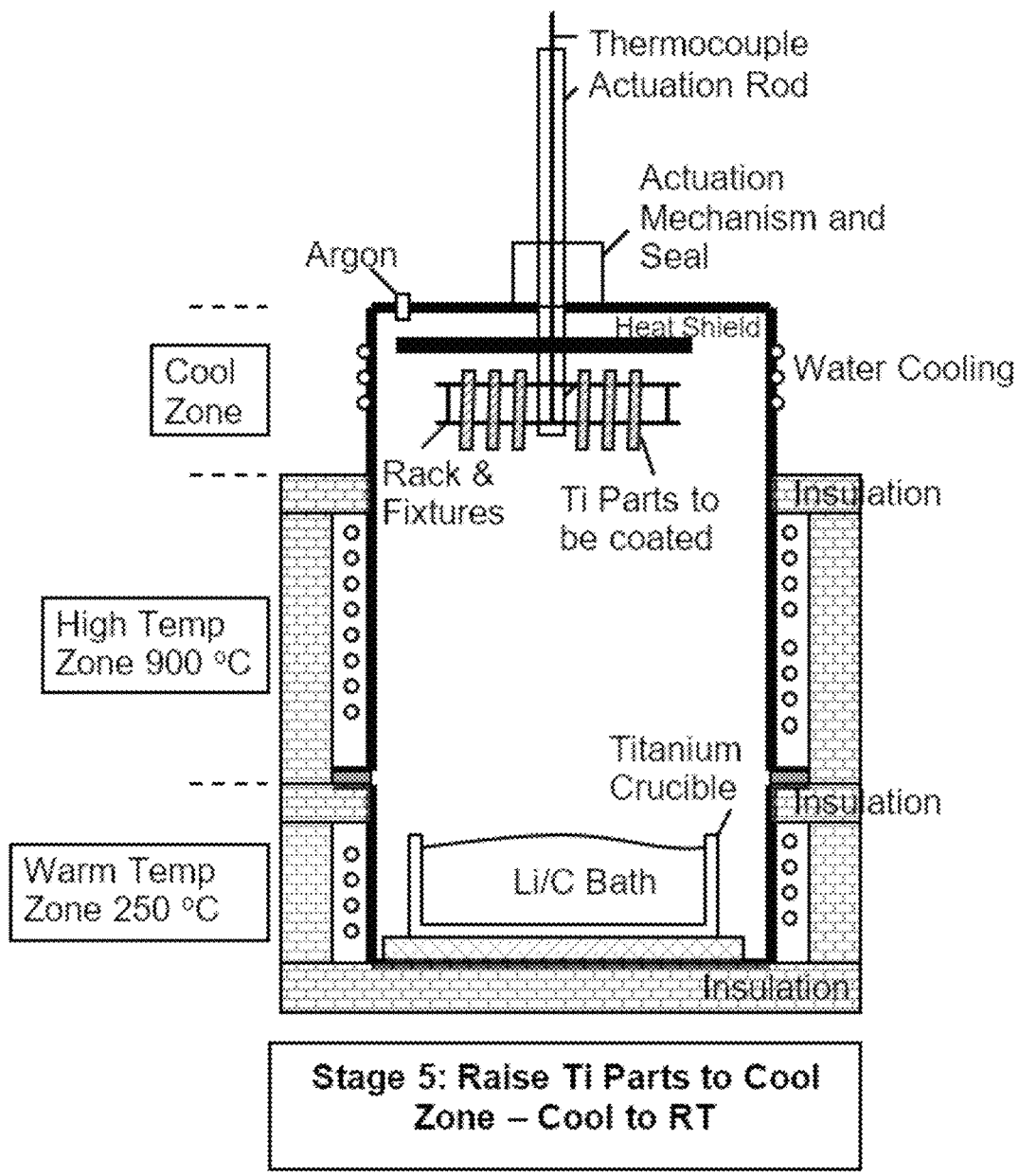

As in block 336 of FIG. 29, after the desired time at temperature, the samples are raised out of the hot zone chamber into the cool zone of the retort, as shown in Stage 5 of FIG. 31E. The retort 480 is then allowed to cool to room temperature.

Once cooled, the retort is opened and the coated Titanium parts removed from the system, as in block 340 of FIG. 29. The parts and fixtures will be coated with a film of remaining Lithium. This Lithium must be removed by placing the entire fixture and parts in water, as in block 344. Water dissolves the remaining Lithium but does not affect the base metal. The Titanium components can then be removed from the racks and fixtures rinsed and dried, as in block 348.

System for Three Chamber Method:

The third form of the process described in detail above involves a three-chamber method where the Titanium components are dipped in a pure Lithium bath at a relatively low temperature, nominally 200 C in the first chamber, then moved to a second chamber where Carbon is applied to the Lithium which has become adhered to the Titanium part's surface, and then moved to a third high temperature chamber, at nominally 900 C and held for a period of time to form a stable Titanium Carbide coating on the parts. In this method the Lithium bath is never heated to the high temperature range and the samples are not immersed in the bath throughout the process cycle.

A basic flow chart for the coating of Titanium parts by this method is shown in FIG. 32. As in block 500, Titanium components are first prepared for coating by cleaning and grinding to provide a fresh metal surface for reaction. As in block 504, the parts are then attached to an appropriate fixture and rack system to be placed in the coating system. As in block 508, contemporaneously, a Lithium bath is prepared by placing pure Lithium metal in a Titanium crucible. Additionally, as in block 509, Carbon in the form of Carbon black or graphite is placed in a separate crucible for dipping in the second chamber of the system.

As in block 512, the Titanium parts, Lithium bath crucible and Carbon bearing crucible are then installed in a Three Chamber Coating System, as shown in FIG. 33. The system consists of a furnace/retort system 600 which can be opened to remove components and then sealed to ensure a correct environment. The Titanium parts on the fixtures are connected to an actuation rod 604 on a conveyor system 608 which can lower the parts in and out of the Lithium bath 612 and Carbon crucible 616, and moved into the various chambers of the furnace, as shown.

The bottom portion of the retort will contain a multi-zone furnace system so as the Lithium bath and Carbon reservoir portions can be heated to the desired low temperature for dipping, and the hot zone section can be heated to the desired higher coating temperature. Temperatures can be monitored with a co-located thermocouple 620 as indicated.

As in block 516 of FIG. 32, prior to coating the system is sealed and evacuated to remove any air. The retort is than back filled with pure Argon. This may be repeated several times to ensure only pure Argon is inside the chamber. As in block 520, the Lithium bath is then heated to the desired temperature, as shown in Stage 1 of FIG. 34.

As in block 524 of FIG. 32, the Titanium parts are then lowered into the bath as shown in Stage 2 of FIG. 35. The samples are then raised from the Lithium bath, as shown in Stage 3 in FIG. 36.

The dipped samples are then conveyed to the second chamber of the furnace as shown in Stage 4 in FIG. 37. As in block 528 of FIG. 32, the dipped samples are then lowered into the heated Carbon reservoir so that the Lithium can absorb the Carbon, as shown in Stage 5 in FIG. 38. The dipped samples are then raised from the Carbon reservoir as shown in Stage 6 of FIG. 39.

As in block 530 of FIG. 32, the dipped samples are then conveyed and lowered into the hot chamber of the furnace, allowed to equilibrate and held for the desired temperature and time, as shown in Stages 7 and 8 of FIGS. 40 and 41, respectively. It is at this stage that the diffusion process occurs as described above.

As in block 532 of FIG. 32, after the desired time at temperature, the samples are raised out of the hot zone chamber into the cool zone of the retort, as shown in Stage 9 of FIG. 42. The retort is then allowed to cool to room temperature.

Once cooled, as in block 536 of FIG. 32, the retort is opened and the coated Titanium parts removed from the system. The parts and fixtures will be coated with a film of remaining Lithium. As in block 540, this Lithium must be removed by placing the entire fixture and parts in water. Water dissolves the remaining Lithium but does not affect the base metal. As in block 544, the Titanium components can then be removed from the racks and fixtures rinsed and dried.

The equipment described above can be used to provide the diffusion of any elements to any refractory metal substrate as described above. All other process variations described above can also be incorporated with this equipment.

III: A Refractory Metal or Alloy Article with a Chemically Converted Surface Created by Diffusing Various Elements Via an Alkali or Alkaline Earth Metal Carrier This invention provides the refractory metal or alloy article which has a chemically converted surface created by the method described in detailed above. The invention in one basic embodiment involves Titanium with Carbon diffused into it's surface to form a stable Titanium Carbide (TiC) phase. The surface of the Titanium metal is converted to a stable well adhered hard TiC compound. The hard surface will provide wear and impact resistance for a variety of applications such as bearings, bushings, gears, cutting tools and instruments and lightweight armor.

The article created by this method and equipment will have unique characteristics. In one basic embodiment, a Titanium substrate will have Carbon diffused into it's surface to form a stable Titanium Carbide (TiC) phase. The unique characteristics of this coated article are: (1) This stable Carbide phase will be converted Titanium material, not a layer of TiC applied to the original surface. (2) The stable Carbide phase layer will be a minimum of 5 micron in thickness. (3) The stable carbide layer and Titanium substrate will not be embrittled by additional Hydrogen, Sulphur or Oxygen absorption during the coating process. (4) The stable carbide phase will be formed at temperatures below the Beta transus temperature (882 to 940° C.) of the substrate.

Figure 43:
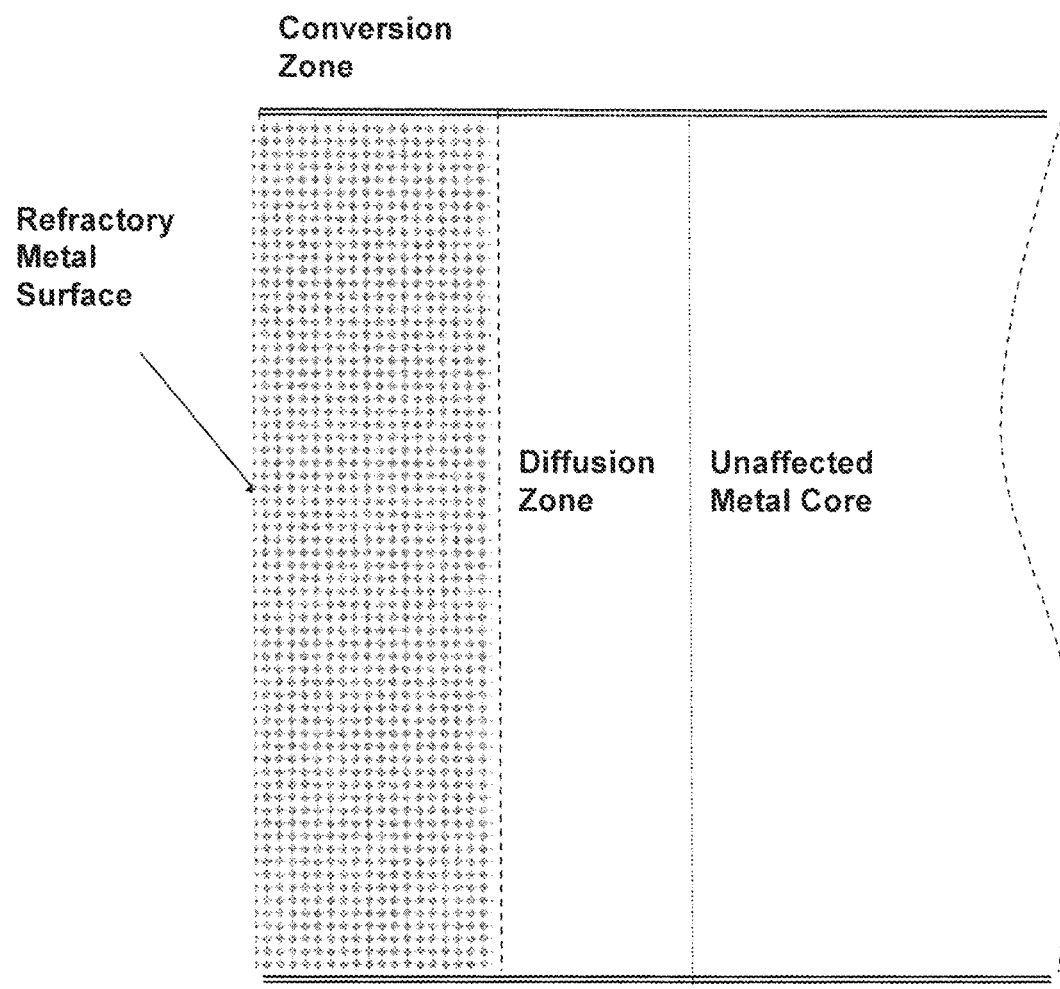
FIG. 43 illustrates a product produced by a process implemented according to one form of the invention.

The resulting article in this basic embodiment will have a stable hard surface as illustrated in FIG. 43. The hard surface will provide wear and impact resistance for a variety of applications such as bearings, bushings, gears, cutting tools and instruments, lightweight armor and any other application which will can benefit from the enhanced surface condition provided.

IV: Method of Designing a Coating Process to Diffuse a Specific Element into a Specific Refractory Metal or Alloy Via a Specific Alkali or Alkaline Earth Metal Carrier This invention provides a method of designing a coating process using the method and systems described above to produce the desired article described above. This method would select the optimal combination of refractory metal substrate, carrier medium, diffusing element, bath composition, coating system, temperature and time exposure to achieve the desired article. The resulting article would consist of the desired Refractory metal with the desired converted surface. The invention in one basic embodiment would consist of designing a process to form a stable hard surface on a Titanium alloy substrate. For example, the design might consist of selecting; (i) the Titanium 6 Al-4 V alloy as the substrate, (ii) a Lithium bath carrier with Carbon as a diffusing element, (iii) a composition of 15% Carbon by weight in the bath, (iv) the bath immersion method described above, (v) the bath immersion system described above to perform the process, (vi) an immersion temperature of 850° C. and (vii) an immersion time of 4 hours. The resulting article created by this process will have the desired surface characteristics for the specified application

Additional Considerations

1. One additional approach is contemplated, wherein the carrier, such as Lithium, is rendered into a powder, and mixed with powdered Carbon. The mixture is applied to the Titanium object to be treated, as by powder coating.

2. A significant feature of the invention is that the crystal structure of the titanium object is not damaged by entry of the carbon. In contrast, in a process such as ion implantation, damage does occur to the substrate into which implantation occurs.

From another perspective, the bonding in FIG. 16, between the Stable TiC Phase and the Ti Core, is quite strong. One reason is that the titanium-titanium metallic bonds remain largely intact in the two regions. This is a complex situation, at least because (1) there is no abrupt boundary between the TiC and the Ti Core, because the Carbon concentration follows a gradient and (2) some of the electron cloud of the titanium atoms is now shared with Carbon. Nevertheless, it seems clear that the bond between the two regions of FIG. 16 is distinctly stronger than that of any applied coating (not shown), because many coatings do not adhere by way of covalent, ionic, or metallic bonding, but through weaker forces, such as Van der Waals forces.

3. In FIG. 16, the Stable TiC region, on the left side, represents generically a mixture of refractory metals, such as titanium, vanadium, chromium, hafnium, tungsten, molybdenum, and zirconium, and dopants, such as nitrogen, and carbon. The Ti Core, on the right side, represents generically a mixture solely of refractory metals, such as those listed above.

4. In the phrase "atomic Carbon" is a term-of-art. One meaning is that individual, separate Carbon atoms are present. Another meaning is that Carbon atoms are present which are randomly distributed throughout. Under both meanings, if "atomic Carbon" is placed adjacent a substrate into which the Carbon is to diffuse, the Carbon will be uniformly distributed over the surface of the substrate, as opposed to concentrated at one location.

The latter concentration can occur if a Carbon powder is sprinkled upon the surface. The points of contact where the Carbon meets the surface have a high concentration, and the spaces between the Carbon particles have a low concentration.

5. In one form of the invention, utilizing either the two chamber process or the three chamber process, the molten lithium is applied to the substrate in a pattern, thereby selectively creating sources of carbon for diffusion. Application of photoresist to a printed circuit board represents one type of pattern.

For example, the cutting edge of a knife may be painted, so to speak, by the molten lithium. This approach would create a high concentration of titanium carbide along the edge, and a lesser concentration elsewhere.

Similarly, a cutting tool, such as a lathe cutting bit, may have the cutting tip dipped into the molten lithium/carbon mixture, to harden the tip, and leave the rest of the bit in its former condition.

6. The discussion above was framed in terms of pure titanium, pure carbon, etc. It is recognized that purity is a matter of degree, and that materials of different purities are acceptable in different situations.

In one form of the invention, sufficient purity is attained if contaminants, or trace elements, are present in a concentration exceeding no more than 0.4 weight percent.

7. In one form of the invention, the diffusion is undertaken at a temperature which does not cause a change in the crystal structure of the substrate, such as titanium, except possibly expansion because of elevated temperature.

8. It was state above that carbon is dissolved in the molten lithium. It is possible that the carbon is suspended within the molten lithium, wherein the carbon-lithium bonding is different than in a true solution. The precise method by which the carbon (or other dopant) is actually carried by the molten lithium (or other carrier) is not seen as significant.

9. The word "or" is used in the claims. It is used in the inclusive sense, meaning that the phrase "A, B or C" covers any subset of items selected from the group A, B, and C.

For example, the phrase covers A alone, B alone, C alone, A and B, A and C, B and C, and A and B and C.

Thus, the phrase "titanium, chromium, or hafnium" means any of those three metals, and any combination of those three metals.

10. The invention encompasses the following beneficial negative aspects, in which deleterious characteristics of prior art approaches are eliminated.

One aspect is that, in a refractory metal, an outer layer is converted into a carbide or nitride is provided. Further, no deterioration due to hydrogen embrittlement is present, and no surface oxidation is present.

11. FIGS. 44 and 45 are an overview of a flow chart and are considered self-explanatory.

Item (1) in FIG. 44 summarizes a process, both broadly conceived and narrowly conceived.

Item (2) in FIG. 44 summarizes a variant of the process, both broadly and narrowly conceived.

Item (1) in FIG. 45 summarizes an apparatus designed to implement one or more of the processes.

Figure 46:
FIG. 46 is an outline of various combinations of materials utilized by the invention.

FIG. 46 illustrates, in graphic form, various combinations of chemical elements which can be used by various forms of the invention.

Figure 47:
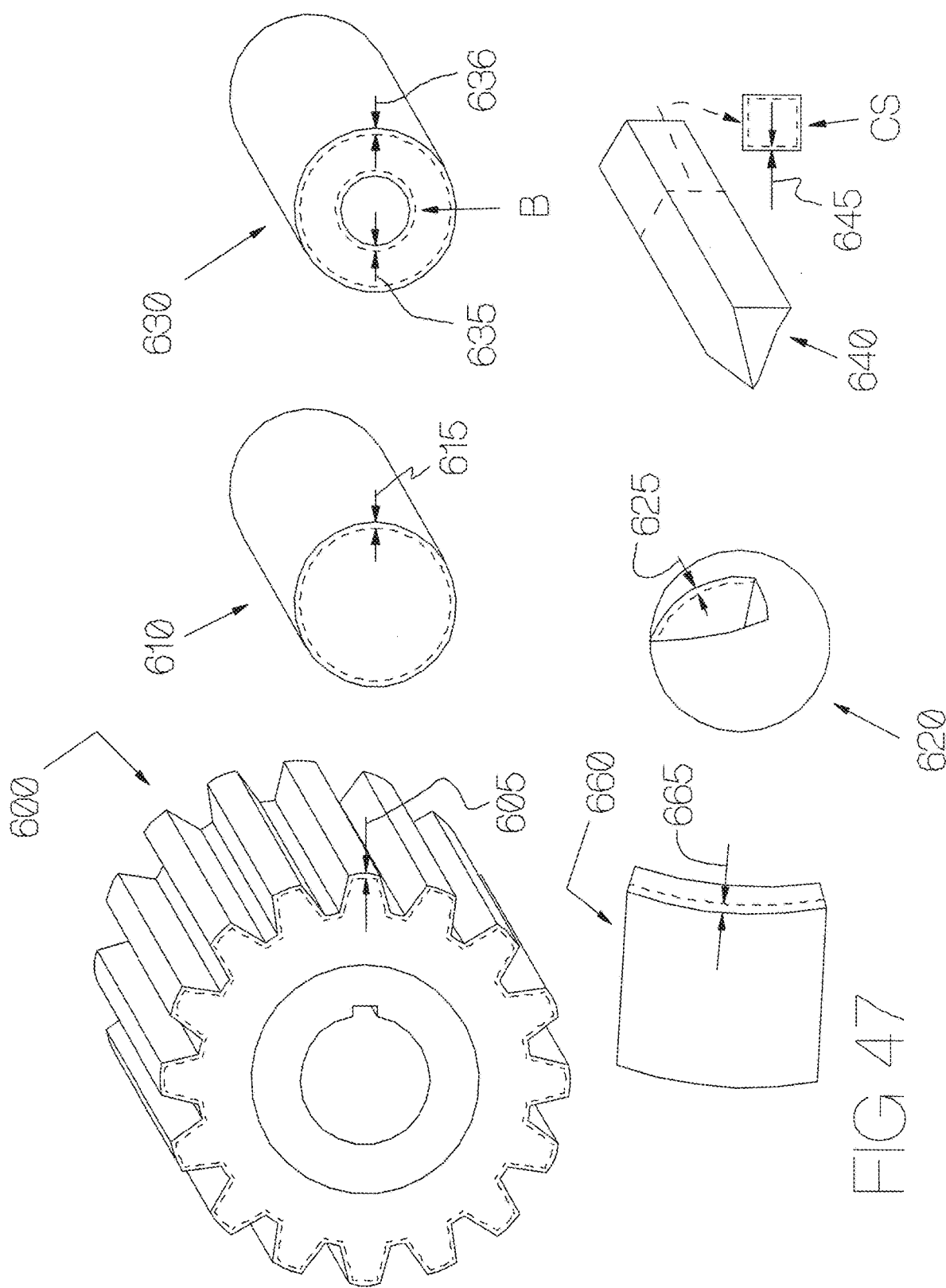
FIG. 47 illustrates several articles fabricated using the processes of the present invention.

12. FIG. 47 shows a gear 600, having a hardened surface 605, created by the processes described herein. A roller bearing 610 is shown, having a hardened surface 615. A bushing, or solid bearing, 630 is shown, having a bore B. Hardened surface 636 is indicated. The Inventor points out that if the bushing 630 were treated using the immersion, or bath, process described herein, then the inner surface 635 of bore B can also be hardened.

It should be appreciated that the hardening referred to herein can be inside the part or on an inner surface of the part while the outer surface is not hardened. Thus, the part could have a Titanium outer surface and a TiC inner surface hardened by the Lithium bath referred to herein.

Ball bearing 620 is shown, having a hardened surface 625. A lathe cutting tool 640 is shown, having a hardened surface 645, indicated in cross section CS.

A sheet of armor 660, such as a soldier's body armor or a motorcyclist's armor, is shown, having a hardened surface 665. A sheet 660 can be used individually, or multiple sheets can be shingled, armadillo-style.

13. The invention provides an increase in hardness, which can be measured on the Vickers Hardness Numbers or Knoop. For a titanium object, the Vickers hardness of 3000 VHN in the final product is taken as representative.

Advantages of Various Embodiments of the Prior Art

1) As mentioned earlier in the Description of the Related Art, prior art teaches the use Lithium as a flux to lower the melting point of Silicon. The bath used was predominantly Silicon with some Lithium added to lower melting point. A minimum of 60% Silicon had to be used in order to form an affective conversion coating. In fact, this prior art would teach that low concentrations of the diffusing element, such as those envisioned being used here (5-20%), would not work and not form an affective conversion coating. The prior art therefore teaches against what we have claimed here.

2) The prior art does not teach the use of other alkali and alkaline earth metals as the carrier media for the diffusion process as claimed here.

3) The prior art does not teach the transport and diffusion of other elements such as Carbon and Nitrogen as claimed here.

4) The prior art does not teach the simultaneous transport and diffusion of multiple elements such as the co-diffusion of Carbon and Nitrogen as claimed here.

5) The prior art does not teach the application of this diffusion process to other refractory metals and their alloys as claimed here.

6) The prior art does not teach the two multiple step processes to pre-coat components with the carrier media/diffusing elements, and then expose them to high temperature to allow diffusion to occur as claimed here.

7) The prior art does not teach the various systems for performing the diffusion process as claimed here.

8) The prior art does not teach the design of a coating method tailoring carrier media, diffusing elements and base metal as claimed here.

While the system and method herein described constitute preferred embodiments of this invention, it is to be understood that the invention is not limited to this precise system and method and that changes may be made in either without departing from the scope of the invention, which is defined in the appended claims.

What is claimed is:

1. An object, comprising:
   a) an inner region which contains zirconium or a zirconium based alloy that is 98-100% pure zirconium and 0-2% trace impurities,
   b) an outer region, adjacent to and outside the inner region, which contains zirconium or a zirconium based alloy that is 98-100% pure zirconium and 0-2% trace impurities; and carbon;
   wherein said outer region comprises a lattice having said outer region, said outer region being formed such that a crystal structure of said zirconium or said zirconium based alloy in both said inner region and said outer region has not changed as a result of said carbon being diffused therein and wherein said carbon is diffused in said lattice of said outer region without co-diffusion of oxygen, hydrogen or sulfur as contaminants;
   said inner region has no carbon levels above the trace elements found in said zirconium or said zirconium based alloy and has a hardness that is less than a hardness of said outer region and is integral with said outer region;
   said outer region of a phase of carbides of said zirconium or said zirconium based alloy having a thickness of between 5 to 100 microns.

2. The object according to claim 1, in which the outer region surrounds the inner region.

3. The object according to claim 2, in which the outer region includes an outer surface of the object.

4. The object according to claim 1, wherein the object comprises a gear, bearing, bearing roller, ball bearing, bushing, armor, tubular products, medical product (e.g., implants), dental products, sporting products (e.g., golf head), sheet product, cutting tool, or other products that need hard surface.

5. An object, comprising:
   a) an inner region which contains zirconium or a zirconium based alloy that is 98-100% pure zirconium and 0-2% trace impurities; and carbon;
   b) an outer region, adjacent to and outside said inner region, which contains zirconium or a zirconium based alloy that is 98-100% pure zirconium and 0-2% trace impurities, said outer region consisting of carbides of metals in the inner body;
   wherein said outer region comprises a lattice having said outer region, said outer region being formed such that a crystal structure of said zirconium or said zirconium based alloy in both said inner region and said outer region has not changed as a result of said carbon being diffused therein and wherein said carbon is diffused in said lattice of said outer region without co-diffusion of oxygen, hydrogen or sulfur as contaminants;
   said inner region has no carbon levels above the trace elements found in said zirconium or said zirconium based alloy and has a hardness that is less than a hardness of said outer region and is integral with said outer region;
   said outer region of a phase of carbides of said zirconium or said zirconium based alloy having a thickness of between 5 to 100 microns.

* * * * *